US012750572B2

(12) United States Patent
Jun et al.

(10) Patent No.: US 12,750,572 B2
(45) Date of Patent: Sep. 29, 2026

(54) CAMERA ACTUATOR, LENS TRANSFER APPARATUS, AND CAMERA APPARATUS COMPRISING SAME

(71) Applicant: LG INNOTEK CO., LTD., Seoul (KR)

(72) Inventors: Jae Hoon Jun, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/722,481

(22) PCT Filed: Dec. 14, 2022

(86) PCT No.: PCT/KR2022/020316

§ 371 (c)(1),
(2) Date: Jun. 20, 2024

(87) PCT Pub. No.: WO2023/121123

PCT Pub. Date: Jun. 29, 2023

(65) Prior Publication Data

US 2025/0047962 A1 Feb. 6, 2025

(30) Foreign Application Priority Data

Dec. 23, 2021 (KR) ........................ 10-2021-0186291

(51) Int. Cl.
*H04N 23/52* (2023.01)
*H04N 23/54* (2023.01)
(Continued)

(52) U.S. Cl.
CPC ............. *H04N 23/52* (2023.01); *H04N 23/54* (2023.01); *H04N 23/55* (2023.01);
(Continued)

(58) Field of Classification Search
CPC ........ H04N 23/52; H04N 23/54; H04N 23/55; H04N 23/6812; H04N 23/687;
(Continued)

(56) References Cited

U.S. PATENT DOCUMENTS

2011/0013895 A1* 1/2011 Chiang .................. G03B 17/00
396/55
2018/0364450 A1 12/2018 Lee et al.
(Continued)

FOREIGN PATENT DOCUMENTS

EP 3 379 064 3/2021
EP 4 439 170 10/2024
(Continued)

OTHER PUBLICATIONS

International Search Report dated Mar. 17, 2023 issued in Application No. PCT/KR2022/020316.
(Continued)

*Primary Examiner* — Mekonnen D Dagnew
(74) *Attorney, Agent, or Firm* — KED & ASSOCIATES, LLP

(57) ABSTRACT

Disclosed, in an embodiment of the present invention, is a camera apparatus comprising: a housing; a first lens assembly and a second lens assembly moving in an optical axis direction on the basis of the housing; an optical drive unit including a first drive unit moving the first lens assembly and a second drive unit moving the second lens assembly; and a first hall sensor adjacent to the first drive unit and a second hall sensor adjacent to the second lens assembly, wherein at least a portion of the first hall sensor and the second hall sensor do not overlap each other in a direction perpendicular to the optical axis direction.

12 Claims, 33 Drawing Sheets

(51) Int. Cl.

| | |
|---|---|
| ***H04N 23/55*** | (2023.01) |
| ***H04N 23/68*** | (2023.01) |
| *G02B 13/00* | (2006.01) |

(52) U.S. Cl.
CPC ....... *H04N 23/6812* (2023.01); *H04N 23/687* (2023.01); *G02B 13/005* (2013.01); *G02B 13/009* (2013.01)

(58) Field of Classification Search
CPC ........ H04N 23/00; H04N 23/45; H04N 23/60; G02B 13/005; G02B 13/009; G03B 3/10; G03B 5/00; G03B 30/00; G03B 2205/0069; G03B 5/02; H02K 33/18
See application file for complete search history.

(56) References Cited

U.S. PATENT DOCUMENTS

| | | | | |
|---|---|---|---|---|
| 2020/0348479 | A1 | 11/2020 | Kwon et al. | |
| 2021/0109307 | A1* | 4/2021 | Hu ........................... | G02B 7/10 |

FOREIGN PATENT DOCUMENTS

| | | |
|---|---|---|
| JP | 2021-103271 | 7/2021 |
| KR | 10-2018-0013286 | 2/2018 |
| KR | 10-2021-0030724 | 3/2021 |
| KR | 10-2021-0117124 | 9/2021 |
| KR | 10-2021-0122754 | 10/2021 |
| KR | 10-2021-0144624 | 11/2021 |
| WO | WO 2020/174325 | 9/2020 |

OTHER PUBLICATIONS

European Search Report issued in Application No. 22911756.9 dated Sep. 15, 2025.
Japanese Office Action issued in Application No. 2024-538359 dated Apr. 21, 2026.
Korean Office Action issued in Application No. 10-2021-0186291 dated Apr. 30, 2026.

* cited by examiner

1153 : 1153a, 1153b, 1153c

1150; 1151, 1152, 1153, 1154, 1155

1251: 1251a, 1251b
1221: 1221a, 1221b, 1221c, 1221d
1222: 1222a, 1222b
1253: 1253a, 1253b
HY1: HY1a, HY1b
HY2: HY2a, HY2b
HY: HY1, HY2

210 : 210GA, 210GB

CAMERA ACTUATOR, LENS TRANSFER APPARATUS, AND CAMERA APPARATUS COMPRISING SAME

CROSS-REFERENCE TO RELATED PATENT APPLICATIONS

This application is a U.S. National Stage Application under 35 U.S.C. § 371 of PCT Application No. PCT/KR2022/020316, filed Dec. 14, 2022, which claims priority to Korean Patent Application No. 10-2021-0186291, filed Dec. 23, 2021, whose entire disclosures are hereby incorporated by reference.

TECHNICAL FIELD

The present invention relates to a camera actuator and a camera device including the same.

BACKGROUND ART

A camera is a device that takes a picture or video of a subject, and is mounted on a portable device, a drone, a vehicle, or the like. The camera device or camera module may have an image stabilization (IS) function of correcting or preventing image shakes due to a user motion in order to improve an image quality, an auto focusing (AF) function of automatically adjusting a distance between an image sensor and a lens and thereby aligning a focal length of the lens, and a zooming function of photographing a subject by increasing or decreasing the magnification of the subject at a long distance through a zoom lens.

Meanwhile, the higher the pixel number, the higher the resolution of the image sensor, and the smaller the size of the pixel. As the pixel becomes smaller in size, the amount of light received during the same time decreases. Therefore, as the camera has a higher pixel number, image shakes caused by handshakes due to a slow shutter speed in a dark environment may appear more severe. As a representative image stabilizer (IS) technology, there is an optical image stabilizer (OIS) technology that corrects motion by changing an optical path.

A general OIS technology is capable of detecting a camera movement through a gyro sensor or the like and, based on the detected movement, tilting or moving the lens or tilting or moving the camera device including the lens and the image sensor. In the case that the lens or the camera device including the lens and the image sensor is tilted or moved for the OIS, it is necessary to additionally secure a space for tilting or moving in the vicinity of the lens or the camera device.

On the other hand, an actuator for the OIS may be disposed around the lens. In this case, the actuator for the OIS may include actuators in charge of tilting of two axes perpendicular to the optical axis Z, that is, an actuator in charge of X-axis tilting and an actuator in charge of Y-axis tilting.

However, due to the needs of ultra-slim and ultra-small camera devices, there is a large space constraint for arranging the actuators for the OIS, and it may be difficult to ensure a sufficient space where the lens or the camera device itself including the lens and the image sensor can be tilted or moved for the OIS. In addition, as the camera has a higher pixel number, it is desirable to increase the size of the lens to increase the amount of light received. However, there may be a limit in increasing the size of the lens due to a space occupied by the actuator for the OIS.

In addition, when the zooming function, the AF function, and the OIS function are all included in the camera device, there is also a problem that a magnet for the OIS and a magnet for the AF or zoom are disposed close to each other and cause magnetic field interference.

In addition, the camera actuator for AF and zoom in the camera device provides a long stroke to improve performance, but there is a problem that magnetic field interference occurs between adjacent magnets and coils.

In addition, there is a problem in that it is difficult to accurately measure the position of a lens assembly due to magnetic field interference (for example, cross talk) to a Hall sensor.

DISCLOSURE

Technical Problem

A technical problem to be solved by the present invention is to provide a camera actuator and a camera device having a driving unit that provides a long stroke (a long movement distance) during AF/ZOOM.

In addition, the present invention is to provide a camera actuator and a camera device capable of accurately detecting movement of a lens assembly by blocking magnetic fields that cause cross-talk to a Hall sensor as much as possible.

In addition, the present invention is to provide a camera actuator and a camera device in which magnetic field interference among magnets, coils, and Hall sensors facing one another is minimized.

The problem to be solved in embodiments is not limited to the above, and other objects or effects that can be understood from the technical solutions or embodiments described below are also included.

Technical Solution

According to the present invention, a camera device includes: a housing; a first lens assembly and a second lens assembly moving in an optical axis direction with respect to the housing; an optical driving unit including a first driving unit moving the first lens assembly and a second driving unit moving the second lens assembly; and a first Hall sensor adjacent to the first driving unit and a second Hall sensor adjacent to the second lens assembly, wherein at least a portion of the first Hall sensor and the second Hall sensor do not overlap each other in a direction perpendicular to the optical axis direction.

A ratio of an area of the first Hall sensor to an area overlapping the second Hall sensor in a horizontal direction may be 1:0.5 or less.

The first driving unit may include a first coil, and a first magnet facing the first coil; and the second driving unit may include a second coil, and a second magnet facing the second coil.

The first Hall sensor faces the first magnet and the second Hall sensor may face the second magnet when the first lens assembly and the second lens assembly are maximally moved in the optical axis direction.

The minimum distance between the first Hall sensor and the second Hall sensor may be greater than the maximum distance between the first coil and the second coil in the horizontal direction when the first lens assembly and the second lens assembly are maximally moved in the optical axis direction.

The first coil and the second coil may be disposed symmetrically with respect to an optical axis.

The camera device further include an image sensor, wherein the second lens assembly may be disposed closer to the image sensor than the first lens assembly.

The second Hall sensor may be disposed closer to the image sensor than the first Hall sensor.

The first coil may include a first sub-coil and a second sub-coil disposed to overlap each other in the optical axis direction; and the second coil may include a third sub-coil and a fourth sub-coil disposed to overlap each other in the optical axis direction.

The first sub-coil may be disposed to face the third sub-coil based on an optical axis; and the second sub-coil may be disposed to face the fourth sub-coil based on the optical axis.

The first Hall sensor may be disposed in the first sub-coil, and the second Hall sensor may be disposed in the fourth sub-coil.

A movement distance of the second lens assembly in the optical axis direction may be greater than a movement distance of the first lens assembly in the optical axis direction.

Advantageous Effects

The present invention may implement a camera actuator and a camera device having a driving unit that provides a long stroke (a long movement distance) during AF/ZOOM.

In addition, the present invention may implement the camera actuator and the camera device that accurately detects movement of a lens assembly by blocking magnetic fields that cause cross-talk to a Hall sensor as much as possible.

In addition, the present invention may implement the camera actuator and the camera device in which magnetic field interference among magnets, coils, and Hall sensors facing each other is minimized.

Various and beneficial advantages and effects of the present invention are not limited to the above and will be more easily understood in the description of specific embodiments of the present invention.

MODES OF THE INVENTION

Figure 1:
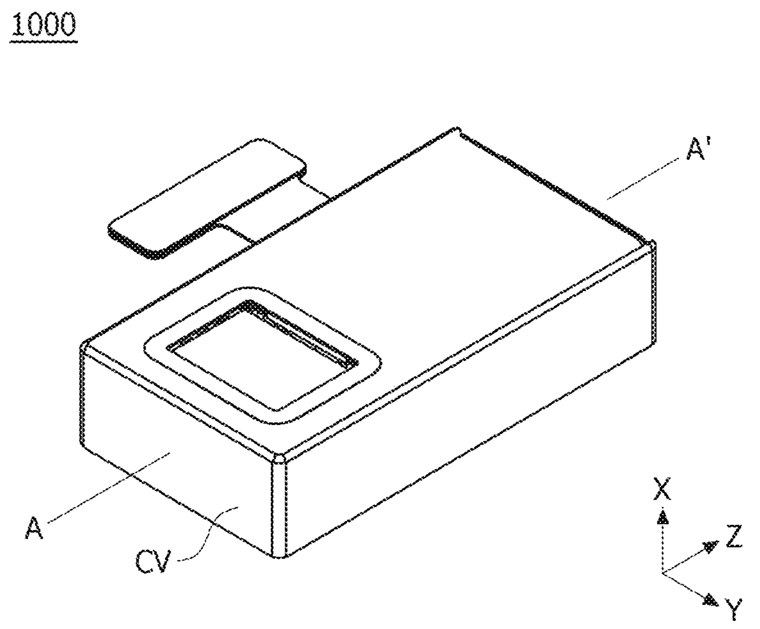
FIG. 1 is a perspective view of a camera device according to an embodiment.

The present invention may have various embodiments with several modifications, and specific embodiments will be described with reference to the accompanying drawings.

However, this is not intended to limit the present invention to specific embodiments, and it should be understood that all modifications, equivalents, and alternatives are included in the subject matter and scope of the present invention.

The terms including ordinal numbers such as first, second, etc. may be used to indicate various elements, but such elements are not limited by the terms. The terms are used only for the purpose of distinguishing one element from another. For example, without departing from the scope of the present invention, a second element may be referred to as a first element, and similarly, a first element may also be referred to as a second element. The term “and/or” includes any one of or any combination of a plurality of enumerated items.

When it is mentioned that a certain element is “coupled with/to” or “connected with/to” another element, it will be understood that the certain element is coupled or connected to another element directly or via any other element. On the other hand, when it is mentioned that a certain element is “directly coupled with/to” or “directly connected with/to” another element, it will be understood that there is no element interposed between both elements.

Terms used in the present invention are used only to describe certain embodiments and may not be intended to limit the scope of the present invention. Singular expressions may include plural expressions unless the context clearly dictates otherwise. In this application, it should be understood that the term such as “comprise”, “include”, or “have” is intended to denote the presence of stated features, numbers, steps, actions, components, parts, and the like, or any combination of them, but do not exclude the presence of or a possibility of addition of one or more other features, numbers, steps, actions, components, parts, and the like, or any combination of them.

Unless otherwise defined, all terms used herein, including technical or scientific terms, have the same meaning as commonly understood by one of ordinary skill in the art to which the present invention belongs. Among terms used herein, terms defined in a generic dictionary may be interpreted as having the same or similar meaning as the contextual meanings of the related art and, unless explicitly defined herein, may not be interpreted as ideally or excessively formal sense.

Hereinafter, embodiments will be described in detail with reference to the accompanying drawings, in which the same or corresponding elements are given the same reference numerals, and overlapping descriptions thereof will be omitted.

Figure 2:
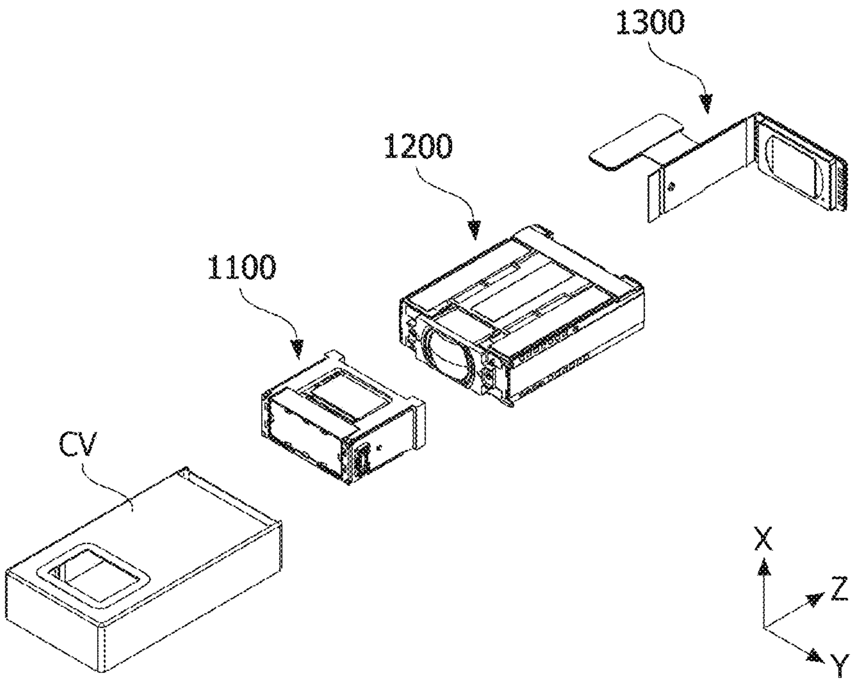
FIG. 2 is an exploded perspective view of a camera device according to an embodiment.
Figure 3:
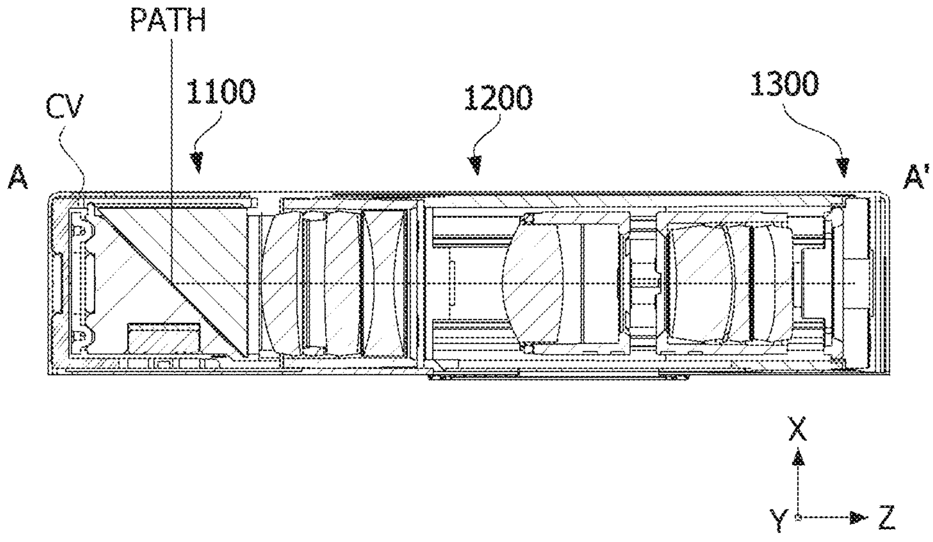
FIG. 3 is a cross-sectional view taken along lines A-A' in FIG. 1.

FIG. 1 is a perspective view of a camera device according to an embodiment, FIG. 2 is an exploded perspective view of a camera device according to an embodiment, and FIG. 3 is a cross-sectional view taken along lines A-A' in FIG. 1.

Referring to FIGS. 1 and 2, a camera device 1000 according to an embodiment may include a cover CV, a first camera actuator 1100, a second camera actuator 1200, and a circuit board 1300. Here, the first camera actuator 1100 may be interchangeably referred to as ‘a first actuator’, and the second camera actuator 1200 may be interchangeably referred to as ‘a second actuator’.

The cover CV may cover the first camera actuator 1100 and the second camera actuator 1200. A coupling force between the first camera actuator 1100 and the second camera actuator 1200 may be improved by the cover CV.

Furthermore, the cover CV may be made of a material that blocks electromagnetic waves. Accordingly, the first camera actuator 1100 and the second camera actuator 1200 in the cover CV can be easily protected.

The first camera actuator 1100 may be an optical image stabilizer (OIS) actuator.

In an embodiment, the first camera actuator 1100 may change an optical path. In an embodiment, the first camera actuator 1100 may vertically change the optical path by way of optical members (e.g., mirrors or prisms) therein. With this configuration, even if the thickness of a mobile terminal is reduced, it may be possible to dispose within the mobile terminal a lens configuration whose thickness is thinner by changing the optical path, and thus magnification, auto-focusing (AF), and OIS functions may be performed.

The second camera actuator 1100 may change the optical path in the first to third directions. An optical axis direction herein is a third direction or a Z-axis direction, which corresponds to the traveling direction of light provided to the image sensor.

The first camera actuator 1100 may further include lenses disposed in a predetermined lens barrel (not shown). The lenses may include fixed focal length lenses. A fixed focal length lens may also be referred to as a “single focal length lens” or “single lens”.

The second camera actuator 1200 may be disposed at the rear end of the first camera actuator 1100. The second camera actuator 1200 may be coupled to the first camera actuator 1100. This coupling between them may be made by various manners.

In addition, the second camera actuator 1200 may be a zoom actuator or an auto focus (AF) actuator. For example, the second camera actuator 1200 may support one lens or a plurality of lenses and may perform an auto-focusing function or a zoom function by moving the lenses in response to a control signal from a predetermined controller.

The circuit board 1300 may be disposed at the rear end of the second camera actuator 1200. The circuit board 1300 may be electrically connected to the second camera actuator 1200 and the first camera actuator 1100. Also, there may be a plurality of circuit boards 1300.

The circuit board 1300 may be connected to a second housing of the second camera actuator 1200, and have image sensors provided therein. Furthermore, on the circuit board 1300, a base unit including a filter may be seated. This will be described later.

The camera device according to an embodiment may be composed of a single camera device or a plurality of camera devices. For example, the plurality of camera devices may include a first camera device and a second camera device. Also, as described above, the camera device may be used interchangeably with a ‘camera module’, a ‘camera device’, an ‘imaging device’, an ‘imaging module’, an ‘imaging instrument’, and the like. The camera actuator refers to a component that moves optical members, lenses, and the like. Therefore, the camera actuator may or may not include the optical members, lenses, or the like. Hereinafter, it will be described on a basis of a case where the camera actuator includes a lens. In addition, the camera actuator may be used interchangeably with a ‘lens transfer device’, a ‘lens moving device’, an ‘optical member moving device’, a ‘zoom lens transfer device’, and the like. Hence, the first camera actuator may be used interchangeably as a ‘first lens transfer device’ and the second camera actuator may be used interchangeably as a ‘second lens transfer device’. Furthermore, the actuator is a device that moves optical members such as lenses, and thus in this specification, it will be described as a device which includes lenses.

The first camera device may include a single actuator or a plurality of actuators. For example, the first camera device may include the first camera actuator 1100 and the second camera actuator 1200.

The second camera device may include an actuator (not shown) disposed in a predetermined housing (not shown) and capable of driving a lens unit. The actuator may be a voice coil motor, a micro actuator, a silicon actuator, etc., and may be applied in various ways such as, but not limited to, an electrostatic type, a thermal type, a bimorph type, an electrostatic force type, and the like. Also, in this specification, the camera actuator may be referred to as an actuator or the like. In addition, the camera device including a plurality of camera devices may be mounted in various electronic devices such as mobile terminals.

Referring to FIG. 3, the camera device according to an embodiment may include the first camera actuator 1100 that performs an OIS function and the second camera actuator 1200 that performs a zooming function and an AF function.

A light may be incident into the camera device through an opening area located in an upper surface of the first camera actuator 1100. That is, the light may be incident to the inside of the first camera actuator 1100 along an optical axis direction (e.g., an X-axis direction), and the optical path may be changed to a vertical direction (e.g., a Z-axis direction) through optical members. In addition, the light may pass through the second camera actuator 1200 and be incident to an image sensor IS located at one end of the second camera actuator 1200 (e.g., see 'PATH').

In this specification, a lower surface refers to one side in a first direction. In addition, the first direction is an X-axis direction on the drawings and may be used interchangeably with a second axis direction. A second direction is a Y-axis direction on the drawings and may be used interchangeably with a first axis direction. The second direction is perpendicular to the first direction. In addition, a third direction is a Z-axis direction on the drawings and may be used interchangeably with a third axis direction. The third direction is perpendicular to both the first direction and the second direction. Herein, the third direction (Z-axis direction) corresponds to the direction of the optical axis, and the first direction (X-axis direction) and the second direction (Y-axis direction) are perpendicular to the optical axis and may be tilted by the second camera actuator. A detailed description thereof will be given later. Hereinafter, in relation to the description on the second camera actuator 1200, the optical axis direction corresponds to the optical path, which is the third direction (Z-axis direction), and the following description will be made on a basis of the mentioned above.

With this configuration, the camera device according to an embodiment may improve the spatial limitation of the first and second camera actuators by changing the optical path. That is, by help of the change in the optical path, the camera device according to an embodiment may extend the path of the light while minimizing the thickness of the camera device. Furthermore, the second camera actuator may provide a high range of magnification by controlling a focus or the like on the extended optical path.

In addition, the camera device according to an embodiment may implement the OIS through the control of the optical path by the first camera actuator, thereby minimizing the occurrence of a decenter or tilt phenomenon, and exhibiting the best optical properties.

The second camera actuator 1200 may include an optical system and a lens driving unit. For example, in the second camera actuator 1200, at least one of a first lens assembly, a second lens assembly, a third lens assembly, and a guide pin may be disposed.

The second camera actuator 1200 may also include a coil and a magnet to perform a high-magnification zooming function.

For example, the first lens assembly and the second lens assembly may be moving lenses that move through the coil, the magnet, and the guide pin, and the third lens assembly may be a fixed lens, but these are not a limitation. For example, the third lens assembly may perform the function of a concentrator (a focator) that images light at a specific position, and the first lens assembly may perform the function of a variator that re-images the image formed by the third lens assembly at another position. Meanwhile, a magnification change may be large in the first lens assembly because a distance to a subject or an image distance changes a lot, and the first lens assembly which is a variator may perform an important role in changing the focal length or magnification of the optical system. On the other hand, an image point formed by the first lens assembly, which is a variator, may be slightly different depending on a position. Therefore, the second lens assembly may perform a position compensation function for the image formed by the variator. For example, the second lens assembly may perform the function of a compensator that accurately forms, at an actual image sensor position, the image point formed by the first lens assembly which is a variator. For example, the first lens assembly and the second lens assembly may be driven with electromagnetic force by an interaction between the coil and the magnet. The above description may be applied to the lens assembly to be described later.

Meanwhile, when the actuator for OIS and the actuator for AF or zoom are disposed according to an embodiment of the present invention, magnetic field interference with the magnet for AF or zoom may be prevented during the OIS operation. Since a second optical driving magnet in the first camera actuator 1100 is disposed separately from the second camera actuator 1200, magnetic field interference between the first camera actuator 1100 and the second camera actuator 1200 may be prevented. In this specification, the OIS may be used interchangeably with terms such as hand-shake correction, optical image stabilization, optical image correction, and shake correction.

Figure 4:
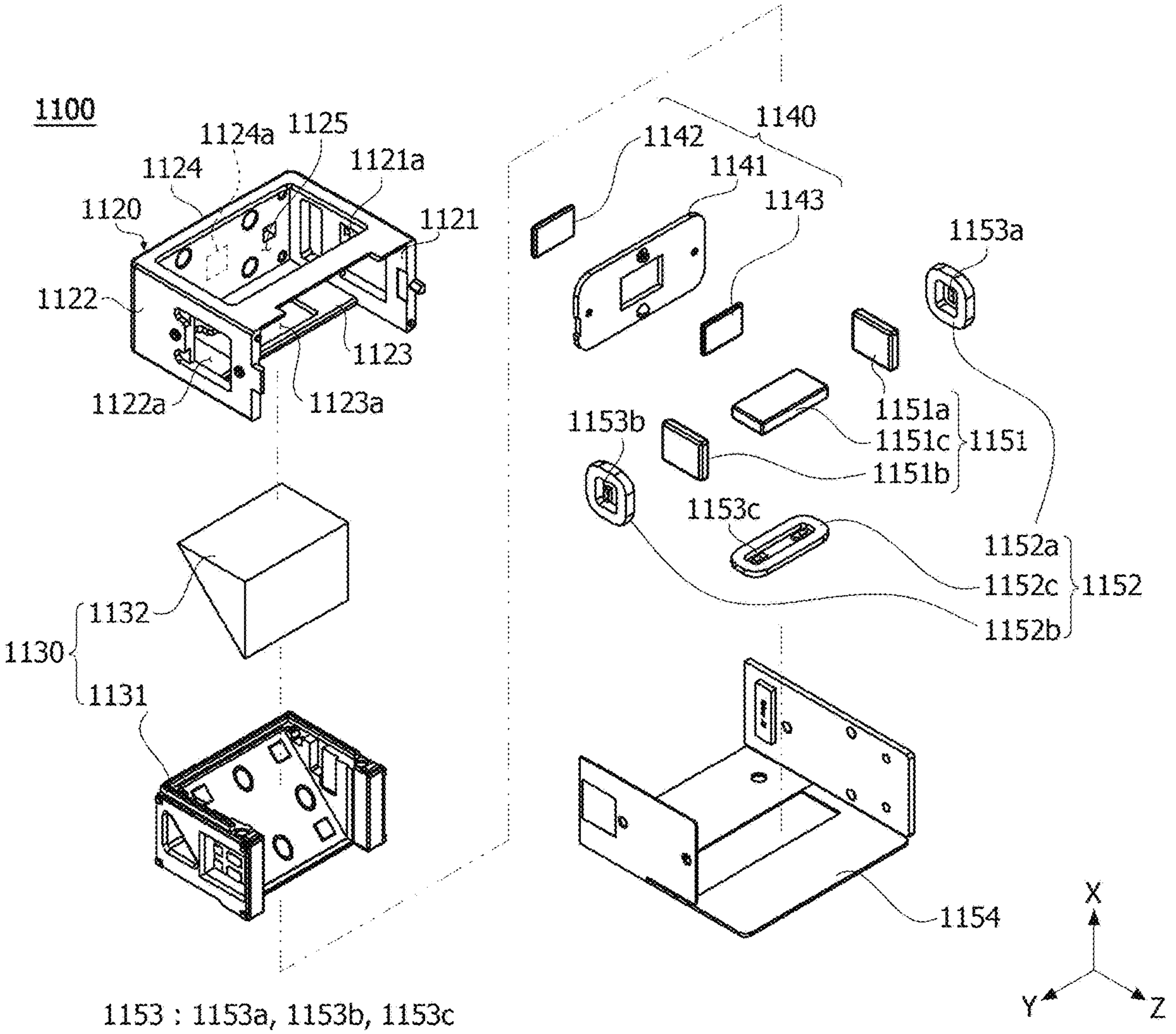
FIG. 4 is an exploded perspective view of a first camera actuator according to an embodiment.

FIG. 4 is an exploded perspective view of a first camera actuator according to an embodiment.

Referring to FIG. 4, the first camera actuator 1100 according to an embodiment includes a first shield can (not shown), a first housing 1120, a mover 1130, a rotation unit 1140, and a second optical driving unit 1150.

The mover 1130 may include a holder 1131 and an optical member 1132 disposed in the holder 1131. The rotation unit 1140 includes a tilting guide unit 1141, a first magnetic body 1142 having a coupling force with the tilting guide unit 1141, and a second magnetic body 1143 positioned in the tilting guide unit 1141. The second optical driving unit 1150 includes a second optical driving magnet 1151, a second optical driving coil 1152, a fourth Hall sensor unit 1153, and a first substrate unit 1154.

The first shield can (not shown) may be positioned on the outermost of the first camera actuator 1100 to surround the rotation unit 1140 and the second optical driving unit 1150, which will be described later.

The first shield can (not shown) may block or reduce electromagnetic waves generated from the outside. Therefore, the occurrence of a malfunction in the rotation unit 1140 or the second optical driving unit 1150 may be reduced.

The first housing 1120 may be located inside the first shield can (not shown). In addition, the first housing 1120 may be located inside the first substrate unit 1154 to be described later. The first housing 1120 may be fitted into or fastened to the first shield can (not shown).

The first housing 1120 may be formed of a plurality of housing sides, which may include a first housing side 1121, a second housing side 1122, a third housing side 1123, and a fourth housing side 1124.

The first housing side 1121 and the second housing side 1122 may be disposed to face each other. Also, the third housing side 1123 and the fourth housing side 1124 may be disposed between the first housing side 1121 and the second housing side 1122.

The third housing side 1123 may be in contact with the first housing side 1121, the second housing side 1122, and the fourth housing side 1124. The third housing side 1123 may include a bottom surface which is a lower surface of the first housing 1120.

The first housing side 1121 may have a first housing hole 1121*a*. A third coil 1152*a* to be described later may be positioned in the third housing hole 1121*a*.

The second housing side 1122 may have a second housing hole 1122*a*. A fourth coil 1152*b* to be described later may be positioned in the second housing hole 1122*a*.

The third coil 1152*a* and the fourth coil 1152*b* may be combined with the first substrate unit 1154. In an embodiment, the third coil 1152*a* and the fourth coil 1152*b* may be electrically connected to the first substrate unit 1154 so that current may flow. This current is a component of electromagnetic force that allows the first camera actuator to tilt with respect to the X-axis.

The third housing side 1123 may have a third housing hole 1123*a*. A fifth coil 1152*c* to be described later may be positioned in the third housing hole 1123*a*. The fifth coil 1152*c* may be combined with the first substrate unit 1154. In addition, the fifth coil 1152*c* may be electrically connected to the first substrate unit 1154 so that current may flow. This current is a component of the electromagnetic force that allows the first camera actuator to tilt with respect to the Y-axis.

The fourth housing side 1124 may have a first housing recess 1124*a*. The first magnetic body 1142 to be described later may be disposed in a region corresponding to the first housing recess 1124*a*. Therefore, the first housing 1120 may be combined with the tilting guide unit 1141 by magnetic force or the like.

Depending on an embodiment, the first housing recess 1124*a* may be located on the inner surface or the outer surface of the fourth housing side 1124. Therefore, the first magnetic body 1142 may be disposed to correspond to the position of the first housing recess 1124*a*.

Further, the first housing 1120 may have a receiving space 1125 formed by the first to fourth housing sides 1121 to 1224. The mover 1130 may be positioned in the receiving space 1125.

The mover 1130 includes the holder 1131 and the optical member 1132 mounted on the holder 1131.

The holder 1131 may be placed in the receiving space 1125 of the first housing 1120. The holder 1131 may include first to fourth prism outer surfaces corresponding to the first housing side 1121, the second housing side 1122, the third housing side 1123, and the fourth housing side 1124, respectively.

A receiving recess in which the second magnetic body 1143 may be placed may be formed on the fourth prism outer surface facing the fourth housing side 1124.

The optical member 1132 may be mounted on the holder 1131. To this end, the holder 1131 may have a mounting surface, which may be formed by the receiving recess. The optical member 1132 may include a reflector disposed therein. However, this is not a limitation. The optical member 1132 may reflect light reflected from the outside (e.g., an object) into the camera device. In other words, the optical member 1132 may change a path of reflected light, thereby improving a spatial limitation of the first and second camera actuators. Accordingly, the camera device may provide a high range of magnifications by extending the optical path while minimizing thickness.

The rotation unit 1140 includes the tilting guide unit 1141, the first magnetic body 1142 having a coupling force with the tilting guide unit 1141, and the second magnetic body 1143 positioned in the tilting guide unit 1141.

The tilting guide unit 1141 may be combined with the mover 1130 and the first housing 1120, which are described above. The tilting guide unit 1141 may include additional magnetic bodies (not shown) positioned therein.

The tilting guide unit 1141 may be disposed adjacent to the optical axis. Thus, the actuator according to an embodiment may easily change the optical path depending on first and second axis tilts to be described later.

The tilting guide unit 1141 may include first protrusions disposed to be spaced apart in the first direction (X-axis direction), and second protrusions disposed to be spaced apart in the second direction (Y-axis direction). The first protrusion and the second protrusion may protrude in opposite directions. A detailed description thereof will be given later.

The first magnetic body 1142 may include a plurality of yokes, and the plurality of yokes may be positioned to face one another with respect to the tilting guide unit 1141. In an embodiment, the first magnetic body 1142 may be formed of a plurality of yokes facing one another. The tilting guide unit 1141 may be located between the plurality of yokes.

The first magnetic body 1142 may be located in the first housing 1120 as described above. Also, as described above, the first magnetic body 1142 may be placed on the inner or outer surface of the fourth housing side 1124. For example, the first magnetic body 1142 may be placed in a recess formed on the outer surface of the fourth housing side 1124. Alternatively, the first magnetic body 1142 may be placed in the above-described first housing recess 1124*a*.

The second magnetic body 1143 may be located on the outer surface of the mover 1130, particularly, the holder 1131. With this configuration, the tilting guide unit 1141 may be easily combined with the first housing 1120 and the mover 1130 by a magnetic force between the second magnetic body 1143 and the first magnetic body 1142. In the present invention, the positions of the first magnetic body 1142 and the second magnetic body 1143 may be changed to each other.

The second optical driving unit 1150 includes the second optical driving magnet 1151, the second optical driving coil 1152, the fourth Hall sensor unit 1153, and the first substrate unit 1154.

The second optical driving magnet 1151 may include a plurality of magnets. In an embodiment, the second optical driving magnet 1151 may include a third magnet 1151*a*, a fourth magnet 1151*b*, and a fifth magnet 1151*c*.

The third magnet 1151*a*, the fourth magnet 1151*b*, and the fifth magnet 1151*c* each may be located on the outer surfaces of the holder 1131. The third magnet 1151*a* and the fourth magnet 1151*b* may be positioned to face each other. In addition, the fifth magnet 1151*c* may be located on the lower surface among the outer surfaces of the holder 1131. A detailed description thereof will be given later.

The second optical driving coil 1152 may include a plurality of coils. In an embodiment, the second optical driving coil 1152 may include a third coil 1152*a*, a fourth coil 1152*b*, and a fifth coil 1152*c*.

The third coil 1152*a* may be positioned to face the third magnet 1151*a*. Therefore, the third coil 1152*a* may be located in the first housing hole 1121*a* of the first housing side 1121 as described above.

The fourth coil 1152*b* may be positioned to face the fourth magnet 1151*b*. Therefore, the fourth coil 1152*b* may be located in the second housing hole 1122*a* of the second housing side 1122 as described above.

The third coil 1152*a* may be positioned to face the fourth coil 1152*b*. That is, the third coil 1152*a* and the fourth coil 1152*b* may be symmetrically positioned with respect to the first direction (X-axis direction). This may be equally applied to the third magnet 1151*a* and the fourth magnet 1151*b*. That is, the third magnet 1151*a* and the fourth magnet 1151*b* may be symmetrically positioned with respect to the first direction (X-axis direction). In addition, the third coil 1152*a*, the fourth coil 1152*b*, the third magnet 1151*a*, and the fourth magnet 1151*b* may be disposed to overlap at least in part in the second direction (Y-axis direction). With this configuration, the X-axis tilting may be accurately performed without inclination to one side due to –> despite of the electromagnetic force between the third coil 1152*a* and the third magnet 1151*a* and the electromagnetic force between the fourth coil 1152*b* and the fourth magnet 1151*b*.

The fifth coil 1152*c* may be positioned to face the fifth magnet 1151*c*. Therefore, the fifth coil 1152*c* may be positioned in the third housing hole 1123*a* of the third housing side 1123 as described above. The fifth coil 1152*c* may cause the mover 1130 and the rotation unit 1140 to perform an Y-axis tilting with respect to the first housing 1120 by generating the electromagnetic force along with the fifth magnet 1151*c*.

Here, an X-axis tilting refers to tilting based on the X-axis, and a Y-axis tilting refers to tilting based on the Y-axis.

The fourth Hall sensor unit 1153 may include a plurality of Hall sensors. A Hall sensor corresponds to and is used interchangeably with a ‘sensor unit’ to be described later. In an embodiment, the fourth Hall sensor unit 1153 may include a third Hall sensor 1153*a*, a fourth Hall sensor 1153*b*, and a fifth Hall sensor 1153*c*.

The third Hall sensor 1153*a* may be located inside the third coil 1152*a*. And the fourth Hall sensor 1153*b* may be symmetrically disposed with the third Hall sensor 1153*a* with respect to the first direction (X-axis direction) and the third direction (Z-axis direction). Further, the fourth Hall sensor 1153*b* may be located inside the fourth coil 1152*b*.

The third Hall sensor 1153*a* may detect a change in magnetic flux inside the third coil 1153*a*. And the fourth Hall sensor 1153*b* may detect a change in magnetic flux inside the fourth coil 1152*b*. Therefore, position sensing between the third and fourth magnets 1151*a* and 1151*b* and the third and fourth Hall sensors 1153*a* and 1153*b* may be performed. The first camera actuator according to an embodiment may control a more accurate X-axis tilting, for example, by detecting the position through the third and fourth Hall sensors 1153*a* and 1153*b*.

Further, the fifth Hall sensor 1153*c* may be located inside the fifth coil 1152*c*. The fifth Hall sensor 1153*c* may detect a change in magnetic flux inside the fifth coil 1152*c*. Therefore, the position sensing between the fifth magnet 1151*c* and the fifth Hall sensor 1153*bc* may be performed. Through this, the first camera actuator according to an embodiment may control the Y-axis tilting. Each of the first to fifth Hall sensors may be provided with at least one.

The first substrate unit 1154 may be located under the second optical driving unit 1150. The first substrate unit 1154 may be electrically connected to the second optical driving coil 1152 and the fourth Hall sensor unit 1153. For example, the first substrate unit 1154 may be coupled with the second optical driving coil 1152 and the fourth Hall sensor unit 1153 by a SMT (Surface Mounting Technology). However, this is not a limitation.

The first substrate unit 1154 may be positioned between and combined with the first shield can (not shown) and the first housing 1120. Various combining manners may be made as described above. Through such combining, the second optical driving coil 1152 and the fourth Hall sensor unit 1153 may be located on the outer surface of the first housing 1120.

The first substrate unit 1154 may include a circuit board having wiring patterns for electrical connection, such as a rigid printed circuit board (Rigid PCB), a flexible printed circuit board (Flexible PCB), or a rigid flex printed circuit board (RigidFlexible PCB). However, these types are not construed as a limitation.

Figure 5:
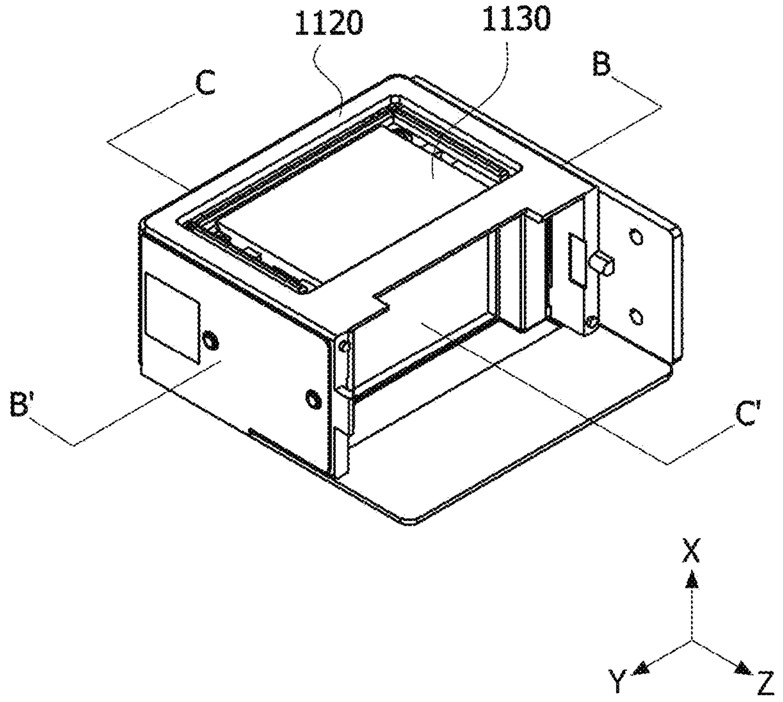
FIG. 5 is a perspective view of a first camera actuator from which a first shield can and a substrate are removed, according to an embodiment.
Figure 6A:
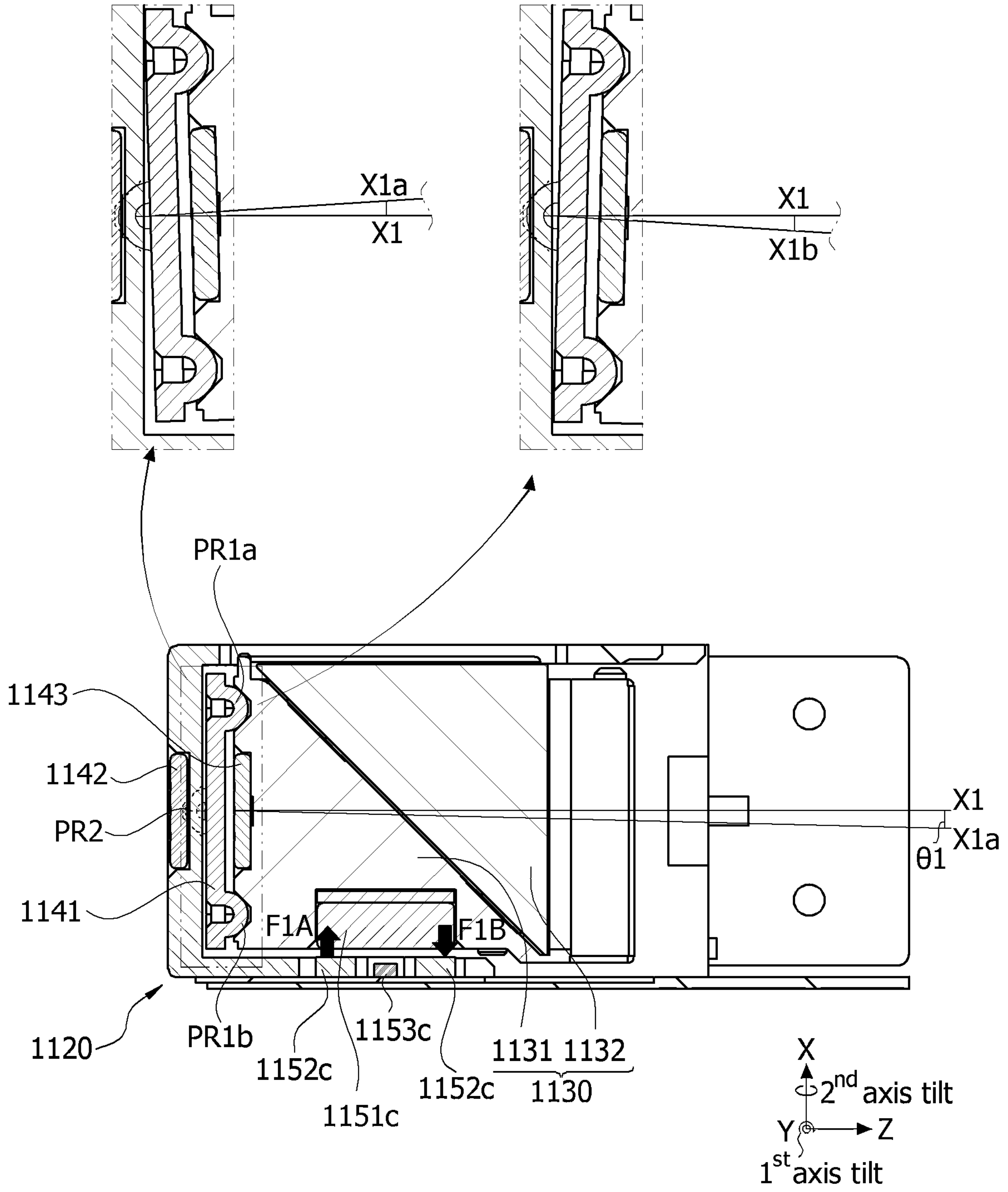
FIG. 6*a* is a cross-sectional view taken along lines B-B' in FIG. 5.
Figure 6B:
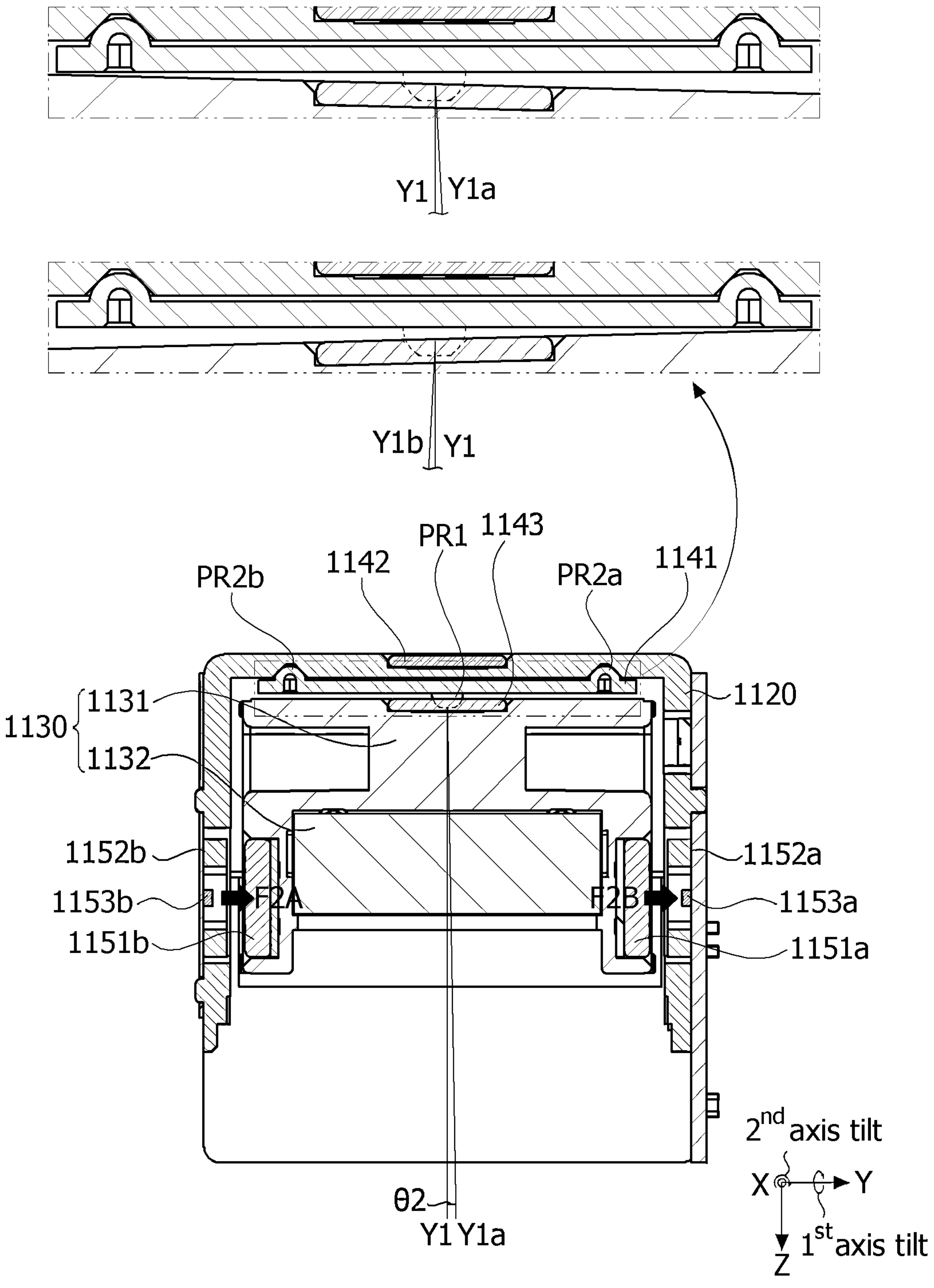
FIG. 6*b* is a cross-sectional view taken along lines C-C' in FIG. 5.

FIG. 5 is a perspective view of a first camera actuator from which a first shield can and a substrate are removed, according to an embodiment, FIG. 6*a* is a cross-sectional view taken along lines B-B' in FIG. 5, and FIG. 6*b* is a cross-sectional view taken along lines C-C' in FIG. 5.

FIG. 5 is a perspective view of a first camera actuator from which a shield can and a substrate are removed, according to an embodiment, FIG. 6*a* is a cross-sectional view taken along lines BB' in FIG. 5, and FIG. 6*b* is a cross-sectional view taken along lines CC' in FIG. 5.

Referring to FIGS. 5 to 6*b*, the third coil 1152*a* may be positioned on the first housing side 1121.

The third coil 1152*a* and the third magnet 1151*a* may be positioned to face each other. The third magnet 1151*a* may overlap the third coil 1152*a* at least in part in the second direction (Y-axis direction).

Also, the fourth coil 1152*b* may be positioned on the second housing side 1122. Therefore, the fourth coil 1152*b* and the fourth magnet 1151*b* may be positioned to face each other. The fourth magnet 1151*b* may overlap the fourth coil 1152*b* at least in part in the second direction (Y-axis direction).

In addition, the third coil 1152*a* and the fourth coil 1152*b* may overlap in the second direction (Y-axis direction), and the third magnet 1151*a* and the fourth magnet 1151*b* may overlap in the second direction (Y-axis direction). With this configuration, the electromagnetic force applied to the outer surfaces of the holders (a first holder outer surface and a second holder outer surface) are located on the parallel axis in the second direction (Y-axis direction), so that the X-axis tilting may be performed accurately and precisely.

In addition, a first receiving groove (not shown) may be formed on a fourth holder outer surface. Also, first protrusions PR1*a* and PR1*b* may be disposed in the first receiving groove. Therefore, in the case of performing the X-axis tilting, the first protrusions PR1*a* and PR1*b* may be a reference axis (or a rotation axis) of the tilt. Accordingly, the tilting guide unit 1141 and the mover 1130 may move left and right.

A second protrusion PR2 may be placed in the recess of the inner surface of the fourth housing side 1124 as described above. In the case of performing the Y-axis tilting, the tilting guide unit and the mover may rotate with the second protrusion PR2 as a reference axis of the Y-axis tilting.

According to an embodiment, the OIS may be performed by the first and second protrusions.

Referring to FIG. 6*a*, the Y-axis tilting may be performed. That is, the OIS may be implemented through rotation in the first direction (X-axis direction).

In an embodiment, the fifth magnet 1151*c* disposed under the holder 1131 may cause the mover 1130 to tilt or rotate in the first direction (X-axis direction) by forming the electromagnetic force with the fifth coil 1152*c*.

Specifically, the tilting guide unit 1141 may be combined with the first housing 1120 and the mover 1130 by the first magnetic body 1142 in the first housing 1120 and the second magnetic body 1143 in the mover 1130. The first protrusions PR1 may then be spaced apart from each other in the first direction (X-axis direction) and supported by the first housing 1120.

And then, the tilting guide unit 1141 may be rotated or tilted with the second protrusion PR2, protruding toward the mover 1130, as a reference axis (or a rotation axis). That is, the tilting guide unit 1141 may perform the Y-axis tilting with respect to the second protrusion PR2 as a reference axis.

For example, the OIS may be implemented by causing the first electromagnetic forces F1A and F1B between the fifth magnet 1151*c* disposed in a third receiving recess and the fifth coil 1152*c* disposed on a third substrate side to rotate the mover 1130 (from X1 to X1*a* or X1*b*) at a first angle θ1 in the X-axis direction. The first angle θ1 may be ±1° to ±3°. However, this is not a limitation.

The first camera actuator according to various embodiments may generate the electromagnetic force in the described direction to move the mover, or to move the mover in the described direction even if the electromagnetic force is generated in the other directions. That is, the described direction at which the electromagnetic force is generated refers to the direction of an energy power which is generated by the magnet and the coil and causes to move the mover.

Referring to FIG. 6*b*, the X-axis tilting may be performed. That is, the OIS may be implemented through rotation in the second direction (Y-axis direction).

The OIS may be implemented by tilting or rotating (or performing the X-axis tilting of) the mover 1130 in the Y-axis direction.

In an embodiment, the third magnet 1151*a* and the fourth magnet 1151*b* disposed in the holder 1131 form the electromagnetic forces with the third coil 1152*a* and the fourth coil 1152*b*, respectively, thereby tilting or rotating the tilting guide unit 1141 and the mover 1130 in the second direction (Y-axis direction).

The tilting guide unit 1141 may rotate or tilt (or may perform the X-axis tilting on) the first protrusion PR1 in the second direction with the first protrusion PR1 as a reference axis (or a rotation axis).

For example, the OIS may be implemented by causing the second electromagnetic forces F1A and F1B between the third and fourth magnets 1151*a* and 1151*b* disposed in the first receiving recess and the third and fourth coils 1152*a* and 1152*b* disposed on a second substrate side to rotate the mover 1130 (from X1 to X1*a* or X1*b*) at a second angle θ1 in the X-axis direction. The second angle θ2 may be ±1° to ±3°. However, this is not a limitation.

Also, the electromagnetic force generated by the third and fourth magnets 1151*a*, 1151*b* and the third and fourth coils 1152*a*, 1152*b* may act in the third direction or in a direction opposite to the third direction. For example, the electromagnetic force may act in the third direction (Z-axis direction) at the left side of the mover 1130, and may act in the direction opposite to the third direction (Z-axis direction) at the right side of the mover 1130. As a result, the mover 1130 may rotate with respect to the first direction. Alternatively, it may move along the second direction.

As described above, the first camera actuator according to an embodiment may control the rotation of the tilting guide unit 1141 and the mover 1130 in the first direction (X-axis direction) or the second direction (Y-axis direction) by using the electromagnetic force between the second optical driving magnet in the holder and the second optical driving coil disposed in the housing, thereby minimizing the occurrence of a decenter or tilt phenomenon in the OIS implementation and providing the best optical properties. In addition, as described above, the 'Y-axis tilting' corresponds to the rotation or tilt in the first direction (X-axis direction), and the 'X-axis tilting' corresponds to the rotation or tilt in the second direction (Y-axis direction).

Figure 7A:
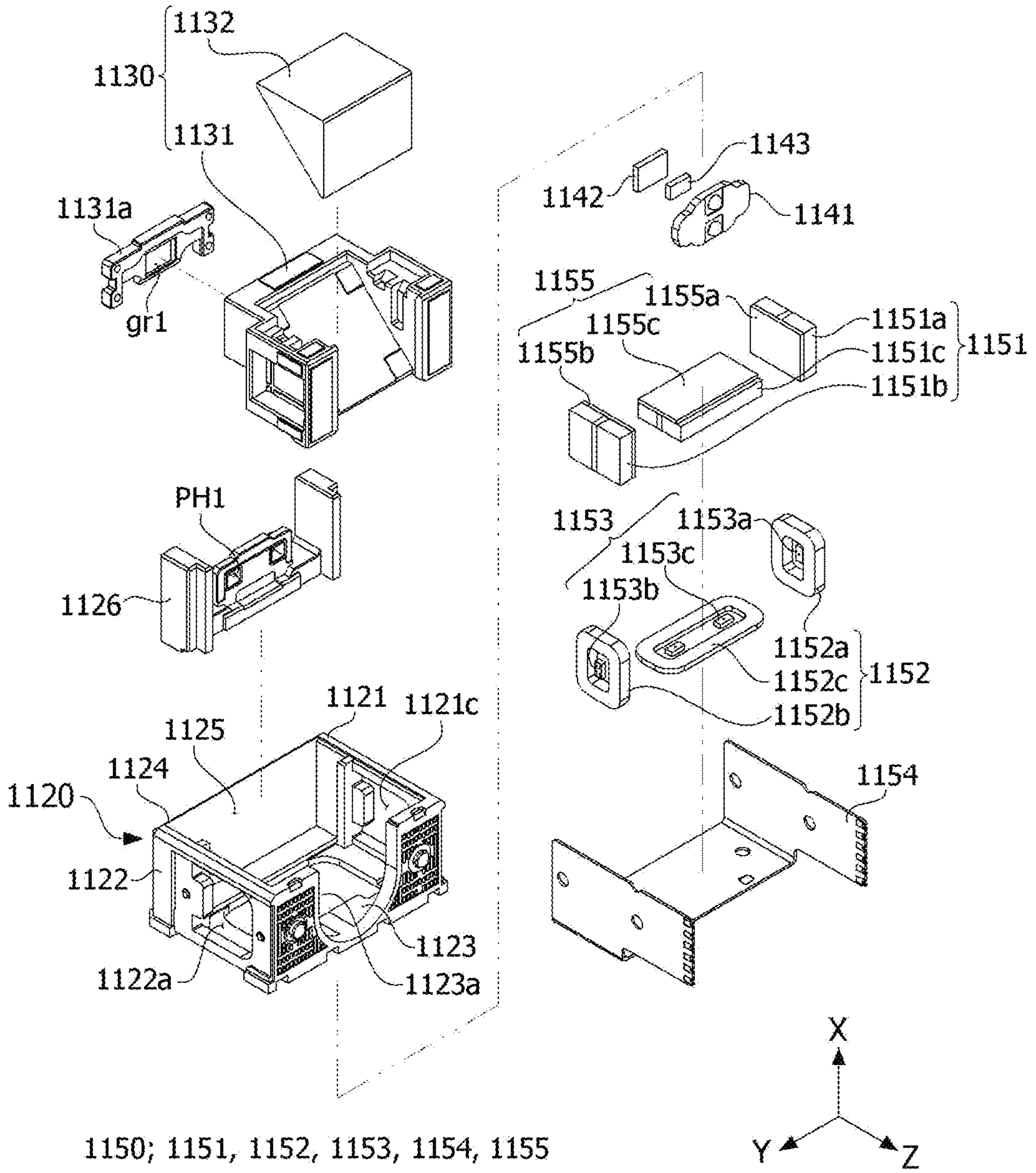
FIG. 7*a* is an exploded perspective view of a first camera actuator according to another embodiment.
Figure 7B:
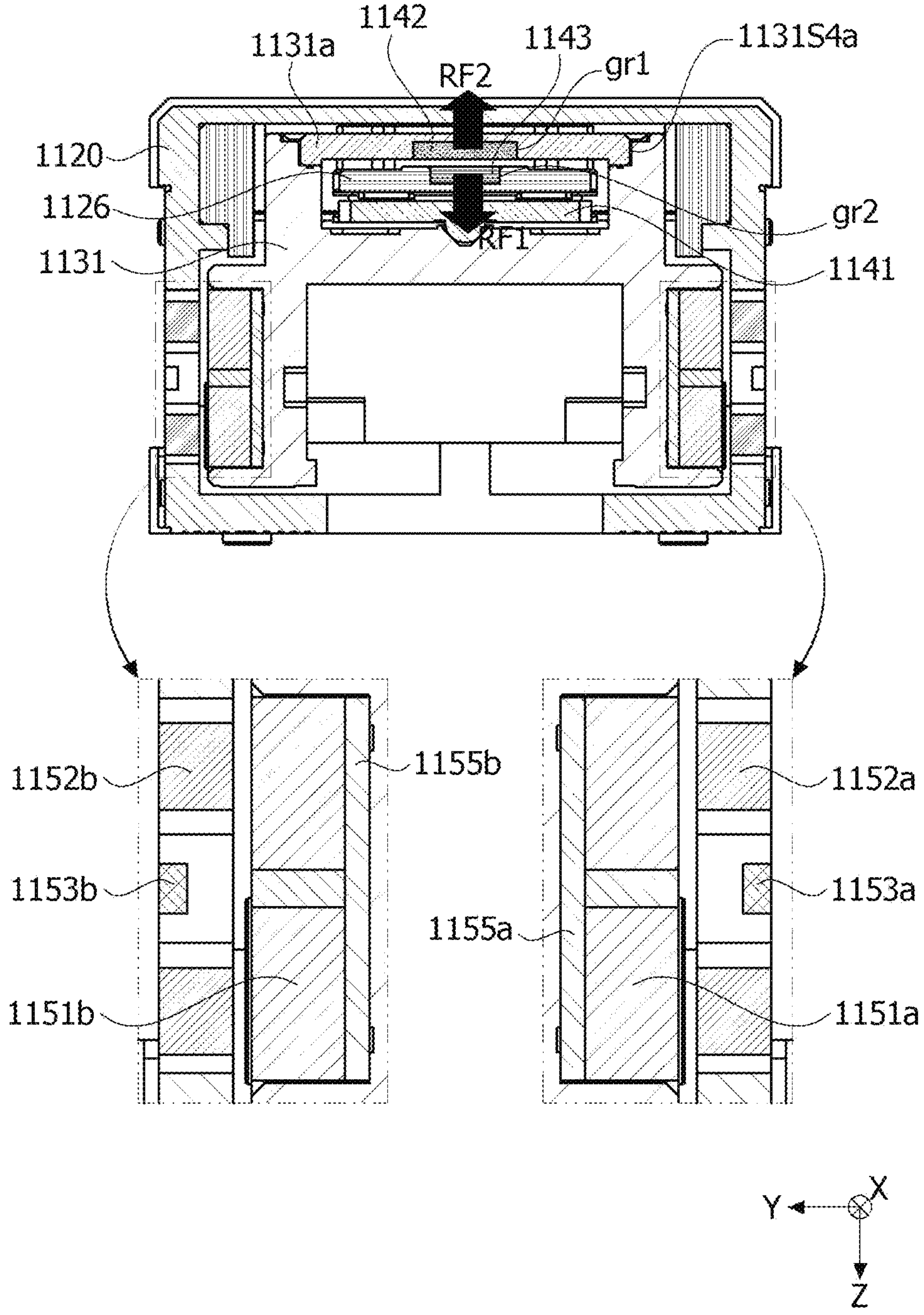
FIG. 7*b* is a cross-sectional view of a first camera actuator according to another embodiment.
Figure 7C:
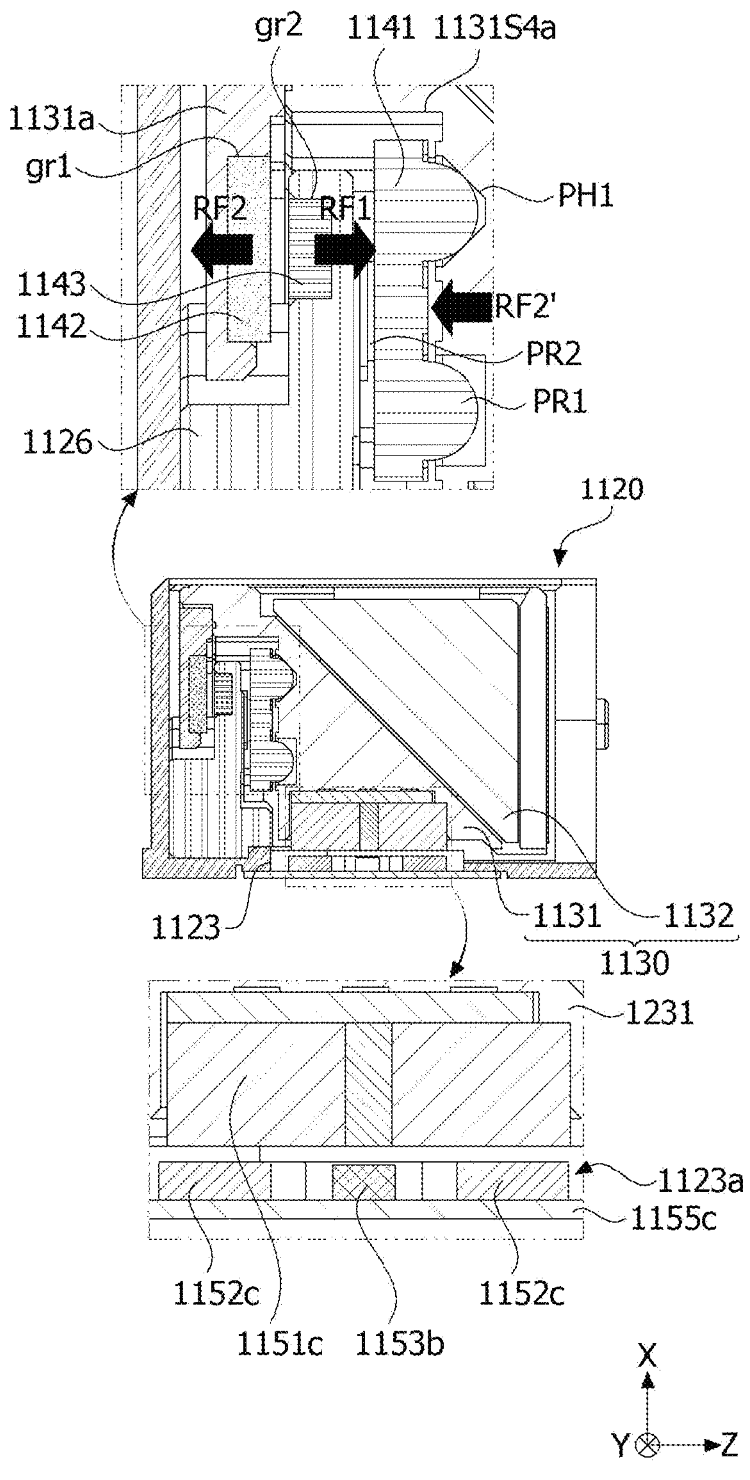
FIG. 7*c* is another cross-sectional view of a first camera actuator according to another embodiment.

FIG. 7*a* is an exploded perspective view of a first camera actuator according to another embodiment, FIG. 7*b* is a cross-sectional view of a first camera actuator according to another embodiment, and FIG. 7*c* is another cross-section view of a first camera actuator according to another embodiment.

Referring to FIGS. 7*a* to 7*c*, a first camera actuator 1100 according to another embodiment includes a first housing 1120, a mover 1130, a rotation unit 1140, a second optical driving unit 1150, a first member 1126, and a second member 1131*a*.

The mover 1130 may include a holder 1131 and an optical member 1132 disposed in the holder 1131. Also, the mover 1130 may be disposed in the housing 1120. The rotation unit 1140 may include a tilting guide unit 1141, and the second magnetic body 1142 and the first magnetic body 1143 having different polarities to press the tilting guide unit 1141. The first magnetic body 1143 and the second magnetic body 1142 may be different each other in sizes. In an embodiment, the first magnetic body 1143 may be larger in size than the second magnetic body 1142. For example, the first magnetic body 1143 and the second magnetic body 1142 may have the same length in an optical axis direction or a third direction (Z-axis direction), and may have different areas in the first and second directions. In this case, the area of the first magnetic body 1143 may be larger than that of the second magnetic body 1142. In addition, the second optical driving unit 1150 includes a second optical driving magnet 1151, a second optical driving coil 1152, a Hall sensor unit 1153, a first substrate unit 1154, and a yoke unit 1155.

The first camera actuator 1100 may include shield can (not shown). The shield can (not shown) may be positioned on the outermost of the first camera actuator 1100 to surround the rotation unit 1140 and the second optical driving unit 1150, which will be described later.

This shield can (not shown) may block or reduce electromagnetic waves generated from the outside. That is, the shield can (not shown) may reduce the occurrence of a malfunction in the rotating unit 1140 or the second optical driving unit 1150.

The first housing 1120 may be located inside the shield can (not shown). When there is no shield can, the first housing 1120 may be located on the outermost of the first camera actuator.

In addition, the first housing 1120 may be located inside the first substrate unit 1154 to be described later. The first housing 1120 may be fitted into or fastened to the shield can (not shown).

The first housing 1120 may include a first housing side 1121, a second housing side 1122, a third housing side 1123, and a fourth housing side 1124. A detailed description thereof will be given later.

The first member 1126 may be disposed in the first housing 1120. The first member 1126 may be disposed between the second member 1131*a* and the housing. The first member 1126 may be disposed in the housing or located on one side of the housing. This will be described later.

The mover 1130 includes the holder 1131 and the optical member 1132 disposed in the holder 1131.

The holder 1131 may be placed in the receiving space 1125 of the first housing 1120. The holder 1131 may include first to fourth holder outer surfaces corresponding to the first housing side 1121, the second housing side 1122, the third housing side 1123, and the first member 1126, respectively. For example, the first to fourth holder outer surfaces may correspond to or face the inner surfaces of the first housing side 1121, the second housing side 1122, the third housing side 1123, and the first member 1126, respectively.

Further, the holder 1131 may include the second member 1131*a* disposed in a fourth seating groove. A detailed description thereof will be given later.

The optical member 1132 may be mounted on the holder 1131. To this end, the holder 1131 may have a mounting surface, which may be formed by the receiving recess. In an embodiment, the optical member 1132 may be formed of mirrors or prisms. Hereinafter, although the prisms are illustrated, the optical member may be composed of a plurality of lenses as in the above described embodiment. Alternatively, the optical member 1132 may be composed of a plurality of lenses and prisms or mirrors. The optical member 1132 may also include a reflector disposed therein. However, this is not a limitation.

The optical member 1132 may reflect light reflected from the outside (e.g., an object) into the camera module. In other words, the optical member 1132 may change a path of reflected light, thereby improving a spatial limitation of the first and second camera actuators. Accordingly, the camera module may provide a high range of magnifications by extending the optical path while minimizing thickness.

Additionally, the second member 1131*a* may be combined with the holder 1131. The second member 1131*a* may be disposed outside the holder 1131 and inside the housing. In addition, the second member 1131*a* may be seated in an additional groove located in an area other than the fourth seating groove on the fourth holder outer surface of the holder 1131. Accordingly, the second member 1131*a* may be combined with the holder 1131, and at least a portion of the first member 1126 may be positioned between the second member 1131*a* and the holder 1131. For example, at least a portion of the first member 1126 may pass through a space formed between the second member 1131*a* and the holder 1131.

Further, the second member 1131*a* may have a structure separated from the holder 1131. With this configuration, assembling the first camera actuator may be easily performed as will described later. Alternatively, although the second member 1131*a* may have a structure integrally formed with the holder 1131, but the description therefor will be focused on the separated structure.

The rotation unit 1140 includes the tilting guide unit 1141, and the second magnetic body 1142 and the first magnetic body 1143 having different polarities to press the tilting guide unit 1141.

The tilting guide unit 1141 may be combined with the mover 1130 and the first housing 1120, which are described above. Specifically, the tilting guide unit 1141 may be disposed between the holder 1131 and the first member 1126. Thus, the tilting guide unit 1141 may be combined with the mover 1130 and the first housing 1120. However, unlike the above description, in this embodiment, the tilting guide unit 1141 may be disposed between the first member 1126 and the holder 1131. Specifically, the tilting guide unit 1141 may be located between the first member 1126 and the fourth seating groove of the holder 1131.

In addition, the second magnetic body 1142 and the first magnetic body 1143 may be seated in a first groove gr1 formed in the second member 1131*a* and a second groove gr2 formed in the first member 1126, respectively. In this embodiment, the first and second grooves gr1 and gr2 may be placed in different positions from the first and second grooves described in the forgoing other embodiments. However, the first groove gr1 is formed on the second member 1131*a* and moves integrally with the holder, and the second groove gr2 is formed on the first member 1126, which is coupled to the first housing 1120, corresponding to the first groove gr1. Herein these contents will be described interchangeably.

The tilting guide unit 1141 may be disposed adjacent to the optical axis. Accordingly, the actuator according to another embodiment may easily change the optical path depending on first and second axis tilts to be described later.

The tilting guide unit 1141 may include first protrusions disposed to be spaced apart in the first direction (X-axis direction), and second protrusions disposed to be spaced apart in the second direction (Y-axis direction). The first protrusion and the second protrusion may protrude in opposite directions. A detailed description thereof will be given later. The first protrusions may protrude toward the mover. The first protrusions may also extend in an optical axis direction or a third direction (Z-axis direction) from the base. In addition, the second protrusions may protrude in a direction opposite to the first protrusions. That is, the second protrusions may extend in a direction opposite to the optical axis direction or in a direction opposite to the third direction (Z-axis direction). Also, the second protrusion may extend toward the first member 1126 or the housing 1120.

As described above, the second magnetic body 1142 may be located in the second member 1131*a*. And the first magnetic body 1143 may be located in the first member 1126.

The second magnetic body 1142 and the first magnetic body 1143 may have the same polarity. For example, the second magnetic body 1142 may be a magnet having an N-pole, and the first magnetic body 1143 may be a magnet having an N-pole. Alternatively, conversely, the second magnetic body 1142 may be a magnet having an S-pole, and the first magnetic body 1143 may be a magnet having an S-pole.

For example, the first pole surface of the first magnetic body 1143 and the second pole surface of the second magnetic body 1142 facing the first pole surface may have the same polarity.

The second magnetic body 1142 and the first magnetic body 1143 may generate a repulsive force between them due to the polarities described above. With this configuration, the above described repulsive force may be applied to the second member 1131*a* combined with the second magnetic body 1142 or the holder 1131, and the first member 1126 combined with the first magnetic body 1143 or the first housing 1120. In this case, the repulsive force applied to the second member 1131*a* may be transferred to the holder 1131 combined with the second member 1131*a*. Accordingly, the tilting guide unit 1141 disposed between the second member 1131*a* and the first member 1126 may be pressed by the repulsive force. That is, the repulsive force may maintain a state in which the tilting guide unit 1141 is located between the holder 1131 and the first housing 1120 (or the first member 1126). With this configuration, the position between the mover 1130 and the first housing 1120 may be maintained even when the X-axis tilt or the Y-axis tilt is performed. In addition, the tilting guide unit may be in close contact with the first member 1126 and the holder 1131 due to repulsive force between the first magnetic body 1143 and the second magnetic body 1142. The tilting guide unit 1141 may guide the tilting of the mover 1130.

The second optical driving unit 1150 includes the second optical driving magnet 1151, the second optical driving coil 1152, the Hall sensor unit 1153, the first substrate unit 1154, and the yoke unit 1155. The contents which have been described above may be equally applied except for the contents described in this embodiment.

The third coil 1152*a* may be positioned on the first housing side 1121, and the third magnet 1151*a* may be positioned on a first holder outer surface 1131S1 of the holder 1131. The third coil 1152*a* and the third magnet 1151*a* may be positioned to face each other. The third magnet 1151*a* may overlap the third coil 1152*a* at least in part in the second direction (Y-axis direction).

In addition, the fourth coil 1152*b* may be positioned on the second housing side 1122, and the fourth magnet 1151*b* may be positioned on a second holder outer surface 1131S2 of the holder 1131. Therefore, the fourth coil 1152*b* and the fourth magnet 1151*b* may be positioned to face each other. The fourth magnet 1151*b* may overlap the fourth coil 1152*b* at least in part in the second direction (Y-axis direction).

In addition, the third coil 1152*a* and the fourth coil 1152*b* may overlap in the second direction (Y-axis direction), and the third magnet 1151*a* and the fourth magnet 1151*b* may overlap in the second direction (Y-axis direction).

With this configuration, the electromagnetic force applied to the outer surfaces of the holders (a first holder outer surface and a second holder outer surface) are exerted on the parallel axis in the second direction (Y-axis direction), so that the X-axis tilting may be performed accurately and precisely.

Also, the second protrusions PR2*a* and PR2*b* of the tilting guide unit 1141 may come into contact with the first member 1126 of the first housing 1120. The second protrusion PR2 may be seated in the second protruding groove PH2 formed on one side of the first member 1126. In the case of performing the X-axis tilt, the second protrusions PR2*a* and PR2*b* may be a reference axis (or a rotation axis) for the tilt. Accordingly, the tilting guide unit 1141 and the mover 1130 may move along the second direction.

In addition, the third Hall sensor 1153*a* may be positioned outside for electrical connection and coupling with the first substrate unit 1154 as described above. However, it is not limited to this position.

In addition, the second coil 1152*c* may be positioned on the third housing side 1123, and the fifth magnet 1151*c* may be positioned on a third holder outer surface 1131S3 of the holder 1131. The second magnet 1152*c* may overlap the fifth magnet 1151*c* at least in part in the first direction (X-axis direction). Accordingly, the intensity of the electromagnetic force between the second coil 1152*c* and the fifth magnet 1151*c* may be easily controlled.

As described above, the tilting guide unit 1141 may be positioned on the fourth holder outer surface 1131S4 of the holder 1131. In addition, the tilting guide unit 1141 may be seated in the fourth seating groove 1131S4*a* of the fourth holder outer surface. As described above, the fourth seating groove 1131S4*a* may include a first region, a second region, and a third region.

The second member 1131*a* may be positioned in the first region. That is, the first region may overlap the second member 1131*a* in the first direction (X-axis direction). In particular, the first region may be a region where the member base portion of the second member 1131*a* is located. In this case, the first region may be located on the fourth holder outer surface 1131S4. That is, the first region may correspond to a region positioned above the fourth seating groove 1131S4*a*. In this case, the first region may not be any region in the fourth seating groove 1131S4*a*.

The first member 1126 may be positioned in the second region. That is, the second region may overlap the first member 1126 in the first direction (X-axis direction).

Further, the second region may be located on the fourth holder outer surface 1131S4 like the first region. That is, the second region may correspond to a region positioned above the fourth seating groove 1131S4*a*

The tilting guide unit may be positioned in the third region. In particular, the base of the tilting guide unit may be positioned in the third region. That is, the third region may overlap the tilting guide unit (e.g., the base thereof) in the first direction (X-axis direction).

The second member 1131*a* may be disposed in the first region, and the second member 1131*a* may include the first groove gr1 formed on an inner surface thereof. In addition, the second magnetic body 1142 is disposed in the first groove gr1 as described above, and the repulsive force RF2 generated by the second magnetic body 1142 may be transmitted to the fourth seating groove 1131S4*a* of the holder 1131 through the second member 1131*a* RF2'. Accordingly, the holder 1131 may apply a force to the tilting guide unit 1141 in the same direction as the repulsive force RF2 generated by the second magnetic body 1142.

The first member 1126 may be located in the second region. The first member 1126 may include the second groove gr2 facing the first groove gr1. In addition, the first member 1126 may include the second protruding groove PH2 disposed on a surface corresponding to the second groove gr2. The repulsive force RF1 generated by the first magnetic body 1143 may be applied to the first member 1126. As a result, the first member 1126 and the second member 1131*a* may press the tilting guide unit 1141 disposed between the first member 1126 and the holder 1131 through the generated repulsive forces RF1 and RF2'. Thus, the coupling between the holder 1131, the first housing 1120, and the tilting guide unit 1141 may be maintained even after the holder is tilted in the X-axis or Y-axis by the current applied to the first and second coils, or the second coil 1152*c*.

The tilting guide unit 1141 may be located in the third region. The tilting guide unit 1141 may include the first protrusion PR1 and the second protrusion PR2, as described above. In this case, the first protrusion PR1 and the second protrusion PR2 may be disposed on the second surface 1141*b* and the first surface 1141*a* of the base, respectively. In this way, in another embodiment to be described below, the first protrusion PR1 and the second protrusion PR2 may be variously positioned on the facing surfaces of the base.

The first protruding groove PH1 may be located in the fourth seating groove 1131S4*a*. The first protrusion PR1 of the tilting guide unit 1141 may be accommodated in the first protruding groove PH1. Therefore, the first protrusion PR1 may be in contact with the first protruding groove PH1. The first protrusion groove PH1 may have a maximum diameter corresponding to a maximum diameter of the first protrusion PR1. This may be equally applied to the second protrusion groove PH2 and the second protrusion PR2. That is, the second protrusion groove PH2 may have a maximum diameter corresponding to a maximum diameter of the second protrusion PR2. Therefore, the second protrusion PR2 may be in contact with the second protrusion groove PH2. With this configuration, a first-axis tilt with respect to the first protrusion PR1 and a second-axis tilt with respect to the second protrusion PR2 may be easily performed, and a radius of the tilts may be enhanced.

In addition, the tilting guide unit 1141 may be arranged side by side with the second member 1131*a* and the first member 1126 in the third direction (Z-axis direction), so that the tilting guide unit 1141 may overlap the optical member 1132 in the first direction (X-axis direction). More specifically, in an embodiment, the first protrusion PR1 may overlap the optical member 1132 in the first direction (X-axis direction). Furthermore, at least a portion of the first protrusion PR1 may overlap the second coil 1152*c* or the fifth magnet 1151*c* in the first direction (X-axis direction). That is, in the camera actuator according to an embodiment, each protrusion, which is the central axis of the tilt, may be positioned adjacent to the center of gravity of the mover 1130. In this way, the tilting guide unit may be positioned adjacent to the center of gravity of the holder. Consequently, the camera actuator according to the embodiment may minimize the moment value for tilting the holder, and minimize the consumption of current applied to the coil units to tilt the holder, thereby improving power consumption and reliability of the device.

Furthermore, the second magnetic body 1142 and the first magnetic body 1143 may not overlap the second coil 1152*c* or the optical member 1132 in the first direction (X-axis direction). In other words, in an embodiment, the second magnetic body 1142 and the first magnetic body 1143 may be spaced apart from the second coil 1152*c* or the optical member 1132 in the third direction (Z-axis direction). Due to that, in the second coil 1152*c*, the magnetic force transmitted from the second magnetic body 1142 and the first magnetic body 1143 may be minimized. Accordingly, the camera actuator according to an embodiment may easily perform up and down driving (Y-axis tilt) and may minimize power consumption.

Furthermore, as described above, the fourth Hall sensor 1153*b* located inside the second coil 1152*c* may detect a change in magnetic flux, thereby performing position sensing between the fifth magnet 1151*c* and the fourth Hall sensor 1153*b*. In this case, the offset voltage of the fourth Hall sensor 1153*b* may be changed according to the influence of the magnetic field formed from the second magnetic body 1142 and the first magnetic body 1143.

The first camera actuator according to an embodiment may include the second member 1131*a*, the second magnetic body 1142, the first magnetic body 1143, the first member 1126, the tilting guide unit 1141, and the holder 1131 arranged in the order in the third direction. In this regard, since the second magnetic body is located in the second member and the first magnetic body is located in the first member, the second member, the first member, the tilting guide unit, and the holder may be disposed in that order.

In an embodiment, the separation distance of the second magnetic body 1142 and the first magnetic body 1143 from the holder 1131 (or the optical member 1132) in the third direction may be greater than the separation distance of the tilting guide unit 1141 from them. Therefore, the fourth Hall sensor 1153*b* under the holder 1131 may also be spaced apart from the second magnetic body 1142 and the first magnetic body 1143 by a predetermined distance. Accordingly, the influence of the magnetic field, which is formed by the second magnetic body 1142 and the first magnetic body 1143, on the fourth Hall sensor 1153*b* is minimized, thereby preventing the Hall voltage from being intensively concentrated with positive or negative charges. That is, this configuration allows the electrodes of the Hall sensor to have a range in which Hall Calibration may be performed. Furthermore, although the temperature is also affected by the electrodes of the Hall sensor and the resolution of the camera lens is varied depending on the temperature, in an embodiment, the Hall voltage may be prevented from being concentrated with positive or negative charges to compensate for the resolution of the lens accordingly, thereby easily preventing a deterioration in the resolution.

In addition, a circuit design for compensating for the offset with respect to the output (i.e., the Hall voltage) from the fourth Hall sensor 1153*b* may also be easily achieved.

Additionally, according to an embodiment, a portion of the tilting guide unit 1141 may be located outside the fourth holder outer surface of the holder 1131 compared to the fourth holder outer surface.

The tilting guide unit 1141 may be seated in the fourth settling groove 1131S4*a* with respect to the base, except for the first protrusion PR1 and the second protrusion PR2. In other words, the length of the base in the third direction (Z-axis direction) may be less than the length of the fourth seating groove 1131S4*a* in the third direction (Z-axis direction). With this configuration, miniaturization may be easily achieved.

In addition, the maximum length of the tilting guide unit 1141 in the third direction (Z-axis direction) may be greater than the length of the fourth seating groove 1131S4*a* in the third direction (Z-axis direction). Therefore, as described above, the end of the second protrusion PR2 may be positioned between the fourth holder outer surface and the first member 1126. That is, at least a portion of the second protrusion PR2 may be positioned in a direction opposite to the third direction (Z-axis direction) more than the holder 1131. In other words, the holder 1131 may be spaced apart at a predetermined distance from the end of the second protrusion PR2 (at the portion in contact with the second protrusion groove) in the third direction (Z-axis direction).

With this configuration, the second member 1131*a* may be positioned inside or surrounded by the first member 1126, hence improving space efficiency and implementing miniaturization. Furthermore, even when driving (tilt or rotation of the mover 1130) by electromagnetic force is performed, the second member 1131*a* does not protrude outside the first member 1126 so that contact with surrounding elements may be blocked. Accordingly, reliability may be improved.

In addition, a predetermined space may exist between the second magnetic body 1142 and the first magnetic body 1143. In other words, the second magnetic body 1142 and the first magnetic body 1143 may face each other with the same polarity.

Figure 8:
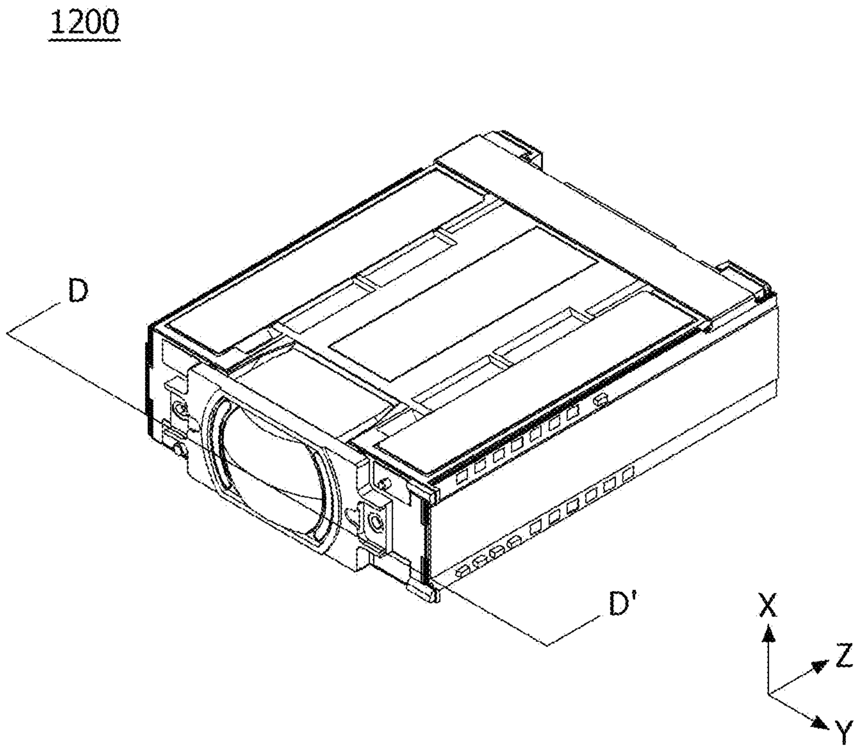
FIG. 8 is a perspective view of a second camera actuator according to an embodiment.
Figure 9:
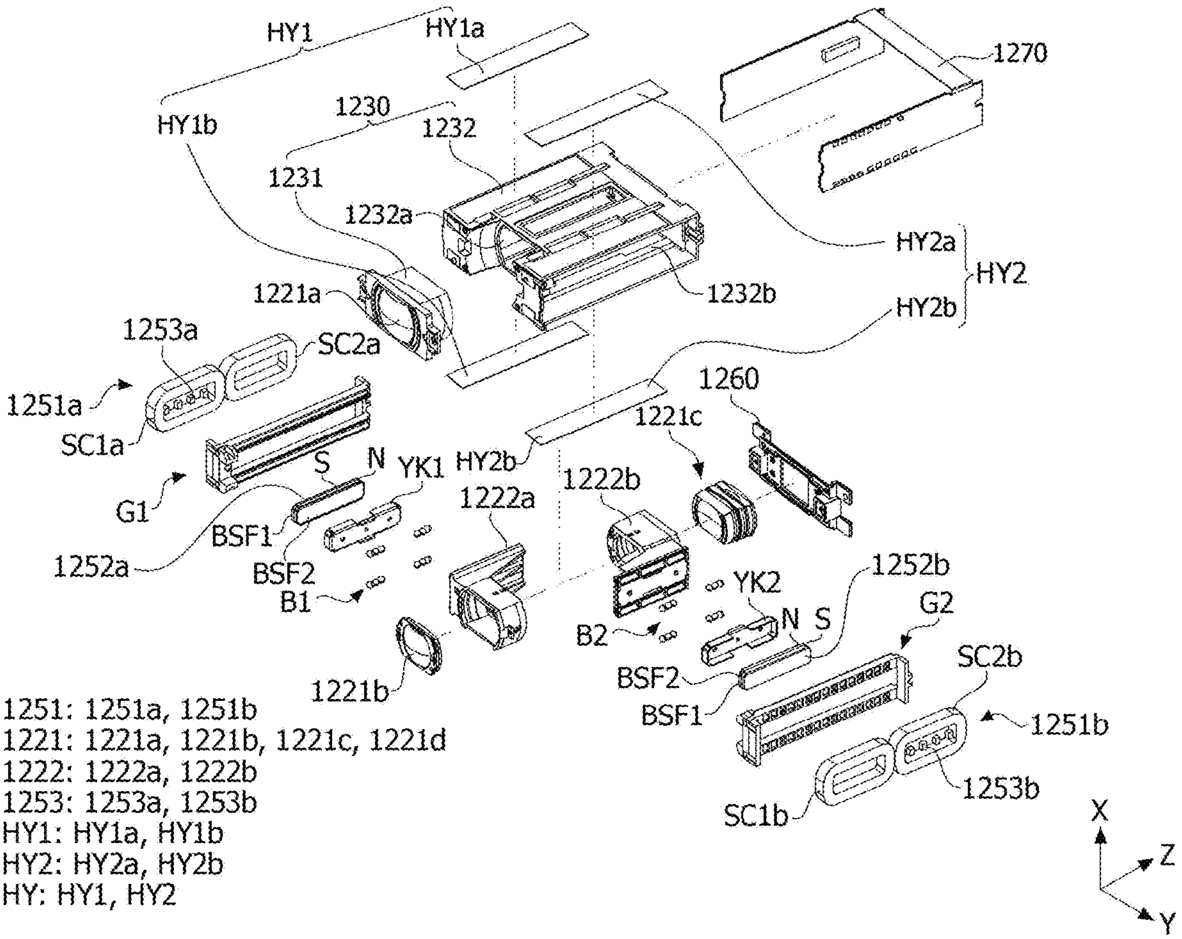
FIG. 9 is an exploded perspective view of a second camera actuator according to an embodiment.
Figure 10A:
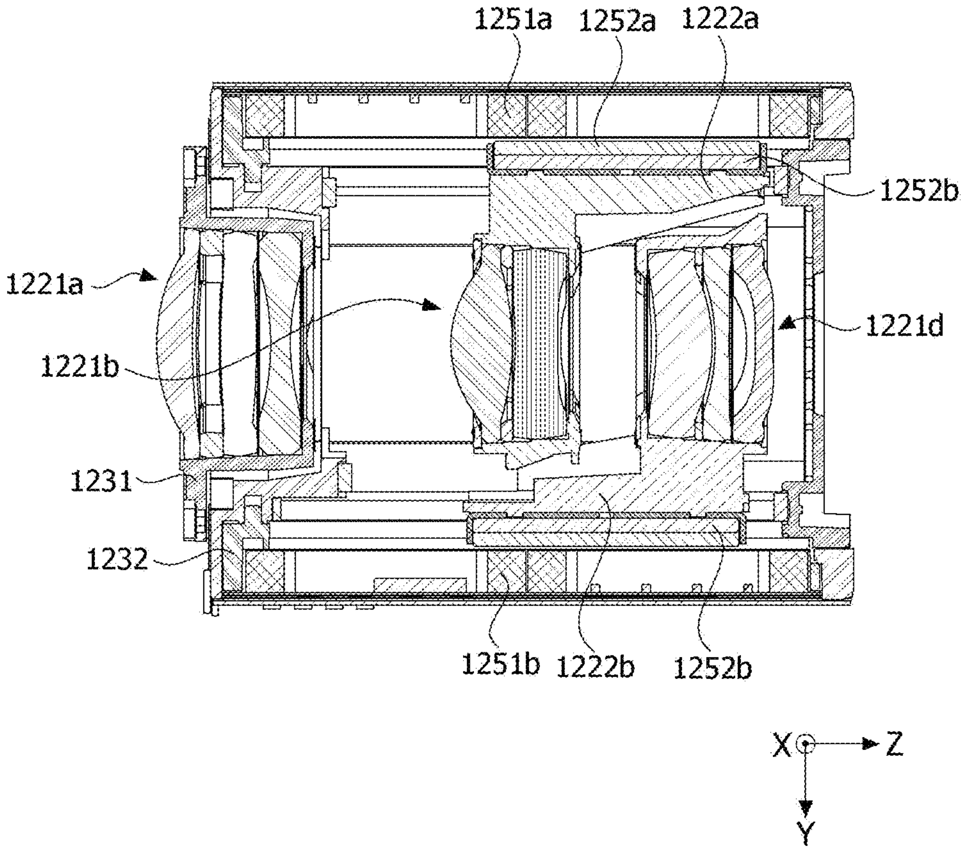
FIG. 10*a* is a cross-sectional view taken along lines D-D' in FIG. 8.
Figure 10B:
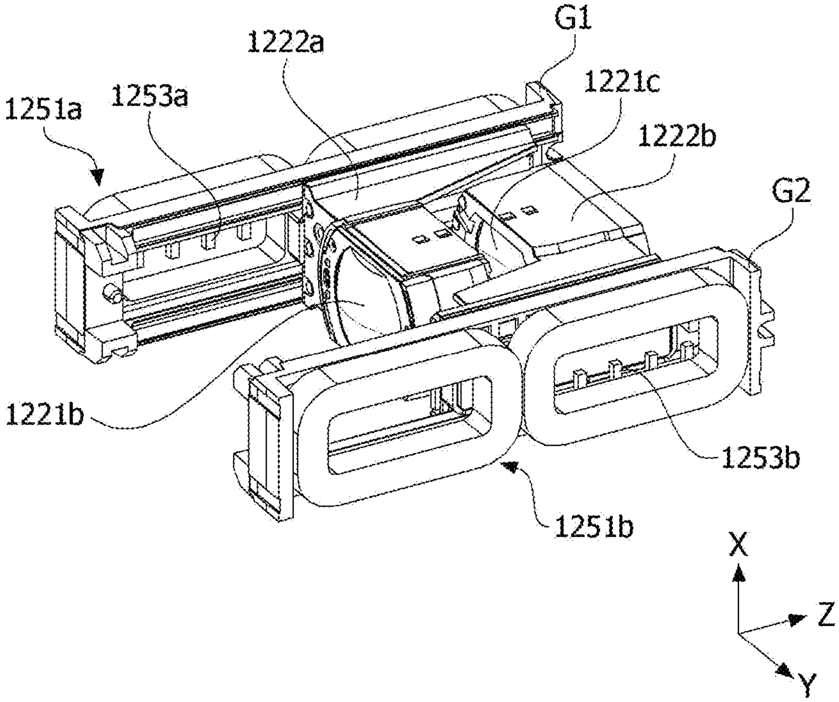
FIG. 10*b* is a perspective view illustrating a first optical driving unit and a moving assembly, and first and second guide units in a second camera actuator according to an embodiment.
Figure 10C:
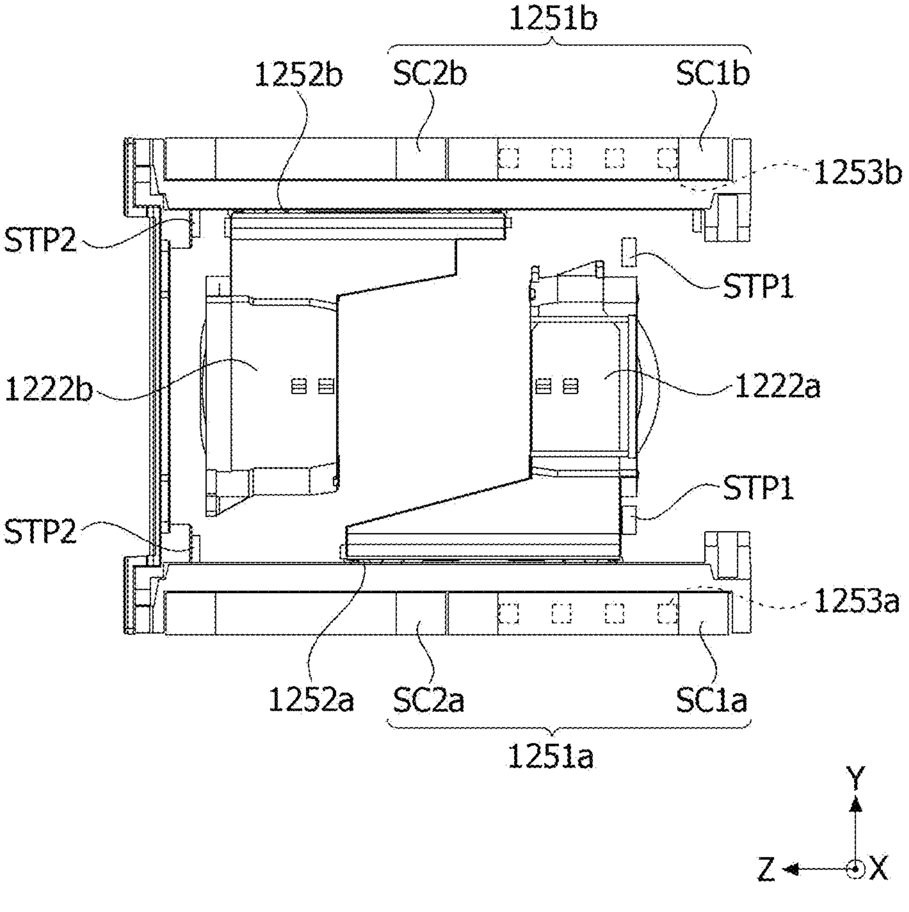
FIG. 10*c* is a diagram illustrating a first state of a first optical driving unit and a moving assembly, and first and second guide units in a second camera actuator.
Figure 10D:
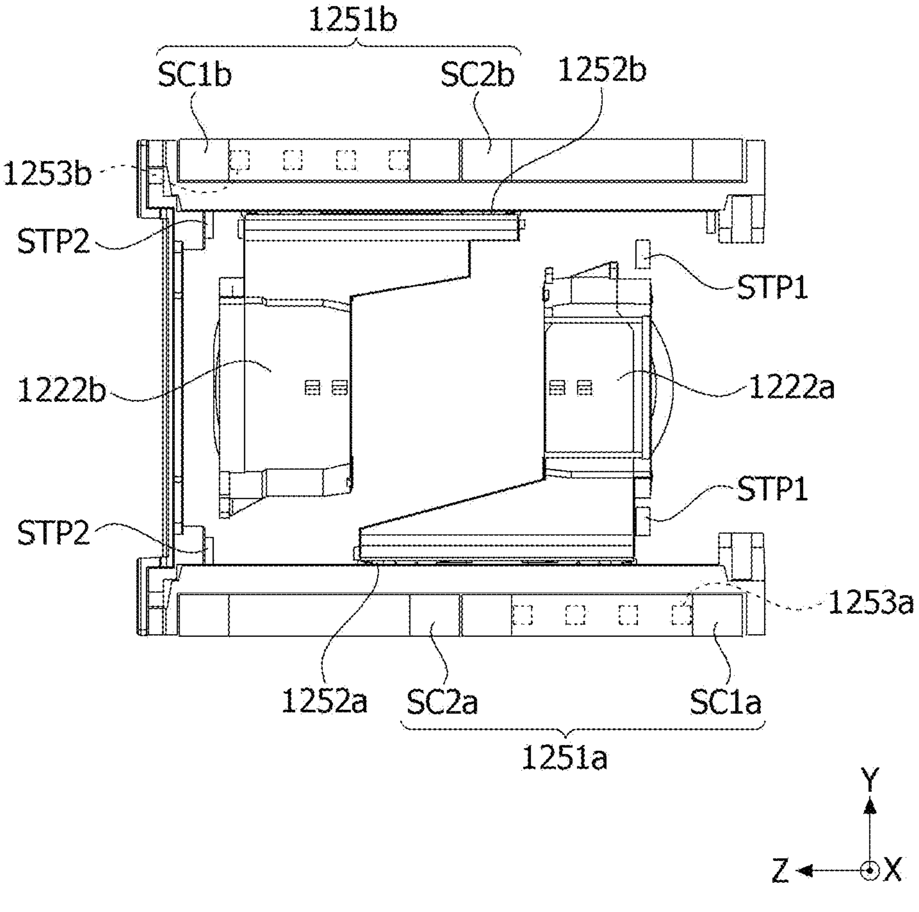
FIG. 10*d* is a diagram illustrating a second state of a first optical driving unit and a moving assembly, and first and second guide units in a second camera actuator.
Figure 10E:
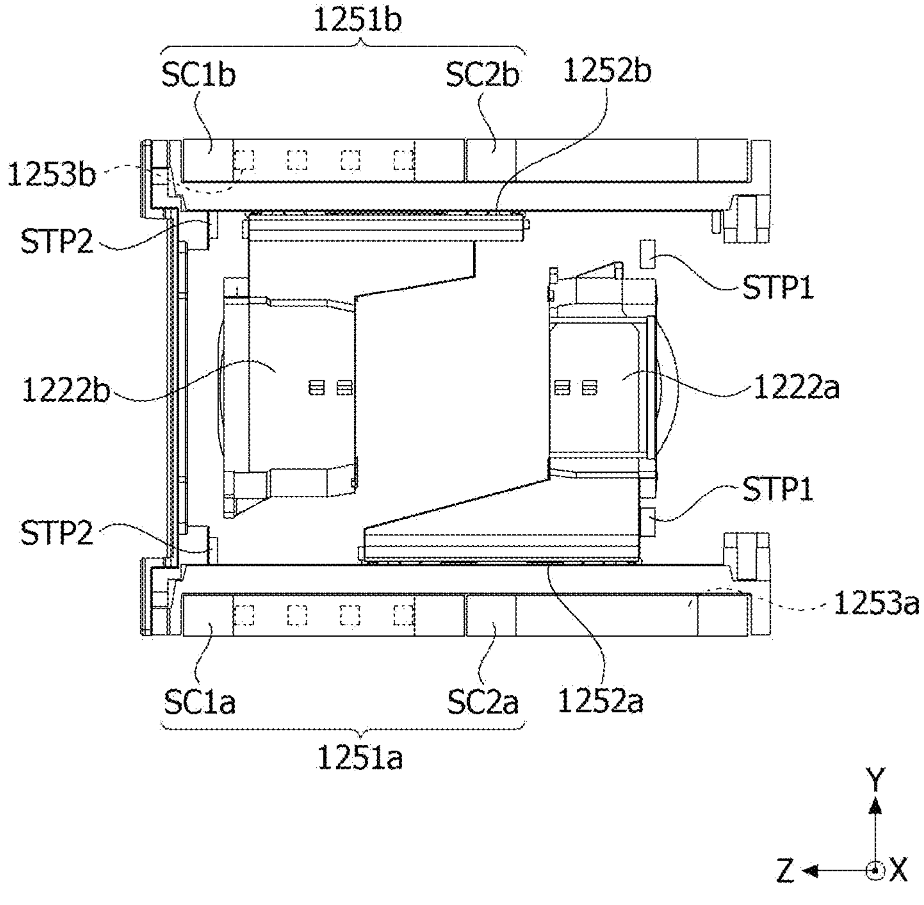
FIG. 10*e* is a diagram illustrating a third state of a first optical driving unit and a moving assembly, and first and second guide units in a second camera actuator.
Figure 10F:
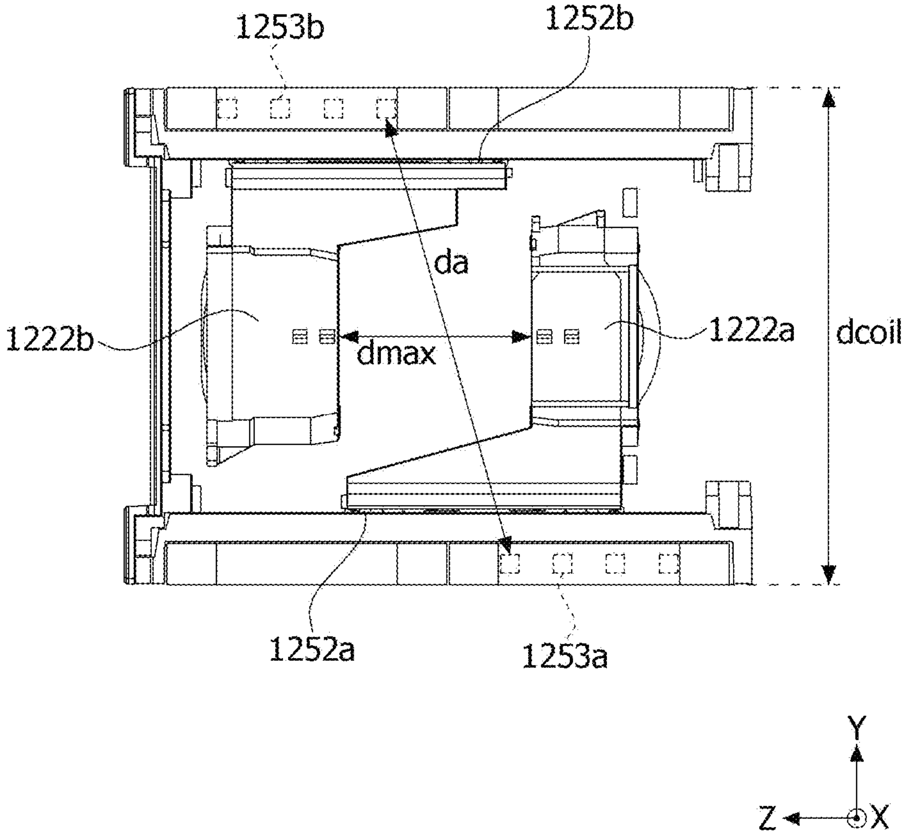
FIG. 10*f* is a diagram illustrating a maximum movement state of a first lens assembly and a second lens assembly in a second camera actuator.
Figure 10G:
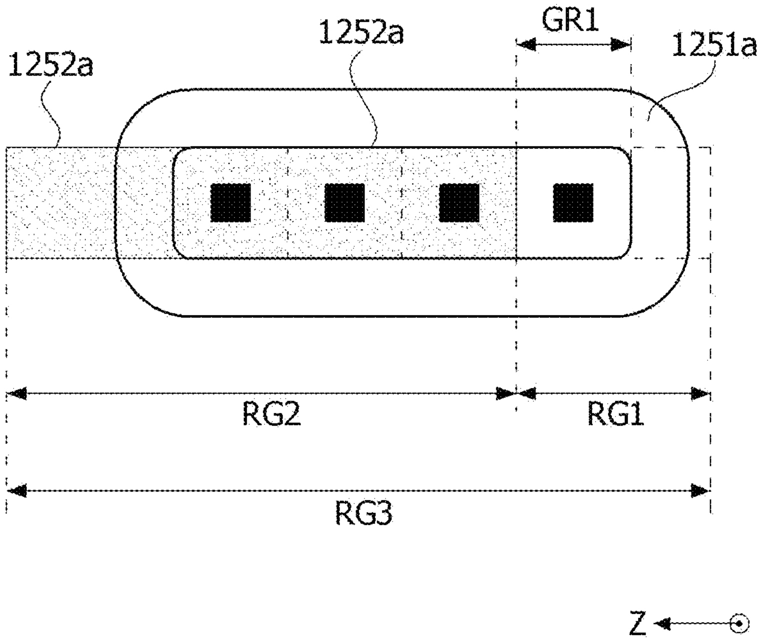
FIGS. 10*g* and 10*h* are diagrams illustrating examples representing the movement of a coil and a magnet in a first driving unit.
Figure 10H:
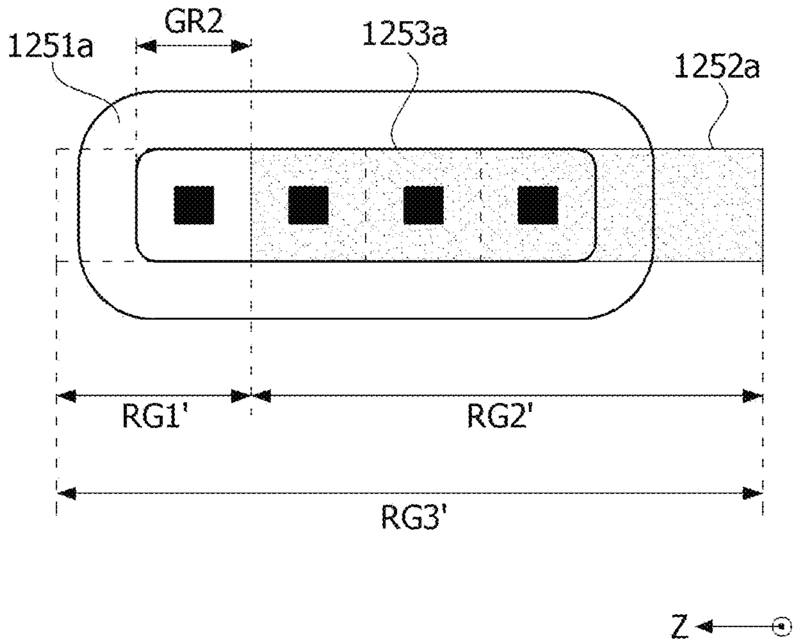

FIG. 8 is a perspective view of a second camera actuator according to an embodiment, FIG. 9 is an exploded perspective view of a second camera actuator according to an embodiment, FIG. 10*a* is a cross-sectional view taken along lines D-D' in FIG. 8, FIG. 10*b* is a perspective view illustrating a first optical driving unit and a moving assembly, and first and second guide units in a second camera actuator according to an embodiment, FIG. 10*c* is a diagram illustrating a first state of a first optical driving unit and a moving assembly, and first and second guide units in a second camera actuator, FIG. 10*d* is a diagram illustrating a second state of a first optical driving unit and a moving assembly, and first and second guide units in a second camera actuator, FIG. 10*e* is a diagram illustrating a third state of a first optical driving unit and a moving assembly, and first and second guide units in a second camera actuator, FIG. 10*f* is a diagram illustrating a maximum movement state of a first lens assembly and a second lens assembly in a second camera actuator, and FIGS. 10*g* and 10*h* are diagrams illustrating an example according to the movement of a coil and a magnet in a first driving unit.

Referring to FIGS. 8 to 10*a*, a second camera actuator 1200 (or a camera device or a zoom-lens transfer device or a zoom-lens moving device or a lens transfer device) according to an embodiment may include a lens unit 1220, a second housing 1230, a first optical driving unit 1250, a base unit 1260, a second substrate unit 1270 and a bonding member 1280. The second camera actuator 1200 may further include a second shield can (not shown), an elastic part (not shown), and a bonding member (not shown).

Also, as will be described later, the lens group may move along the optical axis direction. Also, the lens group may move along the optical axis direction by being combined with the lens assembly. In this case, the second camera actuator may include a moving unit that moves in the optical axis direction, such as a lens group, and a fixed unit that is relatively fixed and does not move in the optical axis direction unlike the moving unit. In this present embodiment, the moving unit may include a lens assembly (e.g., first and second lens assemblies) and a first optical driving magnet (first and second driving magnets). The fixing unit may include a second housing, a second substrate unit, a first optical driving coil, and a Hall sensor. Furthermore, a driving magnet may be disposed in one of the moving portion and the fixing portion, and a driving coil may be disposed in the other. Correspondingly, the movement distance of the lens assembly to be described below may correspond to the movement distance of the moving unit.

The second shield can (not shown) may be located in one region (e.g., the outermost) of the second camera actuator 1200 to surround components (the lens unit 1220, the second housing 1230, the first optical driving unit 1250, the base unit 1260, the second substrate unit 1270, and an image sensor IS) to be described later.

The second shield can (not shown) may block or reduce electromagnetic waves generated from the outside. Therefore, the occurrence of a malfunction in the first optical driving unit 1250 may be reduced.

The lens unit 1220 may be located in the second shield can (not shown). The lens unit 1220 may move along the third direction (Z-axis direction or optical axis direction). Accordingly, the above-described AF function or zoom function may be performed.

Also, the lens unit 1220 may be located in the second housing 1230. Thus, at least a portion of the lens unit 1220 may move along the optical axis direction or the third direction (Z-axis direction) within the second housing 1230.

Specifically, the lens unit 1220 may include a lens group 1221 and a moving assembly 1222.

First, the lens group 1221 may include at least one lens. Also, while there may be a plurality of lens groups 1221, a description will be made on one of them.

The lens group 1221 may be combined with the moving assembly 1222 and move in the third direction (Z-axis direction) by the electromagnetic force generated from a first magnet 1252*a* and a second magnet 1252*b* combined with the moving assembly 1222.

In an embodiment, the lens group 1221 may include a first lens group 1221*a*, a second lens group 1221*b*, and a third lens group 1221*c*. The first lens group 1221*a*, the second lens group 1221*b*, and the third lens group 1221*c* may be sequentially disposed along the optical axis direction. Further, the lens group 1221 may further include a fourth lens group 1221*d*. The fourth lens group 1221*d* may be disposed at the rear end of the third lens group 1221*c*.

The first lens group 1221*a* may be fixedly combined with a second-first housing. In other words, the first lens group 1221*a* may not move along the optical axis direction.

The second lens group 1221*b* may be combined with the first lens assembly 1222*a* and move in the third direction or the optical axis direction. A magnification adjustment may be performed by moving the first lens assembly 1222*a* and the second lens group 1221*b*.

The third lens group 1221*c* may be combined with the second lens assembly 1222*b* and move in the third direction or the optical axis direction. By the movement of the third lens group 1221, focal adjustment or auto-focusing may be performed.

However, the lens groups is not limited in numbers, and the fourth lens group 1221*d* described above may be removed, or additional lens groups other than the fourth lens group 1121*d* may be further provided.

The moving assembly 1222 may have an opening region surrounding the lens group 1221. The moving assembly 1222 is used interchangeably with the lens assembly. The moving assembly 1222 or the lens assembly may move along the optical axis direction (Z-axis direction) within the second housing 1230. In addition, the moving assembly 1222 may be combined with the lens group 1221 in various methods. Also, the moving assembly 1222 may have grooves in lateral sides thereof and may be combined with the first magnet 1252*a* and the second magnet 1252*b* through the grooves. A coupling member or the like may be applied to the groove.

In addition, the moving assembly 1222 may be combined with an elastic part (not shown) at upper and rear ends thereof. Therefore, the moving assembly 1222 may be supported by the elastic part (not shown) while moving in the third direction (Z-axis direction). That is, the moving assembly 1222 may be maintained in the third direction (Z-axis direction) while retaining the position thereof. The elastic part (not shown) may be formed of various elastic elements such as leaf springs.

The moving assembly 1222 is located in the second housing 1230 and may include the first lens assembly 1222*a* and the second lens assembly 1222*b*.

A region of the second lens assembly 1222*b* in which the third lens group is placed may be located at the rear end of the first lens assembly 1222*a*. In other words, the region of the second lens assembly 1222*b* where the third lens group 1221*c* is placed may be located between a region of the first lens assembly 1222*a* where the second lens group 1221*b* is placed and the image sensor.

The first lens assembly 1222*a* and the second lens assembly 1222*b* may face to a first guide unit G1 and a second guide unit G2, respectively. The first guide unit G1 and the second guide unit G2 may be located on a first side and a second side of the second housing 1230 to be described later.

A first optical driving magnet may be placed on outer surfaces of the first and second lens assemblies 1222*a* and 1222*b*. For example, the second magnet 1252*b* may be placed on the outer surface of the second lens assembly 1222*b*. The first magnet 1252*a* may be placed on the outer surface of the first lens assembly 1222*a*. In the present specification, the first lens assembly 122*a* may be used interchangeably as a 'first bobbin'. The second lens assembly 1222*b* may be used interchangeably as a 'second bobbin'.

The second housing 1230 may be disposed between the lens unit 1220 and the second shield can (not shown). In addition, the second housing 1230 may be disposed to surround the lens unit 1220.

The second housing 1230 may include a second-first housing 1231 and a second-second housing 1232. The second-first housing 1231 may be combined with the first lens group 1221*a* and may also be combined with the above-described first camera actuator. The second-first housing 1231 may be located at the front of the second-second housing 1232.

The second-second housing 1232 may be located at the rear of the second-first housing 1231. The lens unit 1220 may be placed inside the second-second housing 1232.

The second housing 1230 (or the second-second housing 1232) may have holes formed in sides thereof. A first coil 1251*a* and a second coil 1251*b* may be disposed in the holes. The holes may be positioned to correspond to the grooves of the moving assembly 1222 described above. In this case, there may be a plurality of first coils 1251*a* and a plurality of second coils 1251*b*.

In an embodiment, the second housing 1230 (in particular, the second-second housing 1232) may include a first side 1232*a* and a second side 1232*b*. The first side 1232*a* and the second side 1232*b* may be positioned to correspond to each other. For example, the first side 1232*a* and the second side 1232*b* may be symmetrically disposed with respect to the third direction. A first optical driving coil 1251 may be positioned on the first side 1232*a* and the second side 1232*b*. In addition, the second substrate unit 1270 may be placed on the outer surfaces of the first and second sides 1232*a* and 1232*b*. In other words, a first substrate may be positioned on the outer surface of the first side 1232*a*, and a second substrate may be positioned on the outer surface of the second side 1232*b*.

Further, the first guide unit G1 and the second guide unit G2 may be located on the first side 1232*a* and the second side 1232*b* of the second housing 1230 (in particular, the second-second housing 1232).

The first guide unit G1 and the second guide unit G2 may be positioned to correspond to each other. For example, the first guide unit G1 and the second guide unit G2 may be positioned to face each other with respect to the third direction (the Z-axis direction). Additionally, at least portions of the first guide unit G1 and the second guide unit G2 may overlap each other in the second direction (Y-axis direction).

Each of the first guide unit G1 and the second guide unit G2 may include at least one groove (e.g., a guide groove) or recess. In addition, a first ball B1 or a second ball B2 may be placed in the groove or recess. Thus, the first ball B1 or the second ball B2 may move in the third direction (Z-axis direction) within the guide groove of the first guide unit G1 or the guide groove of the second guide unit G2.

Alternatively, the first ball B1 or the second ball B2 may move in the third direction along a rail formed inside the first side 1232*a* of the second housing 1230 or a rail formed inside of the second side 1232*b* of the second housing 1230.

Thus, the first lens assembly 1222*a* and the second lens assembly 1222*b* may move in the third direction or the optical axis direction. In this case, the second lens assembly 1222*b* may be disposed closer or nearer to the image sensor than the first lens assembly 1222*a*.

According to an embodiment, the first ball B1 may be in contact with the first lens assembly 1222*a*. The second ball B2 may be in contact with the second lens assembly 1222*b*. Accordingly, the first ball B1 may at least partially overlap the second ball B2 along the first direction (X-axis direction) depending their positions. However, depending on positions of the first lens assembly 1222*a* and the second lens assembly 1222*b*, they may not overlap each other.

In addition, the first guide unit G1 and the second guide unit G2 may include first guide grooves GG1*a* and GG2*a* facing a first recess RS1. Also, the first guide unit G1 and the second guide unit G2 may include second guide grooves GG1*b* and GG2*b* facing a second recess RS2. The first guide grooves GG1*a*, GG1*a* and the second guide groove GG1*b*, GG1*b* may be grooves extending in the third direction (the Z-axis direction). The first guide groove GG1*a*, GG1*a* and the second guide groove GG1*b*, GG1*b* may be different in shapes. For example, the first guide grooves GG1*a* and GG2*a* may have slanted side surfaces, and the second guide grooves GG1*b* and GG2*b* may have side surfaces perpendicular to the bottom surface.

Further, there may be a plurality of first guide grooves GG1*a*, GG1*a* or a plurality of second guide grooves GG1*b*, GG1*b*. In addition, a plurality of balls having at least some different diameters may be positioned in the plurality of guide grooves.

The second magnet 1252*b* may be positioned to face the second coil 1251*b*. Also, the first magnet 1252*a* may be positioned to face the first coil 1251*a*.

For example, at least one of the first coil 1251*a* and the second coil 1251*b* may be formed of a plurality of coils. For example, the first optical driving coil 1251 may include a first sub-coil SC1 and a second sub-coil SC2. The first sub-coil SC1 and the second sub-coil SC2 may be disposed along the optical axis direction (Z-axis direction). For example, the first sub-coil SC1 and the second sub-coil SC2 may be sequentially disposed in the optical axis direction. In addition, between the first sub-coil SC1 and the second sub-coil SC2, the first sub-coil SC1 may be disposed closest to the first camera actuator. In this embodiment, the second camera actuator or the first optical driving unit may include a first driving unit and a second driving unit. The first driving unit may provide a driving force for moving the first lens assembly 1222*a* in the optical axis direction. The first driving unit may include the first coil 1251*a* and the first magnet 1252*a*. Further, the first driving unit may include a first driving coil and a first driving magnet. Hence, the first coil 1251*a* is used interchangeably with the 'first driving coil'. Also, the first magnet 1252*a* is used interchangeably with the 'first driving magnet'.

The second driving unit may provide a driving force for moving the second lens assembly 1222*b* in the optical axis direction. The second driving unit may include the second coil 1251*b* and the second magnet 1252*b*.

Further, the second driving unit may include a second driving coil and a second driving magnet. Hence, the second coil 1251*b* is used interchangeably with the 'second driving coil'. Also, the second magnet 1252*b* is used interchangeably with the 'second driving magnet'. Hereinafter, a description will be made based on the above.

The elastic part (not shown) may include a first elastic member (not shown) and a second elastic member (not shown). The first elastic member (not shown) may be combined with the upper surface of the moving assembly 1222. The second elastic member (not shown) may be combined with the lower surface of the moving assembly 1222. In addition, the first elastic member (not shown) and the second elastic member (not shown) may be formed of a leaf spring as mentioned above. Further, the first elastic member (not shown) and the second elastic member (not shown) may provide elasticity with respect to the movement of the moving assembly 1222. Although it is not limited to the above-mentioned positions, the elastic part may be disposed at various positions.

And the first optical driving unit 1250 may provide a driving force for moving the lens unit 1220 in the third direction (Z-axis direction). The first optical driving unit 1250 may include a first optical driving coil 1251 and a first optical driving magnet 1252. The first optical driving coil 1251 and the first optical driving magnet 1252 may be positioned to face each other. For example, the first driving coil 1251*a* and the first driving magnet 1252*a* may be positioned to face each other. In addition, the second driving coil 1251*b* and the second driving magnet 1151*b* may be positioned to face each other. The first driving coil 1251*a* may be disposed at one side in the second housing along the second direction, and the second driving coil 1251*a* may be disposed at the other side in the second housing along the second direction.

Additionally, the first optical driving unit 1250 may further include a third Hall sensor unit. The third Hall sensor unit 1253 may include at least one first Hall sensor 1253*a* and second Hall sensor 1253*b*, and may be located inside or outside the first optical driving coil 1251.

The moving assembly may move in the third direction (Z-axis direction) by an electromagnetic force formed between the first optical driving coil 1251 and the first optical driving magnet 1252.

The second optical driving coil 1251 may include the first coil 1251*a* and the second coil 1251*b*. Also, as described above, the first coil 1251*a* and the second coil 1251*b* may be formed of a plurality of sub-coils. In addition, the first coil 1251*a* and the second coil 1251*b* may be disposed in holes formed in the sides of the second housing 1230. Additionally, the first coil 1251*a* and the second coil 1251*b* may be electrically connected to the second substrate unit 1270. Accordingly, the first coil 1251*a* and the second coil 1251*b* may be supplied with current or the like through the second substrate unit 1270.

In addition, the first optical driving coil 1251 may be coupled to the second substrate unit 1270 through a yoke or the like.

Also, in an embodiment, the first optical driving coil 1251 is a fixed element together with the second substrate 1270. Unlike this, the first optical driving magnet 1252 is a moving element that moves in the optical axis direction (Z-axis direction) together with the first and second assemblies.

The first optical driving magnet 1252 may include the first magnet 1252*a* and the second magnet 1252*b*.

The first magnet 1252*a* may face a first sub-coil SC1*a* and a second sub-coil SC2*a*. The second magnet 1252*b* may face the third sub-coil SC1*b* and the fourth sub-coil SC2*b*. The first sub-coil SC1*a* may be positioned to overlap the third sub-coil SC1*b* in the second direction. The second sub-coil SC2*a* may be positioned to overlap the fourth sub-coil SC2*b* in the second direction. As such, the first magnet 1252*a* and the second magnet 1252*b* may be disposed to face two sub-coils in the same manner. In this specification, a description will be made based on the first driving coil or first coils SC1*a* and SC1*b* and the second driving coil or second coils SC2*a* and Sc2*b*. However, the driving coil that drives the second lens assembly in the specification may also be referred to as a third sub-coil or a fourth sub-coil.

The first driving coil 1251*a* may include the first sub-coil SC1*a* and the second sub-coil SC2*a*. The second driving coil 1251*b* may include the third sub-coil SC1*b* and the fourth sub-coil SC2*b*.

In addition, the first sub-coil SC1*a* and the second sub-coil SC2*a* may be disposed side by side along the optical axis direction (Z-axis direction). Additionally, the first sub-coil SC1*a* and the second sub-coil SC2*a* may be spaced apart from each other along the optical axis direction. The first sub-coil SC1*a* and the second sub-coil SC2*a* may be connected in parallel with each other. For example, one of one end and the other end of the first sub-coil SC1*a* may be connected to one of one end and the other end of the second sub-coil SC2*a* through a node. And the other one of one end and the other end of the first sub-coil SC1*a* may be connected to the other one of one end and the other end of the second sub-coil SC2*a* by another node. That is, the current applied to the first sub-coil SC1*a* and the second sub-coil SC2*a* may be distributed to the respective sub-coils. Accordingly, the first sub-coil SC1*a* and the second sub-coil SC2*a* are electrically connected in parallel, so that heat generation may be reduced.

In addition, the polarity on one surface of the first driving magnet 1252*a* facing the first driving coils SC1*a* and SC2*a* may be the same as that of one surface on the second driving magnet 1252*b* facing the second driving coils SC1*b* and SC2*b*. For example, an inner surface of the first driving magnet 1252*a* and an inner surface of the second driving magnet 1252*b* may have one of an N pole or an S pole (e.g., an N pole). An outer surface of the first driving magnet 1252*a* and an outer surface of the second driving magnet 1252*b* may have the other one of an N pole and an S pole (e.g., an S pole). Here, the inner surface may be a side adjacent to the optical axis based on the optical axis, and the outer surface may be a side far from the optical axis.

Also, the third sub-coil SC1*b* and the fourth sub-coil SC2*b* may be disposed in parallel along the optical axis direction (Z-axis direction). Additionally, the third sub-coil SC1*b* and the fourth sub-coil SC2*b* may be spaced apart from each other in the optical axis direction.

The third sub-coil SC1*b* and the fourth sub-coil SC2*b* may be connected in parallel with each other. For example, one of one end and the other end of the third sub-coil SC1*b* may be connected to one of one end and the other end of the fourth sub-coil SC2*b* through a node.

The first magnet 1252*a* and the second magnet 1252*b* may be disposed in the aforementioned recesses of the moving assembly 1222 and located to correspond to the first coil 1251*a* and the second coil 1251*b*. The first optical driving magnet 1252 may be coupled to the first and second lens assemblies (or moving assemblies) together with a yoke to be described later.

The first magnet 1252*a* may have a first pole on a first surface BSF1 facing the first optical driving coil (e.g., the first coil). And the first magnet 1252*a* may have a second pole on a second surface BSF2, which is opposite to the first surface BSF1. The second magnet 1252*b* may have a first pole on a first surface BSF1 facing the second optical driving coil (e.g., the second coil). In addition, the second magnet

1252*b* may have a second pole on a second surface BSF2, which is opposite to the first surface BSF1. The first pole may be one of an N pole and an S pole. And the second pole may be the other one of the N pole and the S pole.

The base unit 1260 may be positioned between the lens unit 1220 and the image sensor IS. A component such as a filter or the like may be fixed to the base unit 1260. Also, the base unit 1260 may be disposed to surround the image sensor described above. With this configuration, the image sensor may be free from foreign substances, and thus the reliability of the device may be improved. However, in some drawings, it is removed and described below.

In addition, the second camera actuator 1200 may be a zoom actuator or an auto focus (AF) actuator. For example, the second camera actuator may support one or a plurality of lenses and may perform an auto focusing function or a zooming function by moving the lenses in response to a control signal from a certain controller.

Also, the second camera actuator may be a fixed zoom or a continuous zoom. For example, the second camera actuator may provide the movement of the lens group 1221.

Moreover, the second camera actuator may be formed of a plurality of lens assemblies. For example, in the second camera actuator, at least one of a third lens assembly (not shown) and a guide pin (not shown) in addition to the first lens assembly 1222*a* and the second lens assembly 1222*b* may be disposed. In this regard, the above description may be applied. Therefore, the second camera actuator may perform a high-magnification zooming function through the first optical driving unit. For example, the first lens assembly 1222*a* and the second lens assembly 1222*b* may be a moving lens that moves through the first optical driving unit and the guide pin (not shown), and the third lens assembly (not shown) may be a fixed lens, but this is not a limitation. For example, the third lens assembly (not shown) may perform the function of a concentrator (focator) that images light at a specific position, and the first lens assembly may perform the function of a variator that re-images the image formed by the third lens assembly (not shown) to another position. Meanwhile, a magnification change may be large in the first lens assembly because a distance to a subject or an image distance changes a lot, and the first lens assembly which is a variator may perform an important role in changing the focal length or magnification of the optical system. On the other hand, an image point formed by the first lens assembly, which is a variator, may be slightly different depending on a position. Therefore, the second lens assembly may perform a position compensation function for the image formed by the variator. For example, the second lens assembly may perform the function of a compensator that accurately forms, at an actual position on the image sensor, the image point formed by the second lens assembly 1222*b* which is a variator. However, it will be described on the configuration of this embodiment with reference to the following drawings.

The image sensor may be located inside or outside the second camera actuator. In an embodiment, as shown, the image sensor may be located inside the second camera actuator. For example, the image sensor may be positioned on the circuit board. The image sensor may receive light and convert the received light into an electrical signal. In addition, the image sensor may include a plurality of pixels in the form of an array. The image sensor may be located on the optical axis.

The second substrate unit 1270 may be in contact with the side of the second housing. For example, the second substrate unit 1270 may be located on the outer surface (first side surface) of the first side and the outer surface (second side surface) of the second side of the second housing, especially the second-second housing, and may be in contact with the first side surface and the second side surface.

In addition, the second camera actuator 1200 may include a first housing yoke HY1 and a second housing yoke HY2 disposed in at least one of the upper and lower portions of the second-second housing 1232 (or the second housing).

The first housing yoke HY1 and the second housing yoke HY2 may be located outsides the upper and lower surfaces of the 2-2th housing 1232. Therefore, the first housing yoke HY1 and the second housing yoke HY2 may prevent the magnetic force generated by the first coil 1251*a*, the second coil 1251*b*, the first magnet 1252*a*, and the second magnet 1252*b* from being transmitted to the elements facing them. For example, the amount of magnetic force generated by the first coil 1251*a* and the first magnet 1252*a* along with the first housing yoke HY1 and the second housing yoke HY2, which is transmitted to the second coil 1251*b* and the second magnet 1252*b*, may be reduced.

Referring to FIG. 10B, the first lens assembly 1222*a* may move in the optical axis direction (Z axis direction) within the second housing. The second lens assembly 1222*b* may move in the optical axis direction (Z-axis direction) within the second housing.

A first mark MK1 may be positioned on an upper surface of the first lens assembly 1222*a*. A second mark MK2 may be positioned on an upper surface of the second lens assembly 1222*b*. There may be a plurality of first marks MK1. There may be a plurality of second marks MK2. The plurality of first marks MK1 may be disposed side by side along the optical axis direction. The plurality of second marks MK2 may be disposed side by side along the optical axis direction. The first mark MK1 and the second mark MK2 may be identified by vision inspection. Therefore, the positions of the first lens assembly 1222*a* and the second lens assembly 1222*b* may be recognized by the first mark MK1 and the second mark MK2. By identifying the first mark MK1 and the second mark MK2, it is possible to accurately inspect whether the movement of the first lens assembly 1222*a* and the second lens assembly 1222*b* along the optical axis direction is correctly performed.

The first coil 1251*a* may be easily coupled to the circuit board by a substrate yoke on the outside. The second coil 1251*b* may be easily coupled to the circuit board by a substrate yoke on the outside.

The first lens assembly 1222*a* may return to a position determined by the substrate yoke adjacent thereto. That is, the first lens assembly 1222*a* may move to a specific position by a restoring force exerted by the substrate yoke.

Also, the second lens assembly 1222*b* may return to a position determined by the substrate yoke adjacent thereto. That is, the second lens assembly 1222*b* may move to a specific position by a restoring force exerted by the substrate yoke.

Referring to FIG. 10*c*, in a first state, first Hall sensors 1253*a* and second Hall sensors 1253*b* may overlap in a horizontal direction. The first Hall sensors 1253*a* may be disposed in the first sub-coil SC1*a*, and the second Hall sensors 1253*b* may be disposed in the third sub-coil SC1*b*. No Hall sensors may be disposed in the second sub-coil SC2*a* and the fourth sub-coil SC2*b*. Furthermore, by disposing a plurality of Hall sensors in the first sub-coil SC1*a* and the third sub-coil SC1*b* facing each other, the first Hall sensors 1253*a* and the second Hall sensors 1253*b* may overlap in the horizontal direction (Y-axis direction).

In addition, in the second camera actuator and the camera device according to various states and embodiments below, a first stopper STP1 and a second stopper STP2 may block the movement of the first lens assembly 1222*a* and the second lens assembly 1222*b* in the optical axis directions. That is, the distance between the first stopper ST1 and the second stopper STP2 in the optical axis direction may be less than or equal to a stroke of the first lens assembly 1222*a* or the second lens assembly 1222*b* in the optical axis direction. The first stopper STP1 may be disposed adjacent to the first camera actuator compared to the second stopper STP2. Also, the second stopper STP2 may be positioned adjacent to the image sensor compared to the first stopper STP1.

Referring to FIG. 10*d*, in a second state, at least some of the first Hall sensors 1253*a* and the second Hall sensors 1253*b* may overlap each other in the horizontal direction. For example, the first Hall sensors 1253*a* and the second Hall sensors 1253*b* may deviate in the horizontal direction and may not overlap each other. Specifically, the first Hall sensors 1253*a* may be disposed in the first sub-coil SC1*a*, and the second Hall sensors 1253*b* may be disposed in the fourth sub-coil SC2*b*. No Hall sensors may be disposed on the second sub-coil SC2*a* and the third sub-coil SC1*b*. Furthermore, by disposing a plurality of Hall sensors in the first sub-coil SC1*a* and the fourth sub-coil SC2*b* that do not face each other, the first Hall sensors 1253*a* and the second Hall sensors 1253*b* may not overlap in the horizontal direction (Y-axis direction).

Referring to FIG. 10*e*, in a third state, the first Hall sensors 1253*a* and the second Hall sensors 1253*b* may overlap in the horizontal direction. The first Hall sensors 1253*a* may be disposed in the second sub-coil SC2*a*, and the second Hall sensors 1253*b* may be disposed in the fourth sub-coil SC2*b*. No Hall sensors may be disposed in the first sub-coil SC1*a* and the third sub-coil SC1*b*. Furthermore, by disposing a plurality of Hall sensors in the second sub-coil SC2*a* and the fourth sub-coil SC2*b* opposing each other, the first Hall sensors 1253*a* and the second Hall sensors 1253*b* may overlap in the horizontal direction (Y-axis direction).

TABLE 1

| states | Change in the 1st Hall sensors by the movement of the 2nd magnet (Stroke conversion) | Change in the 2nd Hall sensors by the movement of the 1st magnet (Stroke conversion) |
|---|---|---|
| First state (FIG. 10c) | 7.5 um | 20 um |
| Second state (FIG. 10d) | 7.5 um | 10 um |
| Third state (FIG. 10e) | 15 um | 10 um |

Referring to Table 1, in the first state, the first magnet and the first lens assembly overlap the first Hall sensors in the horizontal direction (Y-axis direction). The second magnet and the second lens assembly do not overlap the second Hall sensors in the horizontal direction (Y-axis direction).

And when there is a movement of the first lens assembly (movement of the first magnet), the second lens assembly and the second magnet may not overlap the second Hall sensors in the horizontal direction. Therefore, since a large amount of the magnetic forces generated by the first magnet are provided to the second Hall sensors, the change in the second Hall sensors is relatively large even if there is no movement of the second magnet or the second lens assembly.

In contrast, even if the second magnet moves (corresponding to the movement of the second lens assembly), the magnetic forces generated by the second magnet are partially blocked by the first magnet or the first lens assembly, so that the change in the first Hall sensors is not relatively large.

In the second state, the first magnet and the first lens assembly overlap the first Hall sensors in the horizontal direction (Y-axis direction). And the second magnet and the second lens assembly overlap the second Hall sensors in the horizontal direction (Y-axis direction).

In addition, when there is a movement of the first lens assembly (movement of the first magnet), since the second lens assembly and the second magnet overlap the second Hall sensors in the horizontal direction, the magnetic forces generated by the first magnet are partially blocked by the first magnet or the first lens assembly, so that the change in the second Hall sensors is not relatively large.

In contrast, even if there is a movement of the second lens assembly (movement of the second magnet), the magnetic forces generated by the second magnet are partially blocked by the first magnet or the first lens assembly, so that the change in the first Hall sensors is not relatively large.

In the third state, the first magnet and the first lens assembly do not overlap the first Hall sensors in the horizontal direction (Y-axis direction). The second magnet and the second lens assembly overlap the second Hall sensors in the horizontal direction (Y-axis direction).

Even if there is a movement of the first lens assembly (movement of the second magnet), the magnetic forces generated by the first magnet are partially blocked by the second magnet or the second lens assembly, so that the change in the second Hall sensors is not relatively large.

However, the first lens assembly and the first magnet may not overlap the first Hall sensors in the horizontal direction. Accordingly, a large amount of magnetic forces generated by the second magnet are provided to the first Hall sensors, and thus the change in the first Hall sensors is relatively large even if there is no movement of the first magnet or the first lens assembly.

Referring to FIG. 10*f*, in the second camera actuator and the camera device according to an embodiment, at least some of the first Hall sensors 1253*a* and the second Hall sensors 1253*b* may not overlap in a direction perpendicular to the optical axis (e.g., the horizontal direction (Y-axis direction)).

For example, a ratio of an area of the first Hall sensors 1253*a* to the area overlapping the second Hall sensors 1253*b* in the horizontal direction (Y-axis direction) may be 1:0.5 or less. As illustrated, two or less of the four first Hall sensors 1253*a* may overlap two of the four second Hall sensors 1253*b* in the horizontal direction. That is, at least some of the first Hall sensors 1253a and the second Hall sensors 1253*b* may deviate in the horizontal direction and may be disposed to deviate in the horizontal direction. With this configuration, the influence of the magnetic forces generated from the magnets that do not opposite each other, that is, the second magnet 1252*b* and the first magnet 1252*a*, on the first Hall sensors 1253a and the second Hall sensors 1253*b*, may be reduced. Therefore, the position detection of the first lens assembly and the second lens assembly may be accurately performed through the first Hall sensors 1253*a* and the second Hall sensors 1253*b*.

Furthermore, in this embodiment, when the first lens assembly 1222*a* and the second lens assembly 1222*b* are moved to the maximum (dmax) in the optical axis direction (Z-axis direction), the second lens assembly 1222*b* may be in contact with the second stopper STP2. Also, the first lens assembly 1222*a* may be in contact with the first stopper STP1.

Furthermore, in a state of the maximum movement (with dmax), the first Hall sensors 1253*a* may face the first magnet 1252*a*, and the second Hall sensor 1252*b* may face the second magnet 1252*b*. In addition, when the first lens assembly 1222*a* and the second lens assembly 1222*b* are in a state of the maximum movement (in a state of maximum separation, dmax) in the optical axis direction (Z-axis direction), the minimum distance, da, between the first Hall sensors 1253*a* and the second Hall sensors 1253*b* may be greater than the maximum distance, dcoil, between the first coil 1251*a* and the second coil 1251*b* in the horizontal direction (Y-axis direction).

In this embodiment, the first coil 1251*a* and the second coil 1251*b* may be symmetrically disposed with respect to the optical axis. In addition, the first Hall sensors 1253*a* may be disposed closer to the first camera actuator than the second coil 1251*b* (or the second Hall sensors) within the first coil 1251*a*. And the second Hall sensors 1253*b* may be disposed closer to the image sensor than the first coil 1251*a* (or the first Hall sensors 1253*a*) in the second coil 1251*b*. The arrangement of the first and second Hall sensors may correspond to the arrangement in which the second lens assembly 1222*b* is disposed closer to the image sensor than the first lens assembly 1222*a*.

Accordingly, in the second camera actuator according to an embodiment, influence, on the movement of one lens assembly, of the magnetic forces by the magnets (or coils) in another lens assembly may be suppressed, as described above. Consequently, the influence of magnetic forces from magnets other than adjacent magnets on the first Hall sensors 1253*a* and the second Hall sensors 1253*b*, that is, cross talk, may be attenuated.

Additionally, referring to FIGS. 10*g* and 10*h*, a magnet, which is a moving part, may move in the optical axis direction with respect to a coil, which is a fixed part. In these drawings, it will be described based on one coil. However, as described above, the coil may include a plurality of sub-coils, which will be described later with reference to FIGS. 16 and 17. Furthermore, for one coil (or one sub-coil), a magnet may have a stroke within the length of the one coil (or the one sub-coil) in the optical axis direction. In addition, the plurality of first Hall sensors 1253*a* may be located in the inner hole of the first coil 1251*a* to detect magnetic forces caused by the movement of the first magnet 1252*a*. Hereinafter, it will be described based on the first coil 1251*a*, the first magnet 1252*a*, and the first Hall sensors 1253*a*. However, the description may be equally applied to the second coil, the second magnet, and the second Hall sensor.

As shown in the drawings, the first magnet 1252*a* may have a predetermined length RG2 in the optical axis direction. In this case, the first magnet 1252*a* may have a stroke RG1 of a length smaller than the length of the inner hole in the first coil 1251*a* in the optical axis direction. The maximum stroke RG3 of the first magnet may correspond to the sum of the stroke RG1 of the first magnet 1252*a* and the length RG2 of the first magnet 1252*a* in the optical axis direction.

Furthermore, as the first magnet 1252*a* moves in the optical axis direction, the inner holes of the first magnet 1252*a* and the first coil 1251*a* may not overlap each other as much as an area in which the first magnet 1252*a* may be stroked or moved. At least one Hall sensors 1253*a* may be positioned in a non-overlapping region GR1 between the first magnet 1252*a* and the inner hole of the first coil 1251*a*. Hereinafter, the at least one Hall sensor disposed in the non-overlapping region GR1 is used interchangeably with a 'non-overlapping Hall sensor'.

Since these non-overlapping Hall sensors do not overlap the first magnet 1252*a* in the horizontal direction, it may be difficult that magnetic forces (e.g., generated by the second magnet, second coil, etc.) other than magnetic forces generated by the first magnet 1252*a* is blocked by the first magnet 1252*a*.

In addition, the movement of the first magnet 1252*a* may cause changes in the non-overlapping Hall sensors. That is, the length, stroke, and maximum stroke of the first magnet described above may be changed. However, the magnitude of the length, stroke, and maximum stroke of the first magnet along the optical axis direction may be the same. For example, the first magnet 1252*a* may have a predetermined length RG2' in the optical axis direction in correspondence with the movement of the first magnet 1252*a* or the first lens assembly. In this case, the first magnet 1252*a* may have a stroke RG1' of a length smaller than the length of the inner hole in the first coil 1251*a* in the optical axis direction. Therefore, the maximum stroke RG3' of the first magnet may correspond to the sum of the stroke RG1' of the first magnet 1252*a* and the length RG2' of the first magnet 1252*a* in the optical axis direction.

In addition, the non-overlapping region GR2 may be a region which overlaps an outermost Hall sensor along the optical axis direction. As described above, the non-overlapping region may also be changed according to the movement of the first magnet.

Furthermore, magnetic shielding may be performed on the different first Hall sensors 1253*a* and the first magnet 1252*a* in correspondence with the movement of the first magnet or the first lens assembly. Consequently, the influence of the magnetic forces (cross talk) from the first and second magnets that are disposed on opposite sides of each other, on the first and second Hall sensors disposed on both sides of the second camera actuator according to the above-described embodiment, may be suppressed through the arrangement of the first and second magnets. Thus, accurate driving for the movement of the first and second lens assemblies may be made.

Figure 11:
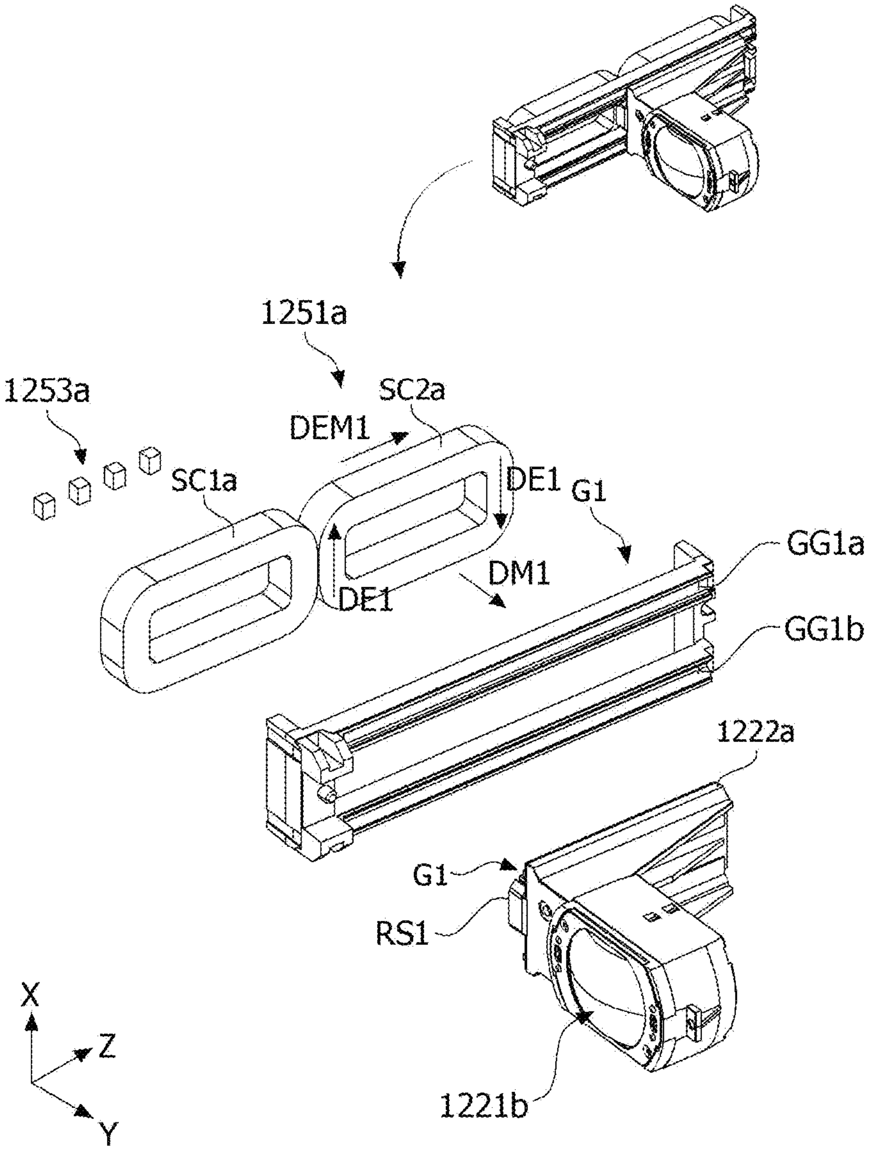
FIG. 11 is an exploded perspective view related to driving of a first lens assembly.

FIG. 11 is an exploded perspective view related to driving of the second lens assembly and FIG. 12*a* is an exploded perspective view related to driving of the second lens assembly.

Figure 12:
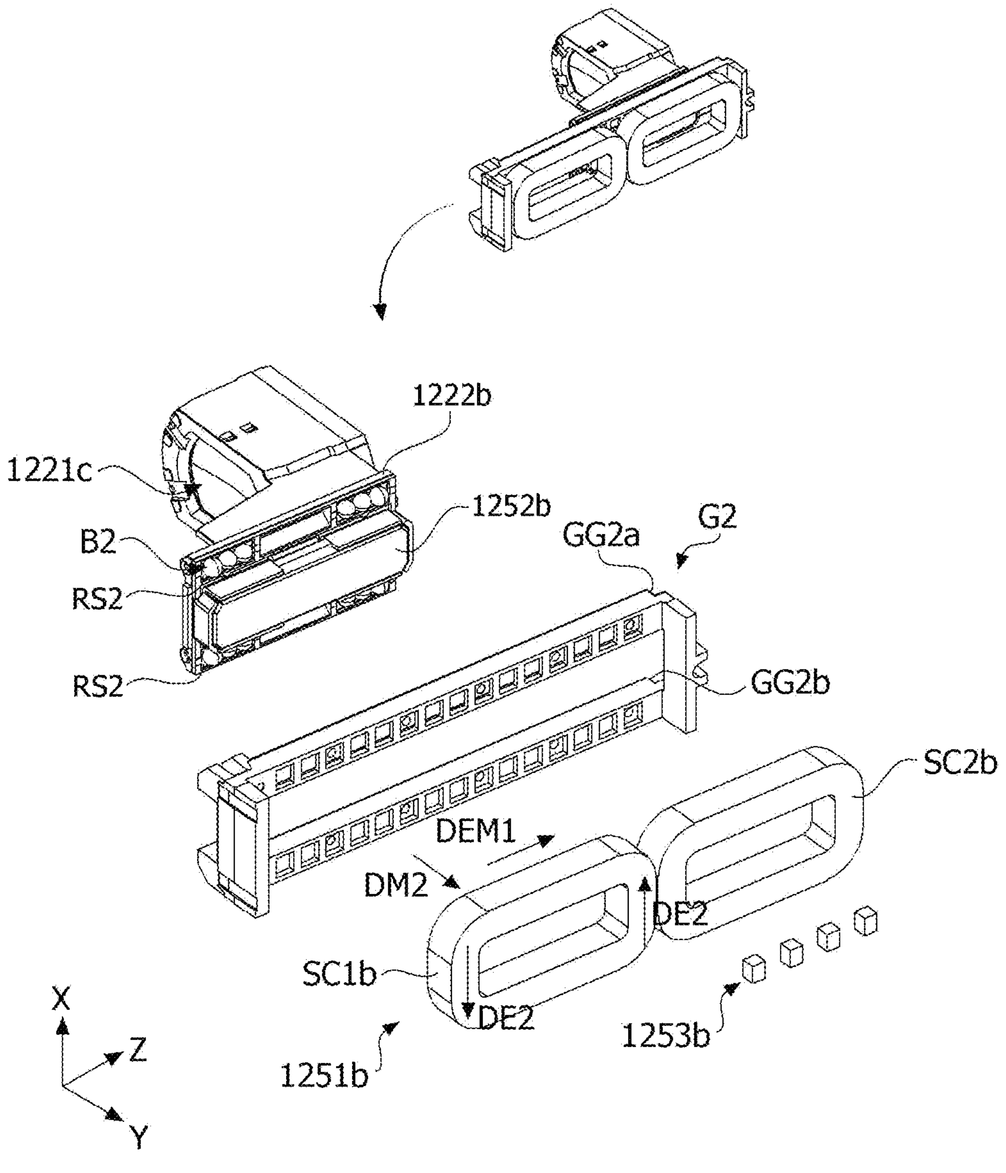
FIG. 12 is an exploded perspective view related to driving of a second lens assembly.

Referring to FIGS. 11 and 12, a description for electromagnetic forces will be made based on one coil. In the camera device according to an embodiment, an electromagnetic force DEM1 may be generated between the first magnet 1252*a* and the first coil 1251*a*, so that the first lens assembly 1222*a* may move along a rail located on the inner side of the housing through the first ball B1 in a direction horizontal to the optical axis, that is, in the third direction (Z-axis direction) or in a direction opposite to the third direction. In this case, the first magnet 1252*a* and the second magnet 1252*b* do not move to an area facing the edges of the first and second sub-coils. Accordingly, the electromagnetic force is formed based on the flow of current in regions adjacent to the first sub-coil and the second sub-coil.

Specifically, in the camera device according to an embodiment, the first magnet 1252*a* may be provided on the first lens assembly 1222*a*, for example, by a unipolar magnetization method. For example, in an embodiment, a surface (first surface) facing the outer surface of the first magnet 1252*a* may be an S pole. The outer surface of the first magnet 1252*a* may be a surface which faces the first coil

1251*a*. A surface opposite to the first surface may be an N pole. Therefore, only one of the N pole and the S pole may be positioned to face the first coil 1251*a*. Herein, it will be described based on a case where the outer surface of the first magnet 1252*a* is the S pole. Furthermore, the first coil 1251*a* includes a plurality of sub-coils, and currents in the plurality of sub-coils may flow in opposite directions. That is, in a region of the first sub-coil SC1*a*, which is adjacent to the second sub-coil SC2*a*, the same current as 'DE1' may flow.

In other words, a first region of the first sub-coil SC1*a* and a second region of the second sub-coil SC2*a* may have the same current direction. The first region of the first sub-coil SC1*a* is a region that overlaps the first driving magnet 1252*a* in a direction perpendicular to the optical axis direction (second direction) and that is placed perpendicular to the optical axis direction (e.g., that is placed along the first direction). The second region of the second sub-coil SC2*a* is a region that overlaps the first driving magnet 1252*a* in a direction perpendicular to the optical axis direction (second direction) and is placed perpendicular to the optical axis direction (e.g., that is placed along the first direction).

In addition, in an embodiment as illustrated, when a magnetic force is applied from the S pole of the first magnet 1252*a* in the second direction (Y-axis direction) and the current DE1 in the first coil 1251*a* flows in the first direction (X-axis direction), an electromagnetic force DEM1 may act in the third direction (Z-axis direction) in accordance with the interaction of electromagnetic force (e.g., Fleming's left hand rule).

In this case, since the first coil 1251*a* is fixed to the side of the second housing, the first lens assembly 1222*a* on which the first magnet 1252*a* is disposed may move in a direction opposite to the Z-axis direction by the electromagnetic force DEM1 depending on the current direction. That is, the first optical driving magnet may move in a direction opposite to the electromagnetic force applied to the first optical driving coil. In addition, the direction of the electromagnetic force may be changed according to the current of the coil and the magnetic force of the magnet.

Therefore, the first lens assembly 1222*a* may move along a rail located on the inner surface of the housing through the first ball B1 in a direction parallel to the third direction or the optical axis direction (in both directions). In this case, the electromagnetic force DEM1 may be controlled in proportion to the current DE1 applied to the first coil 1251*a*.

The first lens assembly 1222*a* or the second lens assembly 1222*b* may include the first recess RS1 on which the first ball is seated. In addition, the first lens assembly 1222*a* or the second lens assembly 1222*b* may include the second recess RS2 on which the second ball B2 is seated. There may be a plurality of first recesses RS1 and second recesses RS2. The first recess RS1 may have a preset length in the optical axis direction (Z-axis direction). In addition, the second recess RS2 may have a preset length in the optical axis direction (Z-axis direction). Therefore, the movement distance of the first ball B1 and the second ball B2 may be adjusted in the optical axis direction in their respective recesses. In other words, the first recess RS1 or the second recess RS2 may act as stoppers for the first and second balls B1 and B2.

And in the camera device according to an embodiment, the second magnet 1252*b* may be provided in the second lens assembly 1222*b* by, for example, a unipolar magnetization method or the like.

The outer surface of the first magnet 1252*a* may be a surface which faces the first coil 1251*a*. A surface opposite to the first surface may be an N pole. Therefore, only one of the N pole and the S pole may be positioned to face the first coil 1251*a*. Herein, it will be described based on a case where the outer surface of the first magnet 1252*a* is the S pole. Furthermore, the first coil 1251*a* includes a plurality of sub-coils, and currents in the plurality of sub-coils may flow in opposite directions. That is, in a region of the first sub-coil SC1*a*, which is adjacent to the second sub-coil SC2*a*, the same current as 'DE1' may flow.

For example, in an embodiment, any one of the N pole and the S pole of the fifth magnet 1252*b* may be positioned to face the second coil 1251*b*. In an embodiment, a surface (first surface) facing the outer surface of the second magnet 1252*b* may be an S pole. Alternatively, the first surface may be an N pole. Hereinafter, it will be described based on a case where the first surface is an N pole as illustrated.

Furthermore, the second coil 1251*b* includes a plurality of sub-coils, and currents in the plurality of sub-coils may flow in opposite directions. That is, in a region of the third sub-coil SC1*b*, which is adjacent to the fourth sub-coil SC2*b*, the same current as 'DE2' may flow.

In an embodiment, when a magnetic force DM2 is applied from the first surface (N pole) of the second magnet 1252*b* in the second direction (Y-axis direction) and a current DE2 flows in the second coil 1251*b* corresponding to the N pole in the first direction (X-axis direction), an electromagnetic force DEM2 may act in the third direction (Z-axis direction) in accordance with the interaction of electromagnetic force (e.g., Fleming's left hand rule).

In this case, since the second coil 1251*b* is fixed to the side of the second housing, the second lens assembly 1222*b* on which the second magnet 1252*b* is disposed may move in a direction opposite to the Z-axis direction by the electromagnetic force DEM2 depending on the current direction. For example, as described above, the direction of the electromagnetic force may be changed according to the current of the coil and the magnetic force of the magnet. Therefore, the second lens assembly 1222*b* may move along a rail located on the inner surface of the second housing through the second ball B2 in a direction parallel to the third direction (Z-axis direction) In this case, the electromagnetic force DEM2 may be controlled in proportion to the current DE2 applied to the second coil 1251*b*.

Figure 13:
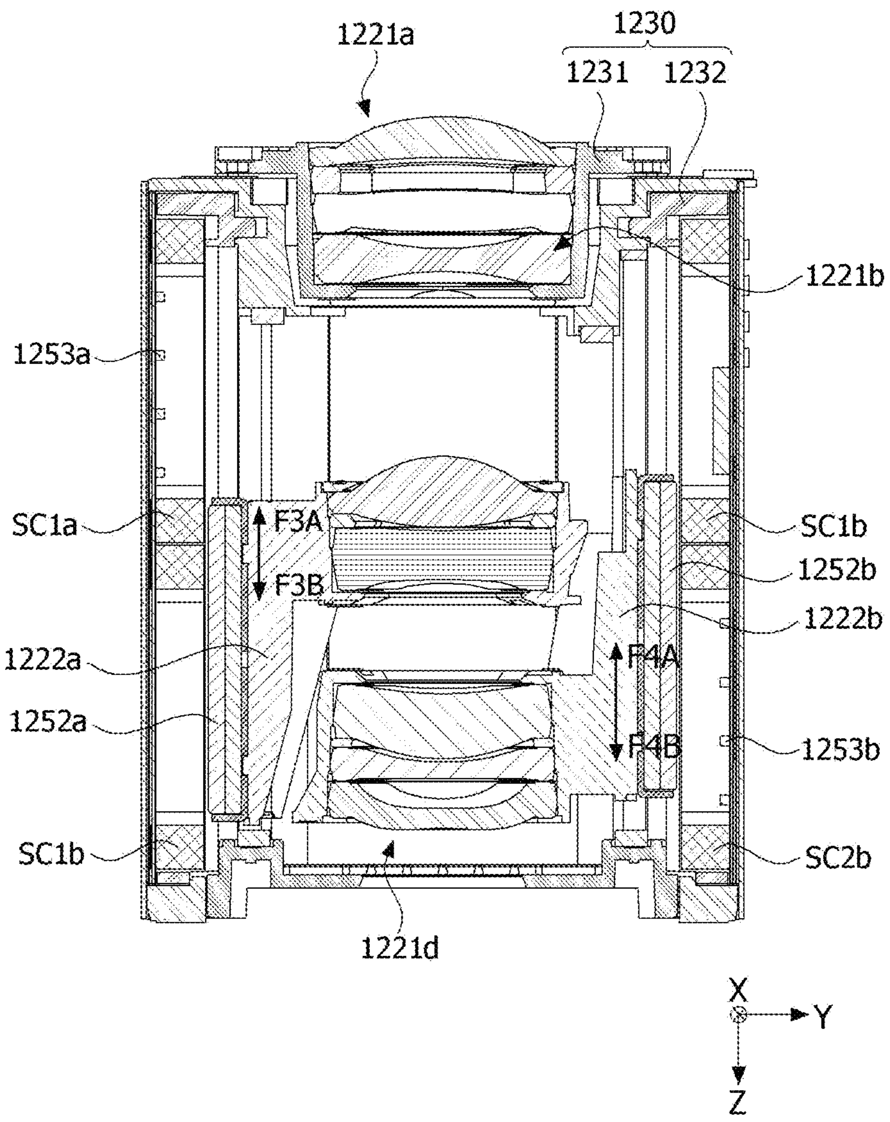
FIG. 13 is a diagram illustrating driving of a second camera actuator according to an embodiment.

FIG. 13 is a diagram illustrating driving of a second camera actuator according to an embodiment.

Referring to FIG. 13, in the camera device according to an embodiment, the first optical driving unit may provide driving forces F3A, F3B, F4A, and F4B for moving the first lens assembly 1222*a* and the second lens assembly 1222*b* of the lens unit 1220 along the third direction (Z-axis direction). As described, the first optical driving unit may include the first optical driving coil 1251 and the first optical driving magnet 1252. And the lens unit 1220 may move in the third direction (Z-axis direction) by the electromagnetic force formed between the first optical driving coil 1251 and the first optical driving magnet 1252.

In this case, the first coil 1251*a* and the second coil 1251*b* may be disposed in holes formed in the sides (e.g., the first side and the second side) of the second housing 1230. The second coil 1251*b* may be electrically connected to the first substrate 1271. The first coil 1251*a* may be electrically connected to the second substrate 1272. Therefore, the first coil 1251*a* and the second coil 1251*b* may be supplied with a driving signal (e.g., current) through the second substrate unit 1270 from a driving driver on the circuit board 1300.

At this time, by the electromagnetic forces F3A and F3B between the first coil 1251*a* and the first magnet 1252*a*, the first lens assembly 1222*a* having the first magnet 1252*a* seated thereon may move in the third direction (Z-axis direction). In addition, the second lens group 1221*b* seated on the first lens assembly 1222*a* may also move in the third direction.

And, by the electromagnetic forces F4A and F4B between the second coil 1251*b* and the second magnet 1252*b*, the second lens assembly 1222*b* having the second magnet 1252*b* seated thereon may move in the third direction (Z-axis direction). In addition, the third lens group 1221*c* placed on the second lens assembly 1222*b* may also move in the third direction.

Accordingly, the focal length or magnification of the optical system may be changed by the movement of the second and third lens groups 1221*b* and 1221*c* as described above. In an embodiment, the magnification may be changed by the movement of the second lens group 1221*b*. In other words, zooming may be performed. Also, the focus may be adjusted by the movement of the third lens group 1221*c*. In other words, auto focusing may be performed. Due to this configuration, the second camera actuator may be a fixed zoom or a continuous zoom.

Furthermore, the first Hall sensors 1253*a* and the second Hall sensors 1253*b* may be disposed in at least one of the first sub-coil and the second sub-coil. For example, the first Hall sensors 1253*a* and the second Hall sensors 1253*b* may also overlap each other in the second direction. Alternatively, the first Hall sensors 1253*a* and the second Hall sensors 1253*b* may not overlap each other in the second direction. Alternatively, the first Hall sensors 1253*a* and the second Hall sensors 1253*b* may partially overlap each other in the second direction.

Figure 14:
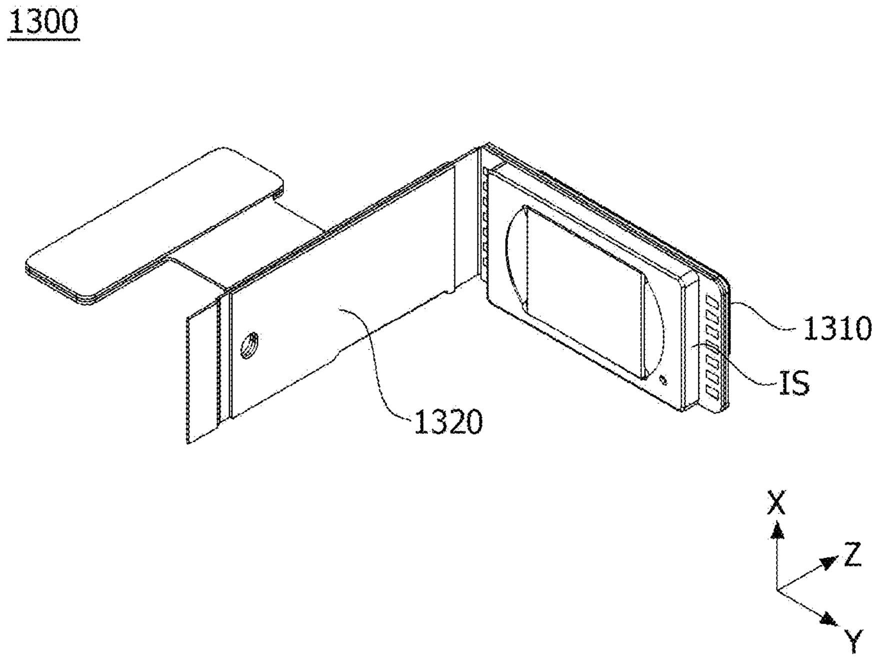
FIG. 14 is a schematic diagram illustrating a circuit board according to an embodiment.

FIG. 14 is a schematic diagram illustrating a circuit board according to an embodiment.

Referring to FIG. 14, as described above, the substrate board 1300 according to an embodiment may include a first substrate unit 1310 and a second substrate unit 1320. The first circuit board unit 1310 may be positioned below the base and coupled to the base. In addition, an image sensor IS may be disposed on the first circuit board unit 1310. The first circuit board unit 1310 and the image sensor IS may be electrically connected to each other.

Additionally, the second circuit board unit 1320 may be located on the side of the base. In particular, the second circuit board unit 1320 may be located on the first side of the base. Therefore, the second circuit board unit 1320 is positioned adjacent to the first coil positioned adjacent to the first side, so that electrical connection may be easily achieved.

Furthermore, the circuit board 1300 may further include a fixed board (not shown) positioned on its side. Accordingly, even if the circuit board 1300 is made of a flexible material, it may be coupled to the base while maintaining rigidity by the fixed board.

The second circuit board unit 1320 of the circuit board 1300 may be located on the side of the first optical driving unit 1250. The circuit board 1300 may be electrically connected to the second optical driving unit and the first optical driving unit. For example, the electrical connection may be made by SMT. However, this is not a limitation.

The circuit board 1300 may include a circuit board having wiring patterns for electrical connection, such as a rigid printed circuit board (Rigid PCB), a flexible printed circuit board (Flexible PCB), or a rigid flex printed circuit board (RigidFlexible PCB). However, these types are not construed as a limitation.

In addition, the circuit board 1300 may be electrically connected to another camera module in the terminal or a processor in the terminal. Accordingly, the forgoing camera actuator and the camera device including the same may send and receive various signals in the terminal.

Figure 15:
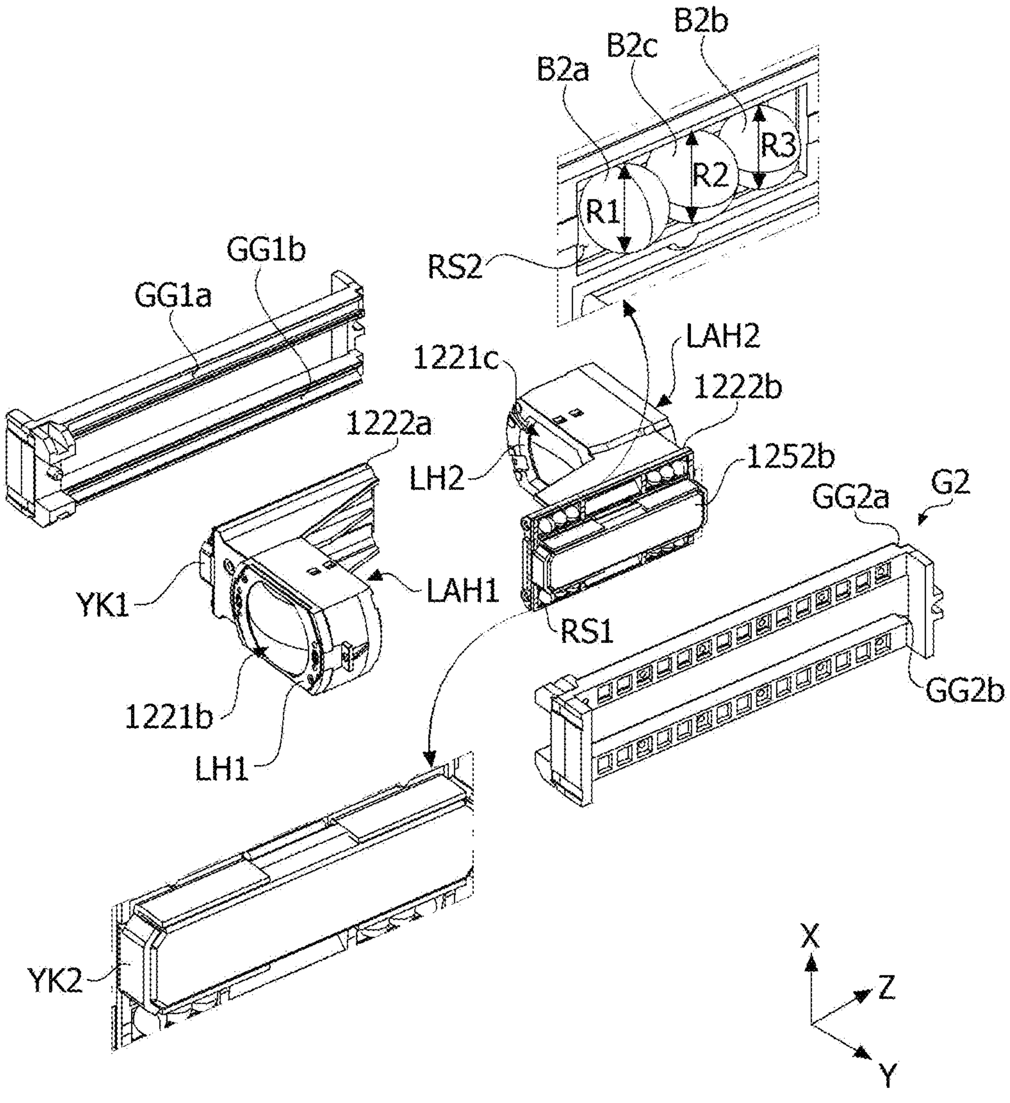
FIG. 15 is a perspective view illustrating a partial configuration of a second camera actuator according to an embodiment.

FIG. 15 is a perspective view illustrating a partial configuration of a second camera actuator according to an embodiment.

Referring to FIG. 15, the first lens assembly 1222*a* and the second lens assembly 1222*b* may be spaced apart from each other in the optical axis direction (Z-axis direction). And the first lens assembly 1222*a* and the second lens assembly 1222*b* may move along the optical axis direction (Z-axis direction) by the first optical driving unit. For example, an Auto Focus or Zoom function may be performed by movement of the first lens assembly 1222*a* and the second lens assembly 1222*b*.

In addition, the first lens assembly 1222*a* may include a first lens holder LAH1 that holds and combines the second lens group 1221*b*. The first lens holder LAH1 may be coupled to the second lens group 1221*b*. In addition, the first lens holder LAH1 may include a first lens hole LH1 for accommodating the second lens group 1221*b*. That is, the second lens group 1221*b* including at least one lens may be disposed in the first lens hole LH1. The first guide unit G1 may be spaced apart from one side of the first lens holder LAH1. For example, the first guide unit G1 and the first lens holder LAH1 may be sequentially disposed in the second direction (Y-axis direction).

And the second lens assembly 1222*b* may include a second lens holder LAH2 that holds and combines the third lens group 1221*c*. In addition, the second lens holder LAH2 may include a second lens hole LH2 for accommodating the third lens group 1221*c*. That is, at least one lens may be disposed in the second lens hole LH2.

The second guide unit G2 may be disposed on the other side of the second lens holder LAH2. The second guide unit G2 may be disposed to face the first guide unit G1.

In an embodiment, the first guide unit G1 and the second guide unit G2 may at least partially overlap in the second direction (Y-axis direction). With this configuration, the space efficiency of the first optical driving unit for the movement of the first and second lens assemblies within the second camera actuator is improved, so that the second camera actuator can be easily miniaturized.

In addition, the second guide unit G2 and the second lens holder LAH2 may be sequentially disposed in a direction opposite to the second direction (Y-axis direction).

T first ball, the first coil, and the like may be disposed in the first guide unit G1 as described above, and the second ball, the second coil, and the like may be disposed in the second guide unit G2 as described above.

In addition, according to an embodiment, the first and second lens assemblies 1222*a* and 1222*b* may include yokes YK1 and YK2 disposed on their sides, respectively.

The first yoke YK1 may be positioned on the side of the first lens assembly 1222*a*. The second yoke YK2 may be positioned on the side of the second lens assembly 1222*b*. At least a portion of the first yoke YK1 and the second yoke YK2 may extend outward. Therefore, the first yoke YK1 may surround at least a portion of the side of the first magnet 1252*a*. As shown, the first yoke YK1 may have various structures surrounding an inner surface and a portion of the side of the first magnet 1252*a*. For example, the first yoke YK1 may be formed of divided members, and each divided member may be positioned on the inner surface and the side of the first magnet 1252*a*. Therefore, the coupling force between the unipolar magnetized first optical driving magnet and the yoke may be improved. Similarly, the second yoke YK2 may surround at least a portion of the side of the second magnet 1252*b*. As shown, the second yoke YK2 may have various structures surrounding the inner surface and a portion of the side of the second magnet 1252*b*. For example, the second yoke YK2 may be formed of divided members, and each divided member may be positioned on the inner surface and the side of the second magnet 1252*b*.

Furthermore, the yoke may also be positioned to be coupled with not only to the first optical driving magnet but also to the first optical driving coil.

And a plurality of balls may be located on the outer surfaces of the lens assemblies. As described above, the first ball B1 may be located on the outer surface of the first lens assembly 122*a*. The second ball B2 may be located on the outer surface of the second lens assembly 122*b*.

There may be a plurality of first balls B1 and second balls B2. For example, a plurality of first balls B1 may be disposed side by side along an optical axis direction (Z-axis direction) in one recess of the first lens assembly 122*a*. A plurality of second balls B2 may be disposed side by side along an optical axis direction (Z-axis direction) in one recess of the second lens assembly 122*b*.

For example, the second ball B2 may include a first sub-ball B2*a*, a second sub-ball B2*b*, and a third sub-ball B2*c*. The first sub-ball B2*a*, the second sub-ball B2*b*, and the third sub-ball B2*c* may be disposed side by side along the optical axis direction. Therefore, the first sub-ball B2*a*, the second sub-ball B2*b*, and the third sub-ball B2*c* may at least partially overlap each other in the optical axis direction.

And the first sub-ball B2*a* and the second sub-ball B2*b* may be positioned at respective edges among the plurality of balls. The third sub-ball B2*c* may be positioned between the first sub-ball B2*a* and the second sub-ball B2*b*.

The plurality of balls may have the same diameter or different diameters from each other. For example, at least some of the first sub-ball B2*a*, the second sub-ball B2*b*, and the third sub-ball B2*c* may have the same diameter R1, R3, R2. In addition, diameters R1, R3, and R2 of the first sub-ball B2*a*, the second sub-ball B2*b*, and the third sub-ball B2*c* may be different from each other.

In an embodiment, the diameters R1 and R3 of the balls (i.e., the first and second sub-balls) located at the respective edges may be smaller than the diameter R2 of the ball (i.e., the third sub-ball) interposed among the plurality of balls. For example, the diameters R1 and R3 of the first sub-ball B2*a* and the second sub-ball B2*b* may be smaller than diameter R2 of the third sub-ball B2*c*. With this configuration, the movement of the lens assembly by a plurality of balls may be accurately performed without being tilted to one side.

In addition, as described above, the optical driving magnet may include a plurality of magnets, a first magnet and a second magnet. And the first magnet and the second magnet face each other, and the same pole may be disposed outside them. That is, a first surface (an outer surface) of the first magnet and a first surface (an outer surface) of the second magnet may have a first pole. And the second surface (an inner surface) of the first magnet and the second surface (an inner surface) of the second magnet may have a second pole.

Figure 16:
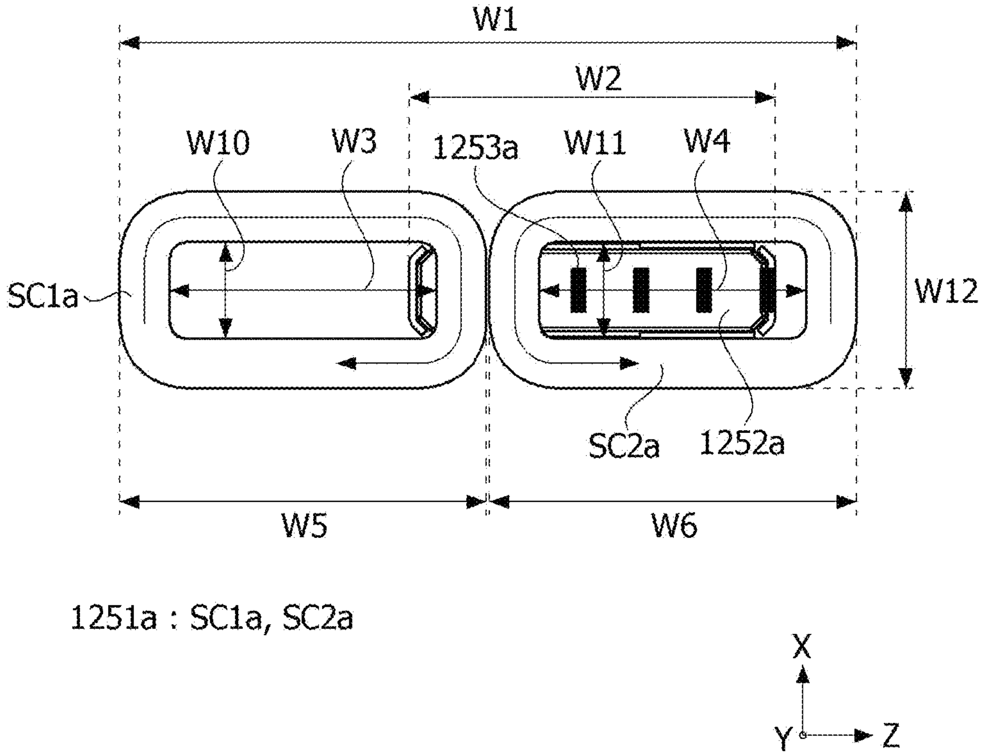
FIG. 16 is a diagram illustrating a first optical driving coil, a first optical driving magnet, and a yoke according to an embodiment.
Figure 17:
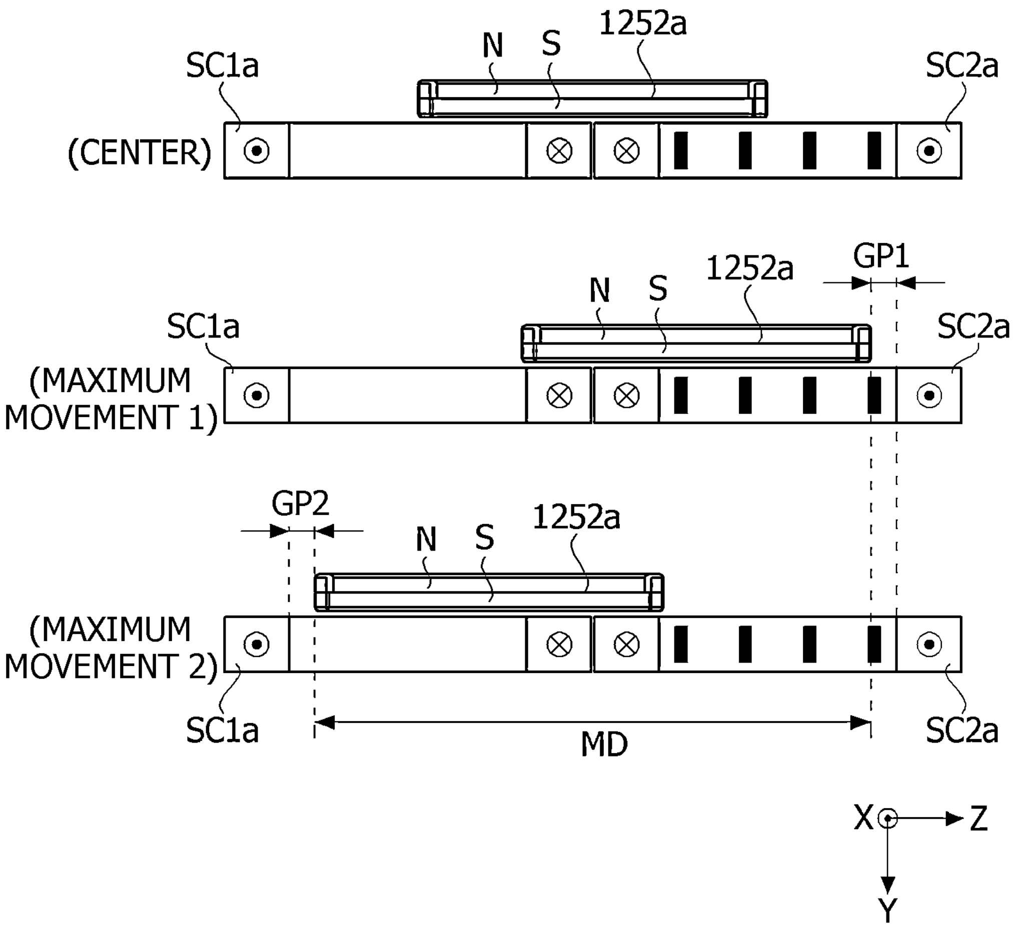
FIG. 17 is a diagram explaining the movement of a first optical driving magnet by a second driving unit according to an embodiment.
Figure 18:
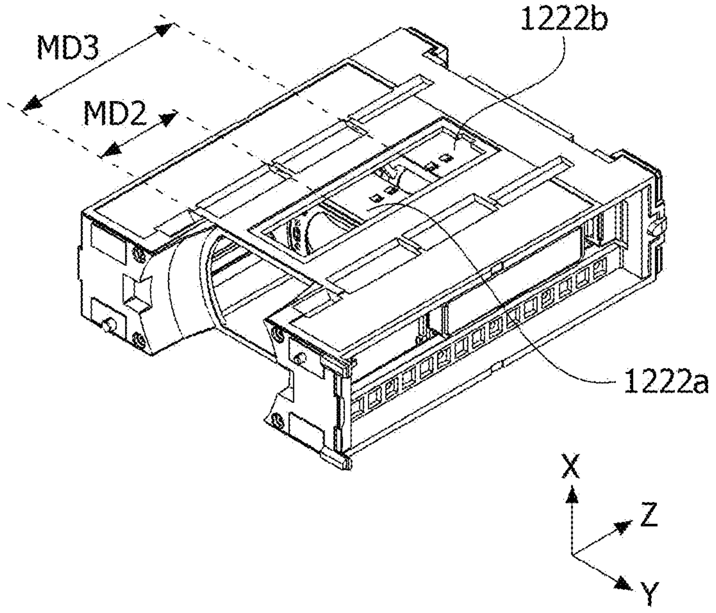
FIG. 18 is a diagram explaining the movement of second and third lens assemblies according to an embodiment.

FIG. 16 is a diagram illustrating a first optical driving coil, a first optical driving magnet, and a yoke according to an embodiment, FIG. 17 is a diagram explaining movement of a first optical driving magnet by a first driving unit according to an embodiment, and FIG. 18 is a diagram explaining movement of second and third lens assemblies according to an embodiment.

Referring to FIGS. 16 to 18, a length W5 of the first sub-coil SC1*a* in the optical axis direction (Z-axis direction) may be equal to a length W6 of the second sub-coil SC2*a* in the optical axis direction (Z-axis direction). With this configuration, controlling the driving force by the first sub-coil SC1*a* and the second sub-coil SC2*a* may be easily performed.

In addition, the total length W1 (or a maximum length) of the first optical driving coil in the optical axis direction (Z-axis direction) may be greater than the length W2 (a maximum length) of the first optical driving magnet 1252*a* in the optical axis direction (Z axis direction). With this configuration, a stroke by the first optical driving magnet may be performed to the maximum. Furthermore, a long stroke by the first optical driving magnet, which is unipolar magnetized, may be performed.

In an embodiment, the maximum movement distance MD of the first lens assembly in the optical axis direction may be greater than the length W10 of the hole (or hollow portion) of the first sub-coil SC1*a* in a short axis direction (first direction), and may be equal to or smaller than the length W3 of the hole (or hollow portion) of the first sub-coil SC1*a* in a long axis direction (optical direction or third direction).

In addition, the maximum movement distance MD of the first lens assembly may be greater than the length of the hole (or hollow portion) of the second sub-coil SC2*a* in a short axis direction (first direction), and may be equal to or smaller than the length W4 of the hole (or hollow portion) of the second sub-coil SC2*a* in a long axis direction (optical direction or third direction).

Further, in an embodiment, the maximum movement distance MD3 of the second lens assembly in the optical axis direction may be greater than the length of the hole (or hollow portion) of the third sub-coil SC1*b* in a short axis direction (first direction), and may be equal to or smaller than the length of the hole (or hollow portion) of the third sub-coil SC1*b* in a long axis direction (optical direction or third direction).

The maximum movement distance MD3 of the first lens assembly may be greater than the length of the hole (or hollow portion) of the fourth sub-coil SC2*b* in a short axis direction (first direction), and may be equal to or smaller than the length of the hole (or hollow portion) of the fourth sub-coil SC2*b* in a long axis direction (optical direction or third direction).

Furthermore, the length W3 of the inner hole of the first sub-coil SC1*a* in the optical axis direction and the length W4 of the inner hole of the second sub-coil SC2*a* in the optical axis direction may be the same.

In addition, the length W2 of the driving magnet 1252*a* in the optical axis direction (Z-axis direction) may be greater than the length W3 of the inner hole of the first sub-coil SC1*a* in the optical axis direction. And the length W2 of the driving magnet 1252*a* in the optical axis direction (Z-axis direction) may be greater than the length W4 of the inner hole of the second sub-coil SC2*a* in the optical axis direction. Thus, the first optical driving magnet may move along the optical axis within the entire length of the first optical driving coil in the optical axis direction.

The maximum length (or width, W11) of the first driving magnet in a short axis direction (or first direction) may be less than the maximum length (or width, W12) of the first driving coil in a short axis direction (or first direction). In this case, the maximum length of the first driving coil in a short axis direction (or first direction) may correspond to the distance between the outermost edges of the first driving coil spaced apart in the first direction.

Also, in an embodiment, the hollow portion (or hole) of one coil in the first optical driving coil in the optical direction may have the length greater than the length in a short axis direction or the first direction. For example, the length W3 of the first sub-coil SC1*a* in the long axis direction (optical direction or third direction) may be greater than the length W10 of the first sub-coil SC1*a* in the short axis direction (first direction) of the hole (or hollow portion). In addition, the horizontal length (or width) of the hollow portion of the sub-coil may be greater than the vertical length (or height) thereof.

The length W2 of the first optical driving magnet (or the first and second driving magnets) in the optical axis direction (Z-axis direction) may be greater than the length W3 or W4 of any one of the hollow portions (or holes) of the respective sub-coils (first to fourth sub-coils) in the optical axis direction.

The length W2 of the first optical driving magnet (or the first and second driving magnets) in the optical axis direction (Z-axis direction) may be less than the length or range W7 from one side of the inner hole of the first sub-coil SC1*a* to the other side of the inner hole of the second sub-coil SC2*a*. Here, one side and the other side of a sub-coil mean ends in opposite directions along the optical axis direction.

The length W2 of the first optical driving magnet (or the first and second driving magnets) in the optical axis direction (Z-axis direction) may be less than the length or range W8 from one side of the inner hole of the first sub-coil SC1*a* to one side of the inner hole of the second sub-coil SC2*a*.

Furthermore, the length W2 of the first optical driving magnet (or the first and second driving magnets) in the optical axis direction (Z-axis direction) may be less than the length or range (W9) from one side of the inner hole of the first sub-coil SC1*a* to one side of the inner hole of the second sub-coil SC2*a*.

The length W2 (maximum length) of the first optical driving magnet in the optical axis direction (Z-axis direction) may be less than the length W5 of the first sub-coil SC1*a* in the optical axis direction (Z-axis direction).

With this configuration, no counter electromotive forces are generated in the movement of the lens assembly along the optical axis direction, and a long stroke may be realized.

The length (maximum length, W2) of the first optical driving magnet (or the first and second driving magnets) in the optical axis direction (Z-axis direction) may be 0.6 times or less than the corresponding maximum length W1 of the first driving coil in the optical axis direction. Preferably, the length (maximum length, W2) of the first optical driving magnet (or the first and second driving magnets) in the optical axis direction (Z-axis direction) may be 0.55 times or less than the corresponding maximum length W1 of the first driving coil in the optical axis direction. More preferably, the length (maximum length, W2) of the first optical driving magnet (or first and second driving magnets) in the optical axis direction (Z-axis direction) may be 0.5 times or less than the corresponding maximum length W1 of the first driving coil in the optical axis direction. Accordingly, the camera device may provide a long stroke in a state of minimizing counter electromotive force.

The maximum movement distance MD of the first lens assembly in the optical axis direction may be less than the length (maximum length, W2) of the first optical driving magnet (or the first and second driving magnets) in the optical axis direction (Z-axis direction). For example, the maximum movement distance MD of the first lens assembly in the optical axis direction may be 0.66 times or more to 0.92 times or less than the length (maximum length, W2) of the first optical driving magnet (or the first and second driving magnets) in the optical axis direction (Z-axis direction). Preferably, the maximum movement distance MD of the first lens assembly in the optical axis direction may be 0.7 times or more to 0.90 times or less than the length (maximum length, W2) of the first optical driving magnet (or the first and second driving magnets) in the optical axis direction (Z-axis direction). More preferably, the maximum movement distance MD of the first lens assembly in the optical axis direction may be 0.74 times or more to 0.88 times or less than the length (maximum length, W2) of the first optical driving magnet (or the first and second driving magnets) in the optical axis direction (Z-axis direction). Therefore, it is possible to suppress the generation of counter electromotive forces as much as possible.

In an embodiment, the total length W1 (or maximum length) of the first optical driving coil in the optical axis direction (Z-axis direction) may be 18 mm to 20 mm. Furthermore, the length W2 of the first optical driving magnet in the optical axis direction (Z-axis direction) may be 8 mm to 12 mm. And the length W3 of the hole (or hollow portion) of the first sub-coil SC1*a* in the long axis direction (optical axis direction or third direction) may be 5.6 mm to 8.7 mm. The length W4 of the hole (or hollow portion) of the second sub-coil SC2*a* in the long axis direction (optical axis direction or third direction) may be 5.6 mm to 8.7 mm.

The length W5 of the first sub-coil SC1*a* in the optical axis direction (Z-axis direction) may be 8 mm to 10 mm. However, as described above, the length W5 of the first sub-coil SC1*a* in the optical axis direction (Z-axis direction) may be greater than or equal to the length W2 of the first optical driving magnet in the optical axis direction (Z-axis direction).

In addition, the length W6 of the second sub-coil SC2*a* in the optical axis direction (Z-axis direction) may be 8 mm to 10 mm. However, as described above, the length W5 of the second sub-coil SC2*a* in the optical axis direction (Z-axis direction) may be greater than or equal to the length W2 of the first optical driving magnet in the optical axis direction (Z-axis direction).

The length W7 from one side of the inner hole of the first sub-coil SC1*a* to the other side of the inner hole of the second sub-coil SC2*a* may be 13.6 mm to 20.7 mm.

The length or range W8 from one side of the inner hole of the first sub-coil SC1*a* to one side of the inner hole of the second sub-coil SC2*a* may be 8 mm to 12 mm. In addition, the length or range W8 from one side of the inner hole of the first sub-coil SC1*a* to one side of the inner hole of the second sub-coil SC2*a* may be greater than the length W2 of the first optical driving magnet in the optical axis direction (Z-axis direction).

The length or range W9 from one side of the inner hole of the first sub-coil SC1*a* to one side of the inner hole of the second sub-coil SC2*a* may be 8 mm to 12 mm. The length or range W9 from one side of the inner hole of the first sub-coil SC1*a* to one side of the inner hole of the second sub-coil SC2*a* may be greater than or equal to the length W2 of the first optical driving magnet in the optical axis direction (Z-axis direction).

In an embodiment, depending on the unipolar magnetism of the first optical drive magnet, currents may flow in different directions in the first sub-coil SC1*a* and the second sub-coil SC2*a*. For example, current may flow in one of clockwise or counterclockwise direction in the first sub-coil SC1*a*, and current may flow in the other of clockwise or counterclockwise direction in the second sub-coil SC2*a*.

Furthermore, the length W2 of the first optical driving magnet in the optical axis direction (Z-axis direction) may be greater than the movement distances MD2 and MD3 of the lens assembly in the optical axis direction. That is, the length W2 of the first optical driving magnet in the optical axis direction (Z-axis direction) may be greater than the maximum movement distance of the first lens assembly or the maximum movement distance of the second lens assembly. With this configuration, a driving force for movement in the optical axis direction may be safely provided.

The first optical driving magnet (e.g., the first magnet 1252*a*) may move in a range W7 from one side of the inner hole of the first sub-coil SC1*a* to the other side of the inner hole of the second sub-coil SC2*a* in the optical axis direction (Z-axis direction). That is, the first optical driving magnet may move within the maximum movement distance (or stroke) MD of the hole in the first optical driving coil in the optical axis direction.

In addition, the lens assembly may include a plurality of lens assemblies as described above, and a lens assembly disposed at the rear end among the plurality of lens assemblies may have a greater movement distance in the optical axis direction than a lens assembly disposed at the front end.

For example, the movement distance MD2 of the first lens assembly 1222*a* in the optical axis direction (Z-axis direction) may be less than the movement distance MD3 of the second lens assembly 1222*b* in the optical axis direction (Z-axis direction). In other words, the movement distance of the second lens assembly 1222*b* in the optical axis direction may be greater than the movement distance of the first lens assembly in the optical axis direction. The first lens assembly 1222*a* may be positioned at a front end of the second lens assembly 1222*b*.

In the camera actuator according to an embodiment, the first optical drive magnet 1252*a* may move from a 'CENTER' to a 'MAXIMUM MOVEMENT 1 or a 'MAXIMUM MOVEMENT 2'. Here, in the case of 'CENTER', the first optical driving magnet 1252*a* may overlap the first sub-coil SC1*a* and the second sub-coil SC2*a* in the second direction. In other words, both the first sub-coil SC1*a* and the second sub-coil SC2*a* may face the first optical driving magnet.

Since the coils are extending in the first direction and provide driving force by an actual electromagnetic force, an area where the first sub-coil SC1*a* and the first optical driving magnet 1252*a* overlap may be the same as an area where the second sub-coil SC2*a* and the first optical driving magnet 1252*a* overlap. Therefore, the generation of counter electromotive forces may be minimized to realize a long stroke.

In the case of 'MAXIMUM MOVEMENT 1', it may correspond to a case where the first optical driving magnet 1252*a* maximally moves in a direction opposite to the third direction (Z-axis direction). In this case, the first optical driving magnet 1252*a* may have a larger overlapping area with the first sub-coil SC1*a* than the second sub-coil SC2*a*. Furthermore, the first optical driving magnet 1252*a* may at least partially overlap the inner hole of the first sub-coil SC1*a*. More specifically, the first optical driving magnet 1252*a* may be spaced apart from the edge of the inner hole of the first sub-coil SC1*a* by a predetermined separation distance GP2 in the optical axis direction. With this configuration, counter electromotive forces generated at the end of the first sub-coil SC1*a* may be reduced. For example, the first optical driving magnet 1252*a* may be moved with a maximum stroke to a region that does not overlap an end of the first sub-coil SC1*a* which is position in a direction opposite to the optical axis direction in the second direction (Y-axis direction).

In a case of 'MAXIMUM MOVEMENT 2', it may correspond to a case where the first optical driving magnet 1252*a* maximally moves in the third direction (Z-axis direction). In this case, the first optical driving magnet 1252*a* may have a larger area overlapping the second sub-coil SC2*a* rather than the first sub-coil SC1*a*. Furthermore, the first optical driving magnet 1252*a* may at least partially overlap the inner hole of the second sub-coil SC2*a*. More specifically, the first optical driving magnet 1252*a* may be spaced apart from the edge of the inner hole of the second sub-coil SC2*a* by a predetermined separation distance GP1 in the optical axis direction. With this configuration, counter electromotive forces generated at the end of the second sub-coil SC2*a* may be reduced. For example, the first optical driving magnet 1252*a* may be moved with a maximum stroke to a region that does not overlap the end of the second sub-coil SC2*a* which is position in the optical axis direction in the second direction (Y-axis direction).

Therefore, even if the length of the first optical driving magnet 1252*a* is small in the optical axis direction, the long stroke of the camera actuator may be efficiently implemented by help of the unipolar magnetization and the current directions of the plurality of the first optical driving coils.

The maximum movement distance of the first optical driving magnet 1252*a* may correspond to the length of the first and second recesses in the optical axis direction, which accommodate the first ball or the second ball in the above-described first lens assembly. In addition, the maximum movement distance of the first optical driving magnet 1252*a* may correspond to the distance that the first optical driving magnet 1252*a* has moved from the MAXIMUM MOVEMENT 1 to the MAXIMUM MOVEMENT 2 in the optical axis direction (Z-axis direction). Alternatively, the maximum movement distance of the first optical driving magnet 1252*a* may correspond to an interval between the stoppers that restrict movement of the first ball or the second ball in the optical axis direction. Alternatively, the maximum movement distance of the first optical driving magnet 1252*a* may be the maximum distance that the bobbin can move, which may correspond to the separation distance in the optical axis direction between a stopper located in the optical axis direction and a stopper located in the opposite direction to the optical axis direction with respect to the bobbin.

In addition, the maximum movement distance of the first optical driving magnet 1252*a* may correspond to twice the distance moved from the CENTER to the MAXIMUM MOVEMENT 1. The movement distance of the first optical driving magnet 1252*a* according to an embodiment may be from −4 mm to +4 mm with respect to the CENTER. In detail, the movement distance of the first optical driving magnet 1252*a* may be from −3.8 mm to +3.8 mm with respect to the CENTER. In more detail, the movement distance of the first optical driving magnet 1252*a* may be from −3.5 mm to +3.5 mm with respect to the CENTER. Here, the movement distance from the CENTER in the optical axis direction is referred to as '+', and the movement distance from the CENTER in a direction opposite to the optical axis direction is referred to as '-'. Accordingly, the first optical driving magnet 1252*a* (or at least one of the first lens assembly and the second lens assembly) according to an embodiment may move in a range of 0 mm to 12 mm along the optical axis direction. In addition, the above-described maximum movement distance may correspond to the maximum stroke of the lens assembly in the camera module.

As described above, the third housing yoke according to an embodiment may suppress the magnetic force generated by the first magnet and the second magnet from being moved to the opposite side.

Figure 19:
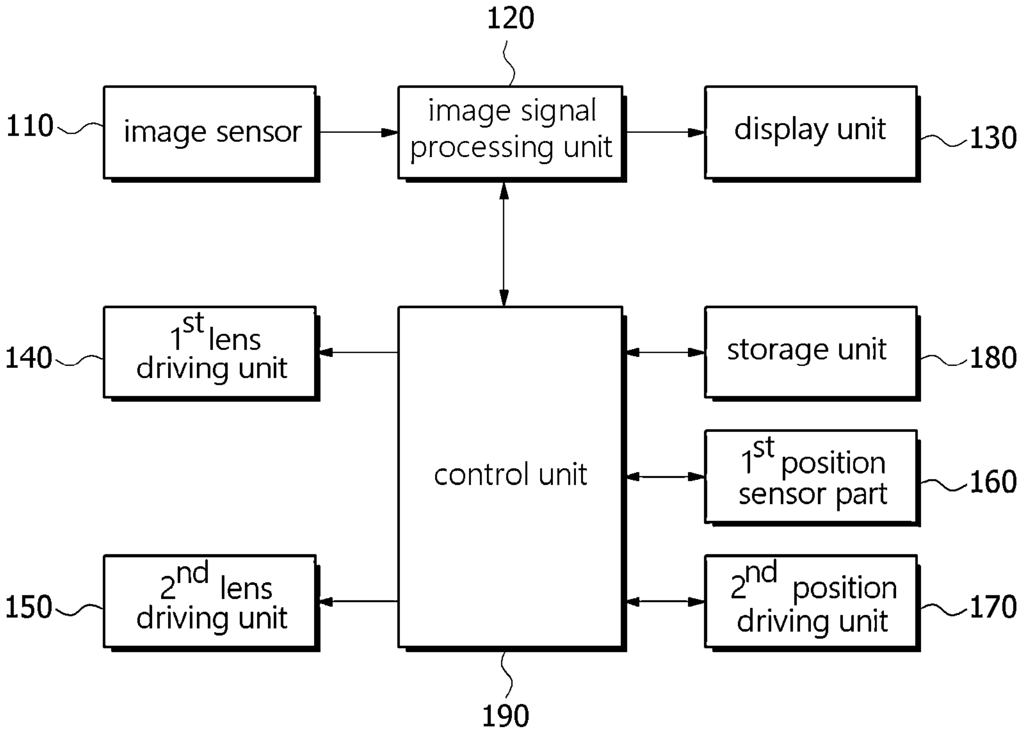
FIG. 19 is a block diagram showing the configuration of a camera device according to an embodiment of the present invention.
Figure 20:
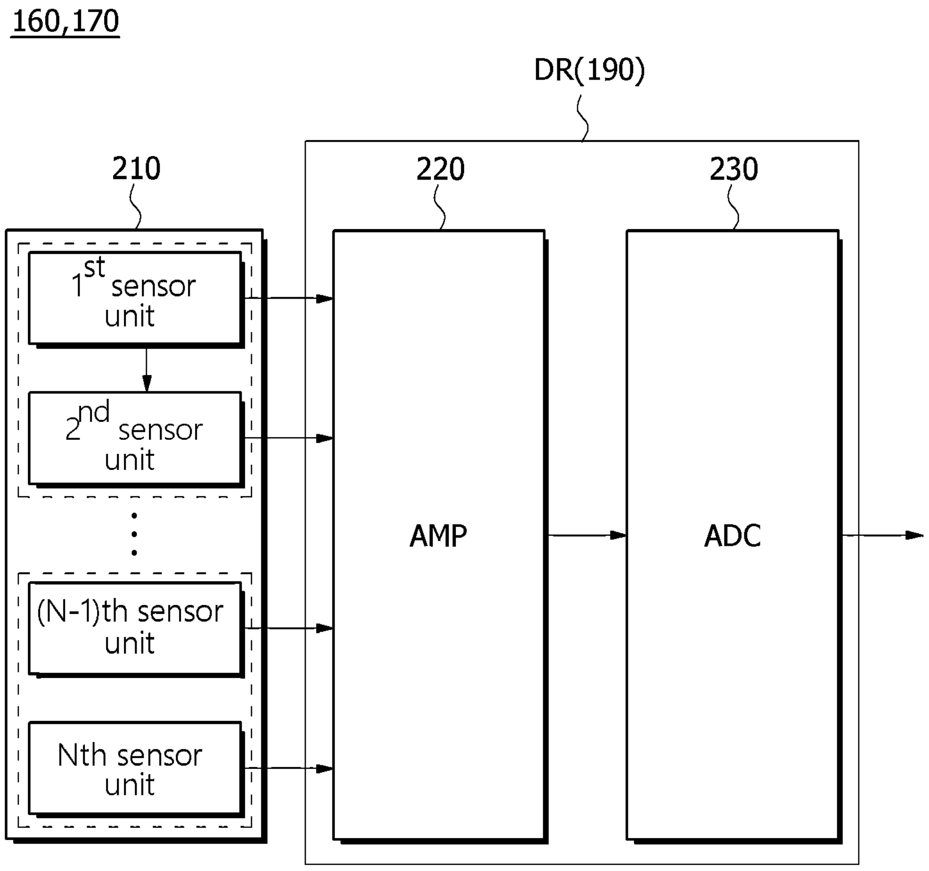
FIG. 20 is a block diagram showing the detailed configuration of the position sensor part in FIG. 19.

FIG. 19 is a block diagram showing the configuration of a camera device according to an embodiment of the present invention, and FIG. 20 is a block diagram showing the detailed configuration of the position sensor part of FIG. 19.

Referring to FIG. 19, the camera device includes an image sensor 110, an image signal processing unit 120, a display unit 130, a first lens driving unit 140, a second lens driving unit 150, a first position sensor part 160, a second position sensor part 170, a storage unit 180, and a control unit 190.

As described above, the image sensor 110 processes an optical image of a subject formed through a lens. To this end, the image sensor 110 may preprocess an image obtained through the lens. Also, the image sensor 110 may convert the preprocessed image into electrical data and output the converted image.

This image sensor 110 corresponds to the above-described image sensor IS. In addition, the image sensor 110 is a sensor having form in which a plurality of photodetectors are integrated as pixels, and converts image information of the subject into electrical data and outputs the converted electrical data. The image sensor 110 accumulates the amount of input light and outputs an image captured by the lens according to the amount of accumulated light according to a vertical synchronization signal. At this time, image acquisition is performed by the image sensor 110 that converts light reflected from the subject into an electrical signal. Meanwhile, in order to obtain a color image using the image sensor 110, a color filter is required, and for example, a color filter array (CFA) filter may be employed. CFA transmits only light representing one color per pixel, has a regularly arranged structure, and has various forms depending on the arrangement structure.

The image signal processing unit 120 processes the image output through the image sensor 110 in units of frames. At this time, the image signal processing unit 120 may also be referred to as an ISP (image signal processor).

At this time, the image signal processing unit 120 may include a lens shading compensation unit (not shown). The lens shading compensation unit is a block for compensating for a lens shading phenomenon that appears differently in the amount of light in the center and edge areas of the image, and receives a lens shading setting value from the control unit 190 to be described later, and compensates the color of the center and edge areas of the image.

Furthermore, the lens shading compensation unit may receive shading variables set differently according to the type of lighting and process lens shading of the image according to the received variables. Accordingly, the lens shading compensation unit may perform the lens shading process by applying a different degree of shading according to the type of lighting. Meanwhile, the lens shading compensation unit may receive shading variables set differently according to an automatic exposure weight applied to a specific region of the image in order to prevent saturation from occurring in the image, and may process lens shading of the image according to the received variable. More specifically, the lens shading compensation unit compensates for a brightness change occurring in an edge region of the image signal as an automatic exposure weight is applied to the center region of the image signal. That is, when the saturation of the image signal occurs due to lighting, the intensity of light decreases from the center to the periphery in a shape of concentric circle, so the lens shading compensation unit amplifies the edge signal of the image signal to compensate for the brightness compared to the center.

Meanwhile, the image signal processing unit 120 may measure sharpness of an image obtained through the image sensor 110. That is, the image signal processing unit 120 may measure the sharpness of the image in order to check the focus accuracy of the image acquired through the image sensor 110. Sharpness may be measured for each image acquired according to the position of the focus lens.

The display unit 130 displays a captured image under the control of a control unit 190 to be described later, and displays a setting screen required for taking a photo or a screen for selecting an operation by a user. It may be provided to another mobile device or portable device.

The first lens driving unit 140 may correspond to the above-described first optical driving unit 1150 (see FIG. 4). That is, in the first lens driving unit 140, an electromagnetic interaction may be made between the third to fifth coils and the third to fifth magnets in response to the control signal received from the control unit 190. And OIS may be performed by this interaction.

The second lens driving unit 150 may correspond to the aforementioned second optical driving unit 1250 (see FIG. 8). That is, in the second lens driving unit 150, an electromagnetic interaction may be made between the first and second coils and the first and second magnets in response to the control signal received from the control unit 190. Zooming or AF may be performed by this interaction.

For example, the focus lens may be moved in the optical axis direction.

The first position sensor part 160 includes a plurality of Hall sensors of the first camera actuator described above, and accordingly detects the position of the mover or optical member. That is, the first position sensor part 160 may detect the position of the first optical driving unit disposed on the mover. This is to control the position of the first mover or optical member. And the first position sensor part 160 provides position data for moving the mover or optical member.

The second position sensor part 170 includes a plurality of Hall sensors of the second camera actuator described above, and accordingly detects the position of the lens assembly, driving magnet, or lens unit 1220 (see FIG. 9). That is, the second position sensor part 170 may detect the position of the second optical driving unit adjacent to the lens unit 1220. This is to control the position of the lens unit. And the second position sensor part 170 provides position data for moving the lens unit.

The storage unit 180 stores data necessary for the camera device to operate. In particular, information on the zoom position and focus position for each distance to the subject may be stored in the storage unit 180. That is, the focus position may be a position of a focus lens for accurately focusing the subject. Also, the focus position may change according to the zoom position of the zoom lens and the distance to the subject. Accordingly, the storage unit 180 stores data on a zoom position and a focus position corresponding to the zoom position according to a distance.

The control unit 190 controls overall operations of the camera device. In particular, the control unit 190 may control the first position sensor part 160 and the second position sensor part 170 to provide an auto focus function. Furthermore, the control unit 190 may include a driver DR to be described later. Also, as described above, the driving unit may sense the position of the driving magnet from the Hall sensor and provide current to the driving coil. That is, in a camera device or a lens driving device, the driving unit may be a concept including a control unit 190 and first and second lens driving units.

The control unit 190 detects the position of the mover or optical member through the first position sensor part 160. Preferably, the control unit 190 detects the current position of the mover or optical member through the first position sensor part 160 in order to move the mover or optical member to a target position.

And when the current position of the mover or optical member is detected through the first position sensor part 160, the control unit 190 supplies a control signal to the first lens driving unit 140 to move the mover or optical member to the target position based on the current position of the mover or optical member.

In addition, the control unit 190 detects the position of the lens unit through the second position sensor part 170. The control unit 190 detects the current position of the lens unit through the second position sensor part 170 in order to move the lens unit to the target position.

When the current position of the lens unit is detected through the second position sensor part 170, the control unit 190 may supply a control signal for moving the lens unit to a target position based on the current position of the lens unit to the second lens driving unit 150.

At this time, a differential signal of detection signals detected by a plurality of sensor units constituting each sensor unit may be input to the control unit 190 through the first position sensor part 160 and the second position sensor part 170.

In the present invention, each of the first position sensor part 160 and the second position sensor part 170 includes a plurality of sensor units (corresponding to the above-described 'Hall sensors'). And, the plurality of sensor units performs a detection operation at each installation position. That is, the plurality of sensor units may detect the position of the mover, the position of the lens unit, and the like. At this time, in the present invention, the positions of the mover or the optical member and the lens unit may be respectively detected using differential signals of detection signals obtained through the plurality of sensor units.

Then, the signals detected by the plurality of sensor units are respectively input to the control unit 190, and accordingly, the position of the mover, optical member, second lens assembly, or driving magnet may be detected based on the differential signal.

However for the above configuration, an amplifier and an analog-to-digital converter need be disposed in a predetermined sensor unit. In addition, the control unit 190 may include a plurality of connection terminals connected to an analog-to-digital converter connected to a predetermined sensor unit.

In the present invention, digital data for the differential signal is obtained at the front-end, and accordingly, the acquired digital data is input to the control unit 190.

In other words, in the present invention, digital data may be acquired from the first position sensor part 160 and the second position sensor part 170, and accordingly, only the acquired digital data may be input to the control unit 190. Hereinafter, the second position sensor part 170, the second lens driving unit 150, and the control unit 190 (including a driver) will be described in detail.

The Hall sensors in the second position sensor part 170 may have the same configuration one another and may be respectively connected to the control unit 190. It may also be applied to the first position sensor part 160, but since a plurality of Hall sensors are required especially when providing a long movement distance (or long stroke), the following description may be applied to the second camera actuator that performs this. That is, the description will be given on the sensor units (or Hall sensor) and the control unit (or driver DR) for the second position sensor part 170.

Referring to FIG. 20, each of the first and second position sensor parts 160 and 170 includes a plurality of sensor units 210, an amplifier 220, and an analog-to-digital converter 230.

The plurality of sensor units 210 include sensors for position detection. Preferably, the plurality of sensor units 210 may be a plurality of Hall sensors, and the Hall sensors may correspond to the Hall sensors described in the second camera actuator. Hereinafter, the Hall sensors may correspond to the first to second Hall sensors described above. That is, hereinafter, a description will be made on contents in which the position of the first and second lens assemblies or the first and second magnets is sensed from the Hall sensors of the second camera actuator, and current supplied to the first and second coils is adjusted accordingly.

A plurality of Hall sensors may be located in at least one of the first sub coil and the second sub coil. For example, a plurality of holes may be disposed in the first sub coil. Alternatively, the plurality of holes may be disposed in the second sub coil. Alternatively, some of the plurality of holes may be disposed in the first sub-coil, and the remaining holes may be disposed in the second sub-coil. For example, at least three Hall sensors may be positioned in various combinations in the first sub coil or the second sub coil. Furthermore, the positions of three or more Hall sensors may be equally applied to the second drive coil. That is, three or more Hall sensors may be disposed in various numbers in the third sub coil and the fourth sub coil.

For example, one Hall sensor may be disposed in a first sub-coil and two Hall sensors may be disposed in a second sub-coil. Also, two Hall sensors may be disposed in the third sub-coil, and one Hall sensor may be disposed in the fourth sub-coil.

Furthermore, the plurality of Hall sensors (or sensor units) may be three or more and may be connected in parallel in units of two Hall sensors connected in series. A description of this will be given later.

As a modified embodiment, the plurality of sensor units 210 may include a plurality of induction coils.

The plurality of sensor units 210 may be connected to each other between sensors for the same axis movement or axis tilt in each actuator, and the sensors may also be connected to an amplifier 220 (*amp*). A connection structure of the plurality of sensor units 210 will be described in more detail below.

In the present invention, a plurality of sensor units 210 may be interconnected, and at least one output terminal of the interconnected sensor units may be connected to the amplifier 220. In a case of a plurality of sensor units, the outermost side or a sensor unit 210 disposed at the outermost side may be connected to the amplifier 220. Accordingly, a signal of a sum of detection signals detected by a predetermined sensor unit may be input to the amplifier 220. It is expressed as the sum of sensing ranges of predetermined sensor units, and accordingly, the sensing ranges of the plurality of sensor units 210 input to the amplifier 220 may be extended compared to a single sensor unit.

The amplifier 220 may include a non-inverting terminal (+) and an inverting terminal (−). Further, the amplifier 220 differentially amplifies the signal input to the non-inverting terminal (+) and the signal input to the inverting terminal (−), and outputs the signal to the analog-to-digital converter 230. In this specification, the analog-to-digital converter 230 is used interchangeably with 'converter'. That is, the output signals of the plurality of sensor units 210 have the magnitudes of mV and V, which may have magnitudes that do not match the input range of the analog-to-digital converter 230. Accordingly, the amplifier 220 differentially amplifies and outputs a signal input through the non-inverting terminal (+) and the inverting terminal (−) to match the input range of the analog-to-digital converter 230.

The analog-to-digital converter 230 may receive an analog signal from the amplifier 220, convert the received analog signal into a digital signal, and output the converted signal. Preferably, the analog-to-digital converter 230 may receive an analog signal from the amplifier 220 and output it as a multi-bit digital signal. In this case, the output signal of the analog-to-digital converter 230 may be represented by values of 0 and 1.

In an embodiment of the present invention, the plurality of sensor units 210 may be composed of a plurality of Hall sensors. Hereinafter, when the plurality of sensor units 210 are composed of Hall sensors, the interconnection relationship of each Hall sensor will be described.

Figure 21:
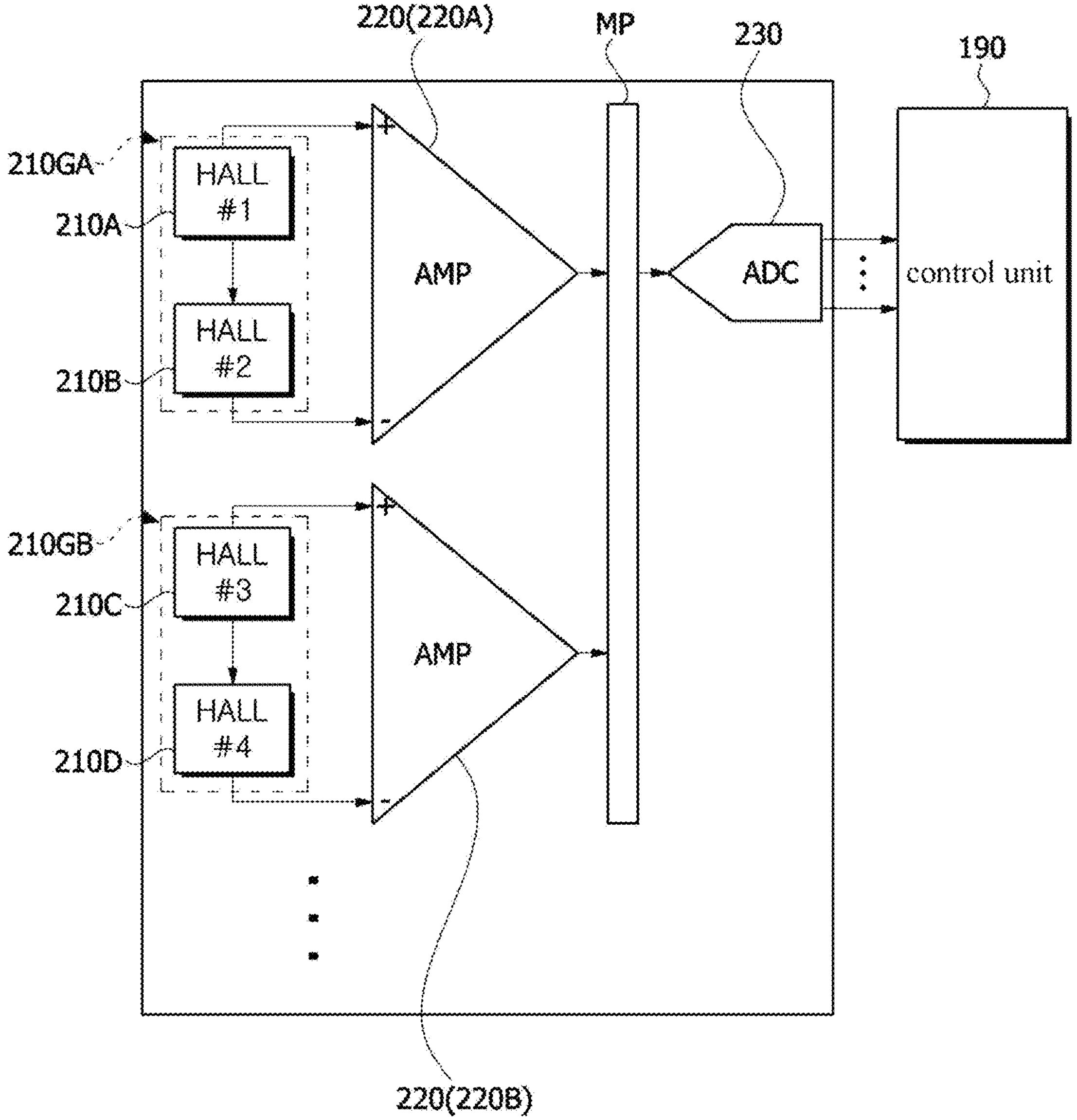
FIG. 21 is a diagram for explaining a connection relationship of sensor units according to an embodiment of the present invention.
Figure 22:
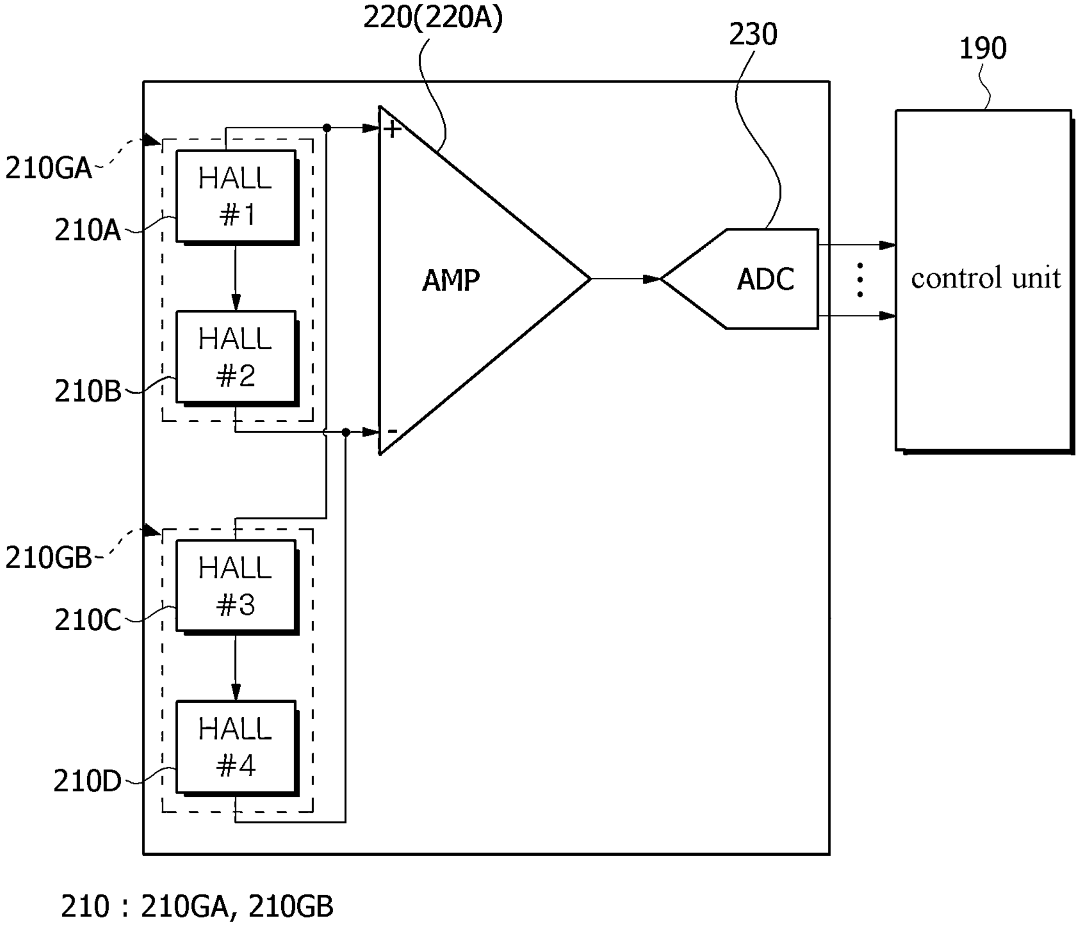
FIG. 22 is a diagram for explaining a connection relationship of sensor units according to another embodiment of the present invention.
Figure 23:
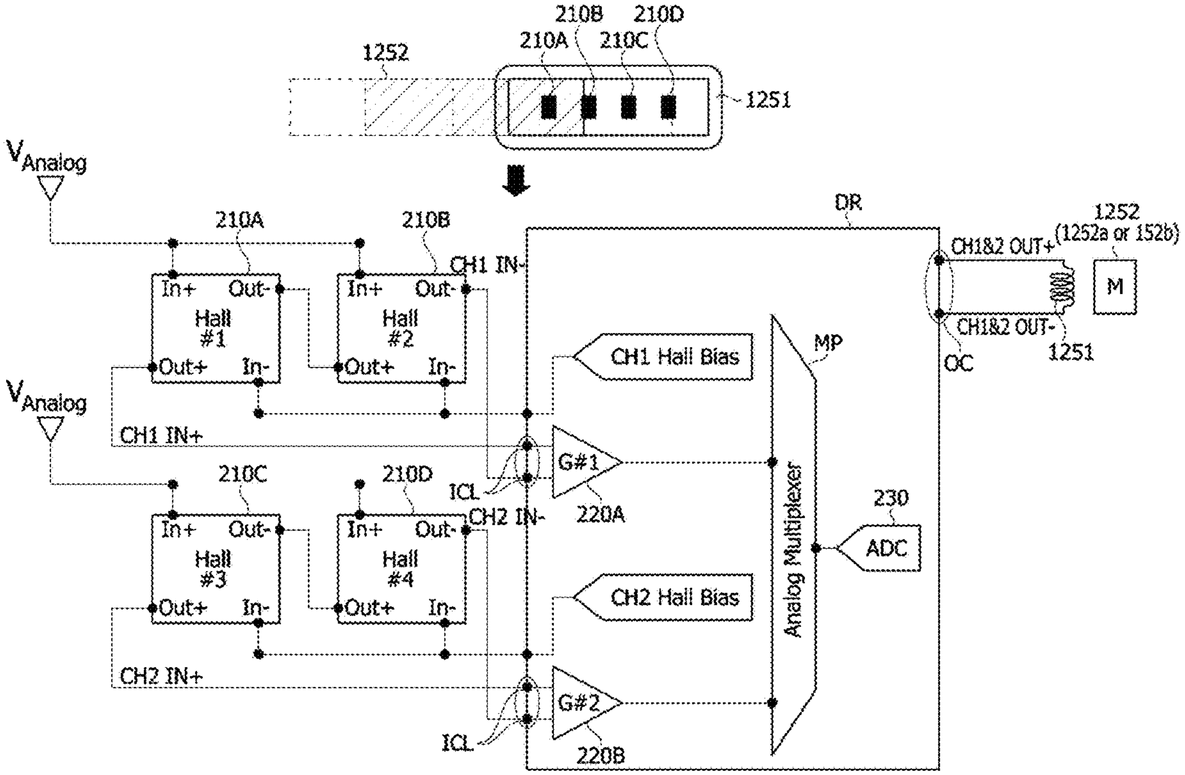
FIG. 23 is a configuration diagram of a sensor unit, a driver, a driving coil, and a driving magnet according to an embodiment.

FIG. 21 is a diagram for explaining a connection relationship of sensor units according to an embodiment of the present invention, FIG. 22 is a diagram for explaining a connection relationship of sensor units according to another embodiment of the present invention, and FIG. 23 is a configuration diagram of a sensor unit, a driver, a driving coil, and a driving magnet according to an embodiment.

Referring to FIG. 21, a lens driving device according to an embodiment may include N sensors (or Hall sensors or sensor units) for sensing the magnetic field of one magnet (first magnet or second magnet) of the driving magnets. In this case, the driving unit (or driver) may receive outputs of a plurality of sensors (N sensors) and control the current applied to the first coil (or second coil) therefrom.

In this specification, N may be 3 or more natural numbers. And as an example, when N is an odd number, N sensors may be connected to have (N−1)/2 serial connections. And if N is an even number, N sensors may be connected to have N/2 serial connections. In this specification, it will be described based on a case where N is 3 or 4. Furthermore, the sensor corresponds to a Hall sensor or a sensor unit described above.

As shown, the first sensor HALL #1 and the second sensor HALL #2 may be serially connected to each other. Also, the third sensor HALL #3 and the fourth sensor HALL #4 may be serially connected to each other. The first sensor HALL #1 and the second sensor HALL #2 form the first group sensor 210GA. The first group sensor 210GA may be a 'first group sensor unit' or a 'first group Hall sensor'. Also, the third sensor HALL #3 and the fourth sensor HALL #4 form the second group sensor 210GB. The second group sensor 210GB may be a 'second group sensor unit' or a 'second group Hall sensor'.

The first sensor HALL #1 and the second sensor HALL #2 connected in series may be connected to the first amplifier 220A. Also, the third sensor HALL #3 and the fourth sensor HALL #4 connected in series may be connected to the second amplifier 220B. Also, the signals amplified by the first amplifier 220A and the second amplifier 220B respectively may be provided to the selection unit MP. For example, the selection unit MP may be a multiplexer. For example, the selection unit MP may provide signals outputted from the first group sensor and the second group sensor to the converter 230 through a charging unit (e.g., a capacitor). Each of the signals outputted from the first group sensor and the second group sensor may be converted into a digital signal through the converter 230. Also, the control unit 190 or the driver DR may receive the converted digital signal and detect the position of the driving magnet (for example, the first magnet). Furthermore, the position of the lens unit (for example, the first lens assembly or the second lens assembly) may be detected through the detected position of the driving magnet. Correspondingly, the control unit 190 may control the current applied to the driving coil according to the movement distance of the lens unit.

Referring to FIG. 22, as described above, the lens driving device according to an embodiment may include N sensors (or Hall sensors or sensor units) that sense the magnetic field of one magnet (first magnet or second magnet) of the driving magnets. At this time, the driving unit (or drive) may receive outputs of a plurality of sensors (N sensors) and control current applied to the first coil (or second coil) therefrom. In addition, except for the description to be described later, all of the above contents may be equally applied.

As shown, the first sensor HALL #1 and the second sensor HALL #2 may be serially connected to each other. Also, the third sensor HALL #3 and the fourth sensor HALL #4 may be serially connected to each other. The first sensor HALL #1 and the second sensor HALL #2 form the first group sensor 210GA. The first group sensor 210GA may be a 'first group sensor unit' or a 'first group Hall sensor'. Also, the third sensor HALL #3 and the fourth sensor HALL #4 form the second group sensor 210GB. The second group sensor 210GB may be a 'second group sensor unit' or a 'second group Hall sensor'.

The first sensor HALL #1 and the second sensor HALL #2 connected in series may be connected to the amplifier 220. Also, the third sensor HALL #3 and the fourth sensor HALL #4 connected in series may be connected to the amplifier 220. For example, the first group sensor 210GA and the second group sensor 210GB may be connected in parallel to the same amplifier. That is, integrated output values (for example, sum or average) of the first group sensor 210GA and the second group sensor 210GB may be provided to the amplifier 220. The signal amplified by the amplifier may be provided to the selection unit or to the converter 230 when the selection unit does not exist. Signals outputted from the first group sensor and the second group sensor may be converted into digital signals through the converter 230. Also, the control unit 190 or the driver may receive the converted digital signal and detect the position of the driving magnet (for example, the first magnet). Furthermore, the position of the lens unit (e.g., the first lens assembly or the second lens assembly) may be detected through the detected position of the driving magnet. Correspondingly, the control unit 190 may control the current applied to the driving coil according to the movement distance of the lens unit.

Referring to FIG. 23, in the camera actuator according to the present embodiment, the N sensors described above correspond to the fourth Hall sensor unit 1253 that senses the magnetic field of the first optical driving magnet 1252. Also, the fourth Hall sensor unit 1253 may include a plurality of Hall sensors (or position sensors) including first sensors 210A to fourth sensors 210D. Furthermore, in this specification, a Hall sensor may be referred to as a 'sensor' or a 'position sensor'. Each Hall sensor may include a first detection signal output terminal, a second detection signal output terminal, a first power terminal and a second power terminal.

A voltage signal (or current signal) may be applied to the Hall sensor through the first power terminal. A Hall bias signal may be applied from the driver DR (or the driving unit or control unit) through the second power terminal. The first detection signal output terminal and the second detection signal output terminal may correspond to an output signal for the magnetic force sensed by the Hall sensor. For example, there may be a range of different polarities.

The driving unit may include a control unit including a driver DR. Accordingly, the driving unit may receive outputs of the first sensor 210A to fourth sensor 210D and control the current applied to the first coil. Here, the received outputs of the first sensor 210A to fourth sensor 210D may be digital signals outputted or converted by the converter 230 and may be signals corresponding to the position of the first magnet as a driving magnet.

In the four sensors 210A to 210D, the third Hall sensor 210A and the fourth Hall sensor 210B may be connected in series. Also, the fifth Hall sensor 210C and the first Hall sensor 210D may be connected in series.

Furthermore, N sensors, that is, four sensors may be sequentially arranged side by side along the optical axis direction. Also, the first power terminal of the third Hall sensor 210A and the first power terminal of the fourth Hall sensor 210B may form the same node or be connected in parallel, and may receive an input voltage VAnalog. In addition, the second power terminal of the third Hall sensor 210A and the second power terminal of the fourth Hall sensor 210B may form the same node or be connected in parallel, and may receive (or may be supplied with) bias power CH1 Hall Bias. The above description for the first embodiment of FIG. 20 may be equally applied to the following description for the first and second Hall sensors.

The first power terminal of the fifth Hall sensor 210C and the first power terminal of the first Hall sensor 210D may form the same node or be connected in parallel, and may receive an input voltage VAnalog. In addition, the second power terminal of the fifth Hall sensor 210C and the second power terminal of the first Hall sensor 210D may form the same node or be connected in parallel, and may receive bias power CH2 Hall Bias.

In addition, the first detection signal output terminal of the fifth Hall sensor 210C may be connected to the input channel of the driving unit or driver DR. For example, the driving unit or driver DR may include a first input channel IC1 and a second input channel IC2. Each of the first input channel IC1 and the second input channel IC2 may correspond to one terminal (one of a non-inverting terminal and an inverting terminal) of each amplifier. Also, the fifth Hall sensor 210C and the first Hall sensor 210D may be connected to the second input channel IC2. Also, the first and second Hall sensors 210A and 210B may be connected to the first input channel IC1.

For example, the first detection signal output terminal of the fifth Hall sensor 210C may be connected to one terminal (one of a non-inverting terminal and an inverting terminal) of the second amplifier 220B. Also, the second detection signal output terminal of the first Hall sensor 210D may be connected to another terminal (another one of a non-inverting terminal and an inverting terminal) of the second amplifier 220B. That is, the second input signal of the second input channel IC2 may be input to and amplified by the second amplifier 220B. The second input signal may be a signal output from the first detection signal output terminal of the fifth Hall sensor 210C and the second detection signal output terminal of the first Hall sensor 210D.

Furthermore, the signal amplified by the first amplifier 220A and the second amplifier 220B may be switched or sampled by the selection unit MP and provided to the converter 230.

Then, the first input signal or the second input signal selected by the selecting unit (e.g., multiplexer) may be provided to the converter 230. Therefore, each of the signals amplified by the first amplifier 220A and the second amplifier 220B may be converted into a digital signal.

Accordingly, the control unit or driving unit may adjust the current applied to the driving magnet (for example, the first coil) according to the first input signal or the second input signal converted by the converter 230. The control unit may detect the position of the first optical driving magnet 1252 from the converted digital signal, detect the position of the driving magnet or the lens unit (or lens assembly) to which the driving magnet is coupled, and supply current as much as the desired movement to the driving coil 1251. In this way, the noise reduction effect of the signal using each amplifier may be improved. In addition, in this embodiment and in the description below, a plurality of sensors corresponding to one driving magnet may be connected in series between adjacent or non-adjacent Hall sensors. For example, connection between adjacent Hall sensors may facilitate electrical design.

Figure 24:
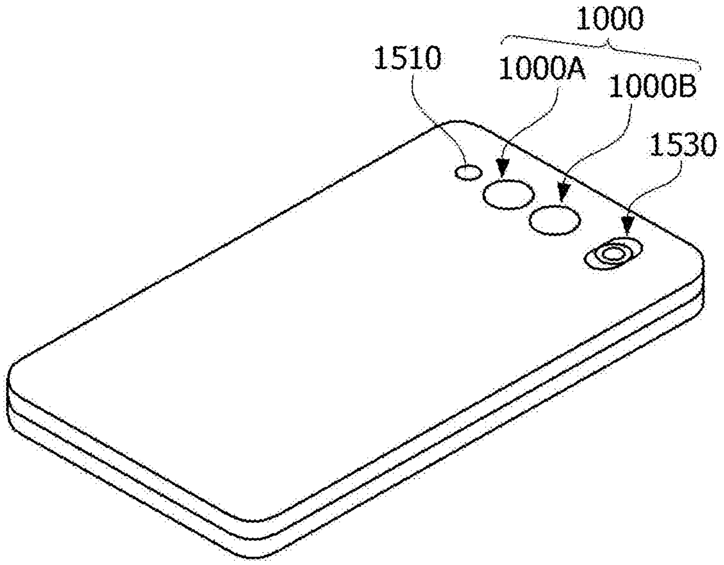
FIG. 24 is a perspective view of a mobile terminal to which a camera device according to an embodiment is applied.

FIG. 24 is a perspective view of a mobile terminal to which a camera device according to an embodiment is applied.

Referring to FIG. 24, a mobile terminal 1500 according to an embodiment may include a camera device 1000, a flash module 1530, and an auto-focus device 1510, which are provided on the rear surface thereof.

The camera device 1000 may have an image capturing function and an auto-focus function. For example, the camera device 1000 may have the auto-focus function using an image.

The camera device 1000 processes an image frame of a still image or a moving image obtained by an image sensor in a shooting mode or a video call mode.

The processed image frame may be displayed on a predetermined display unit and stored in a memory. A camera (not shown) may also be disposed on the front surface of the mobile terminal.

For example, the camera device 1000 may include a first camera device 1000A and a second camera device 1000B, and the OIS may be implemented together with the AF or zoom function by the first camera device 1000A. In addition, AF, zoom, and OIS functions may be performed by the second camera device 1000B. In this case, since the first camera device 1000A includes both the first camera actuator and the second camera actuator described above, miniaturization of the camera device may be easily achieved by changing the optical path.

The flash module 1530 may include therein a light emitting device that emits light. The flash module 1530 may operate in response to a camera operation of the mobile terminal or a user's manipulation.

The auto-focus device 1510 may include one of packages of a surface light emitting laser device as a light emitting part.

The auto-focus device 1510 may include an auto-focusing function using a laser. The auto-focus device 1510 may be mainly used in a condition in which the auto-focusing function using the image of the camera device 1000 is deteriorated, for example, in a close environment of 10 m or less or in a dark environment.

The auto-focus device 1510 may include a light emitting unit including a vertical cavity surface emitting laser (VCSEL) semiconductor device, and a light receiving unit such as a photodiode that converts light energy into electrical energy.

Figure 25:
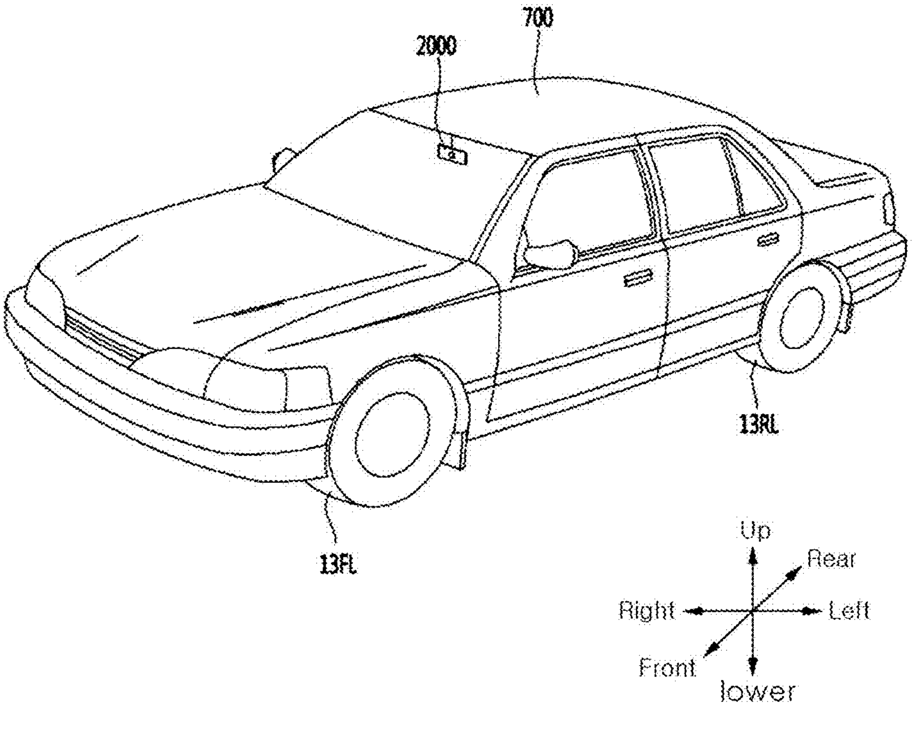
FIG. 25 is a perspective view of a vehicle to which a camera device according to an embodiment is applied.

FIG. 25 is a perspective view of a vehicle to which a camera device according to an embodiment is applied.

For example, FIG. 25 is an external view of a vehicle including a vehicle driving assistance device to which the camera device 1000 according to an embodiment is applied.

Referring to FIG. 25, a vehicle 700 according to an embodiment may include wheels 13FL and 13FR that rotate by a power source, and a predetermined sensor. The sensor may be, but is not limited to, a camera sensor 2000.

The camera sensor 2000 may be a camera sensor to which the camera device 1000 according to an embodiment is applied. The vehicle 700 of the embodiment may acquire image information through the camera sensor 2000 that captures a front image or a surrounding image, and determine a lane unidentified situation by using the image information to generate a virtual lane.

For example, the camera sensor 2000 may obtain a front image by capturing the front of the vehicle 700, and a processor (not shown) may analyze an object contained in the front image to acquire image information.

For example, if the image captured by the camera sensor 2000 contains objects such as a lane, an adjacent vehicle, a driving obstacle, and an indirect road mark such as a median, a curb, or a street tree, the processor may detect such objects and include them in the image information. In this case, the processor may acquire distance information from the object detected through the camera sensor 2000 and thereby further supplement the image information.

The image information may be information about an object captured in an image. The camera sensor 2000 may include an image sensor and an image processing module.

The camera sensor 2000 may process a still image or a moving image obtained by the image sensor (e.g., CMOS or CCD).

The image processing module may process a still image or a moving image obtained through the image sensor, extract necessary information, and transmit the extracted information to the processor.

In this case, the camera sensor 2000 may include, but is not limited to, a stereo camera to improve the object measurement accuracy and further secure information such as a distance between the vehicle 700 and the object.

Although it has been described based on embodiments so far, this is only exemplary and does not limit the present disclosure, and those of ordinary skill in the art to which the present disclosure pertains will appreciate that various modifications and applications, not described above, are possible in the scope that does not depart from the subject matter of the present disclosure. For example, the respective elements specifically shown in the embodiments may be implemented by modification. Differences related to these modifications and applications should be construed as being included in the scope of the present disclosure defined in the appended claims.

What is claimed is:

1. A camera device, comprising:

a housing;

a first lens assembly and a second lens assembly moving in an optical axis direction with respect to the housing;

an optical driving unit including a first driving unit moving the first lens assembly and a second driving unit moving the second lens assembly; and a first Hall sensor adjacent to the first driving unit and a second Hall sensor adjacent to the second lens assembly, wherein at least a portion of the first Hall sensor and the second Hall sensor do not overlap each other in a direction which is perpendicular to the optical axis direction and in which first and second coils face each other, wherein the first driving unit includes the first coil, and a first magnet that faces the first coil, and wherein the second driving unit includes the second coil, and a second magnet that faces the second coil.

2. The camera device according to claim 1, wherein a ratio of an area of the first Hall sensor to an area overlapping the second Hall sensor in a horizontal direction is 1:0.5 or less.

3. The camera device according to claim 1, wherein the first Hall sensor faces the first magnet and the second Hall sensor faces the second magnet when the first lens assembly and the second lens assembly are maximally moved in the optical axis direction.

4. The camera device according to claim 1, wherein the first coil and the second coil are disposed symmetrically with respect to an optical axis.

5. The camera device according to claim 1, further comprising:

an image sensor, wherein the second lens assembly is disposed closer to the image sensor than the first lens assembly.

6. The camera device according to claim 5, wherein the second Hall sensor is disposed closer to the image sensor than the first Hall sensor.

7. The camera device according to claim 1, wherein a movement distance of the second lens assembly in the optical axis direction is greater than a movement distance of the first lens assembly in the optical axis direction.

8. A camera device comprising:

a housing;

a first lens assembly and a second lens assembly moving in an optical axis direction with respect to the housing;

an optical driving unit including a first driving unit moving the first lens assembly and a second driving unit moving the second lens assembly; and a first Hall sensor adjacent to the first driving unit and a second Hall sensor adjacent to the second lens assembly, wherein at least a portion of the first Hall sensor and the second Hall sensor do not overlap each other in a direction which is perpendicular to the optical axis direction, wherein the first driving unit includes a first coil, and a first magnet that faces the first coil, wherein the second driving unit includes a second coil, and a second magnet that faces the second coil, wherein the first coil includes a first sub-coil and a second sub-coil disposed to overlap each other in the optical axis direction, and wherein the second coil includes a third sub-coil and a fourth sub-coil disposed to overlap each other in the optical axis direction.

9. The camera device according to claim 8, wherein the first sub-coil is disposed to face the third sub-coil based on an optical axis, and wherein the second sub-coil is disposed to face the fourth sub-coil based on the optical axis.

10. The camera device according to claim 9, wherein the first Hall sensor is disposed in the first sub-coil, and the second Hall sensor is disposed in the fourth sub-coil.

11. The camera device according to claim 10, wherein a movement distance of the second lens assembly in the optical axis direction is greater than a movement distance of the first lens assembly in the optical axis direction.

12. A camera device comprising:

a housing;

a first lens assembly and a second lens assembly moving in an optical axis direction with respect to the housing;

an optical driving unit including a first driving unit moving the first lens assembly and a second driving unit moving the second lens assembly; and a first Hall sensor adjacent to the first driving unit and a second Hall sensor adjacent to the second lens assembly, wherein at least a portion of the first Hall sensor and the second Hall sensor do not overlap each other in a direction which is perpendicular to the optical axis direction, wherein the first driving unit includes a first coil, and a first magnet that faces the first coil, wherein the second driving unit includes a second coil, and a second magnet that faces the second coil, wherein a minimum distance between the first Hall sensor and the second Hall sensor is greater than a maximum distance between the first coil and the second coil in a horizontal direction when the first lens assembly and the second lens assembly are maximally moved in the optical axis direction.

* * * * *